(12) United States Patent
Miller et al.

(10) Patent No.: US 12,325,645 B2
(45) Date of Patent: Jun. 10, 2025

(54) SYSTEMS AND METHODS FOR FRESHWATER PRODUCTION AND BRINE WASTE RECOVERY

(71) Applicant: MAGE LLC, North Canton, OH (US)

(72) Inventors: Robert E Miller, North Canton, OH (US); Scott E. Miller, North Canton, OH (US); Franklin N. Koontz, Hampstead, MD (US)

(73) Assignee: MAGE LLC, North Canton, OH (US)

( * ) Notice: Subject to any disclaimer, the term of this patent is extended or adjusted under 35 U.S.C. 154(b) by 616 days.

(21) Appl. No.: 17/699,409

(22) Filed: Mar. 21, 2022

(65) Prior Publication Data
US 2023/0183100 A1  Jun. 15, 2023

Related U.S. Application Data

(63) Continuation-in-part of application No. 17/671,831, filed on Feb. 15, 2022, now Pat. No. 11,986,835.
(Continued)

(51) Int. Cl.
  *C02F 1/36*  (2023.01)
  *C02F 1/34*  (2023.01)
  (Continued)

(52) U.S. Cl.
  CPC ............... *C02F 1/36* (2013.01); *H01M 8/06* (2013.01); *H01M 10/42* (2013.01)

(58) Field of Classification Search
  CPC ......... B02C 19/18; B02C 23/36; B01D 43/00; B01D 21/28; B01D 21/283; C02F 1/36;
  (Continued)

(56) References Cited

U.S. PATENT DOCUMENTS

| | | | |
|---|---|---|---|
| 2,738,172 A | 3/1956 | Spiess, Jr. et al. | |
| 5,395,592 A | 3/1995 | Bolleman et al. | |

(Continued)

FOREIGN PATENT DOCUMENTS

| | | |
|---|---|---|
| CN | 112390324 A | 2/2021 |
| GB | 2500664 A | 10/2013 |
| WO | 2008018323 A1 | 2/2008 |

OTHER PUBLICATIONS

International Searching Authority, International Search Report for International Application No. PCT/US22/52248, mailed on Jun. 15, 2023.
(Continued)

*Primary Examiner* — Pranav N Patel
(74) *Attorney, Agent, or Firm* — Sand, Sebolt & Wernow Co., LPA

(57) ABSTRACT

A liquid treatment loop system for dissociating and removing brine compositions found in wastewater and producing clean water for freshwater and potable water applications. The system includes an acoustic source process cell stage (SPCS) operatively in communication with a continuous stream from a fluid source. The SPCS is configured to eviscerate contaminants in the continuous fluid stream in at least one treatment process. The SPCS is also configured to separate the eviscerated contaminants from the continuous fluid stream to provide permeated water in the at least one treatment process. The system includes at least one mining process cell stage (MPCS) operatively in communication with SPCS. The at least one MPCS is adapted to receive the eviscerated contaminants from the SPCS. The system
(Continued)

includes at least one permeate outlet operatively in communication with SPCS, wherein the at least one permeate outlet is adapted to receive the permeated water from the SPCS.

17 Claims, 20 Drawing Sheets

Related U.S. Application Data

(60) Provisional application No. 63/288,010, filed on Dec. 10, 2021.

(51) Int. Cl.
*H01M 8/06* (2016.01)
*H01M 10/42* (2006.01)

(58) Field of Classification Search
CPC .......... C02F 2101/163; C02F 2103/007; C02F 2103/08; C02F 2201/002; C02F 2301/024; C02F 2301/08; C02F 2303/04; C02F 2101/10; C02F 2101/32; C02F 2209/006; C02F 1/34; C02F 1/463; C02F 1/467; C02F 2101/20; C02F 2103/16; C02F 2201/46105; C02F 2209/40; C02F 9/00; A61L 2/025; B01J 19/10
See application file for complete search history.

(56) References Cited

U.S. PATENT DOCUMENTS

| | | |
|---|---|---|
| 5,611,993 A | 3/1997 | Babaev |
| 5,951,456 A | 9/1999 | Scott |
| 6,083,387 A | 7/2000 | LeBlanc et al. |
| 6,290,778 B1 | 9/2001 | Zugibe |
| 6,547,935 B2 | 4/2003 | Scott |
| 6,878,288 B2 | 4/2005 | Scott |
| 7,022,505 B2 | 4/2006 | Chandler et al. |
| 7,083,764 B2 | 8/2006 | Scott |
| 2002/0164274 A1 | 11/2002 | Haggett et al. |
| 2007/0006892 A1 | 1/2007 | Olesen et al. |
| 2011/0123392 A1 | 5/2011 | Dionne et al. |
| 2012/0325727 A1 | 12/2012 | Dionne et al. |
| 2014/0299529 A1 | 10/2014 | Govind et al. |
| 2017/0217794 A1 | 8/2017 | Lipkens et al. |
| 2017/0298316 A1 | 10/2017 | Kennedy, III et al. |
| 2018/0163321 A1 | 6/2018 | Nottke et al. |
| 2018/0353876 A1 | 12/2018 | Chen et al. |
| 2019/0284073 A1 | 9/2019 | Yost et al. |

OTHER PUBLICATIONS

English language machine translation of WO2008018323, 9 pages, accessed on Sep. 14, 2023.
English language machine translation of CN112390324, 6 pages, accessed on Sep. 14, 2023.

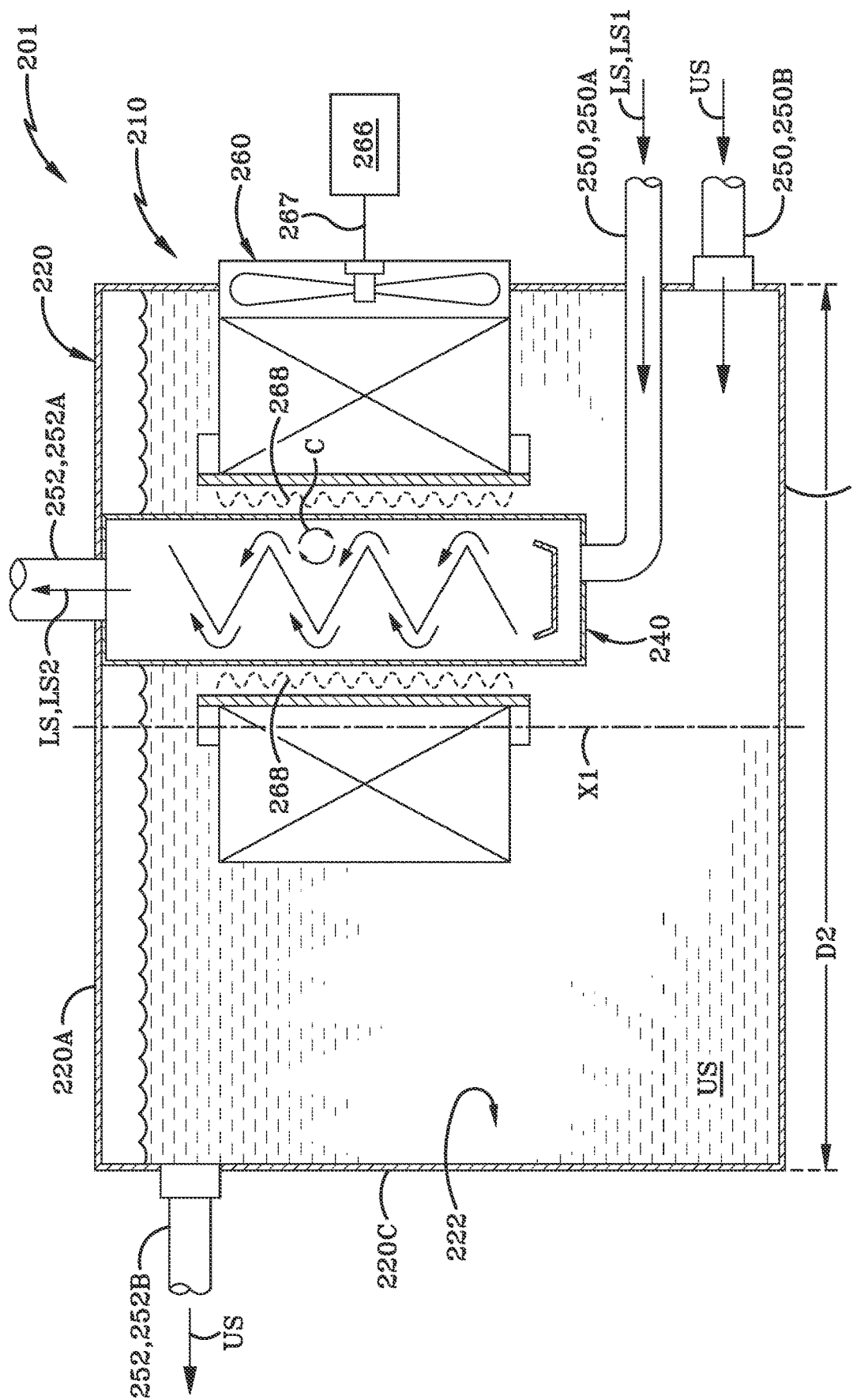

SYSTEMS AND METHODS FOR FRESHWATER PRODUCTION AND BRINE WASTE RECOVERY

CROSS REFERENCE TO RELATED APPLICATIONS

This application is a continuation-in-part application of co-pending U.S. patent application Ser. No. 17/671,831, filed on Feb. 15, 2022, which claims the benefit of U.S. Provisional Application Ser. No. 63/288,010, filed on Dec. 10, 2021; the disclosure of which is incorporated herein by reference.

TECHNICAL FIELD

This disclosure is directed to system for treating a continuous flow of fluid-based medium. More particularly, this disclosure is directed to a system applying sonic energy to a continuous flow of fluid-based medium for treating said continuous flow of fluid-based medium. Specifically, this disclosure is directed to a system using sonic energy for dissociating complex substances in a continuous flow of fluid-based medium and separating the dissociated complex substances from continuous flow of fluid-based medium.

BACKGROUND

Fluid and fluid streams provided from various sources may include contaminants or solids that are entrained, suspended, or dissolved in these fluid and fluid streams. The removal of these contaminates or solids are frequently of considerable interest since the streams containing these solids may otherwise be useable once cleaned. For example, in the case of fluids, cleaning may render the fluids useful for process applications, human consumption or the like.

Generally, treatment and purification of fluid streams including contaminants or solids therein requires a vast amount of systems and assemblies to make such streams usable. In one example, treatment and purification of waste water streams from water sources (e.g., rivers, lakes, oceans, etc.) requires the act of removing and/or neutralizing vast amounts of microorganisms and various types of chemical compounds found in these waste water streams. Current practices and methods generally treat these waste water stream issues by applying or using chemical additives to disintegrate or neutralize specific contaminants or solids found in these waste water streams. Even though these systems are in place, the continuous application of chemical additives to these waste water streams is costly, time consuming, and marginally effective given the state of the waste water streams.

Moreover, separation or removal of these contaminants or solids provided in these fluid streams is another issue in various parts of the world. For example, the separation of salt from seawater or separation of dissolved, suspended, and entrained solids (such as microorganisms and chemical compounds) in waste water streams requires vast systems to produce useable and clean fluids like clean drinking water for human consumption. In these fields, current separation processes to produce freshwater are mainly thermal based or micro-filtration systems based on multiple stages using numerous amounts of standard and membrane filters, particularly reverse osmosis desalination for removal of salt from seawater. Even though these systems are in place, the continuous application of thermal and use of standard and membrane filters to clean fluid streams is also costly, time consuming, and marginally effective given the state of the waste water streams.

SUMMARY

In one aspect, an exemplary embodiment of the present disclosure may provide a solids dissociation apparatus. The solids dissociation apparatus may comprise a housing; at least one insert operably engaged with the housing, wherein the at least one insert is adapted to receive a continuous fluid stream; and a transducer operably engaged with the housing and disposed about the at least one insert at a distance away from said at least one insert inside of the housing, wherein the transducer is configured to create cavitation inside of the housing, via sonic waves, to eviscerate contaminants in the continuous fluid stream flowing through the at least one insert.

This exemplary embodiment or another exemplary embodiment may further provide the distance measured between the at least one insert and the transducer is about at least one-half wavelength of a frequency of the sonic waves transmitted by said transducer. This exemplary embodiment or another exemplary embodiment may further provide a pressurized chamber defined by the housing, wherein the pressurized chamber is configured to hold a continuous sonic optimization fluid to allow the transducer to generate cavitation in the continuous sonic optimization fluid stream. This exemplary embodiment or another exemplary embodiment may further provide at least one fluid passage defined by the at least one insert, wherein the at least one fluid passage is adapted to eviscerating contaminants in the continuous fluid stream inside of the at least one insert isolated from the pressurized chamber and remote from the transducer. This exemplary embodiment or another exemplary embodiment may further provide that the transducer further comprises a first end; an opposing second end; and a passageway defined therebetween, wherein the passageway is adapted to house a portion of the at least one insert inside of the passageway, and wherein the at least one insert is free from contacting the transducer. This exemplary embodiment or another exemplary embodiment may further provide a first longitudinal axis defined by the at least one insert; and a second longitudinal axis defined by the transducer; wherein the at least one insert and the transducer are coaxial with one another. This exemplary embodiment or another exemplary embodiment may further provide at least one inlet connection operably engaged with the housing and the at least one insert, wherein the at least one inlet connection is adapted to allow the continuous fluid stream with contaminants to flow into the at least one insert; and at least one outlet connection operably engaged with the housing and the at least one insert, wherein the at least one outlet connection is adapted to allow a continuous fluid stream with eviscerated contaminants to flow out from the at least one insert to at least one output device. This exemplary embodiment or another exemplary embodiment may further provide a second inlet connection operably engaged with the housing, wherein the second inlet connection is adapted to allow a continuous sonic optimization fluid to flow into the pressurized chamber; and a second outlet connection operably engaged with the housing for allowing, wherein the second outlet connection is adapted to allow the continuous sonic optimization fluid stream to flow out from the pressurized chamber. This exemplary embodiment or another exemplary embodiment may further provide that the at least one insert is made of a flexible material to allow the sonic waves generated by the transducer to transfer into the at least one insert to create cavitation inside of the at least one insert. This exemplary embodiment or another exemplary embodiment may further provide at least one director operably engaged with the at least one insert; wherein the director is configured to direct the continuous fluid stream with contaminants in a non-laminar flow inside of the at least one insert. This exemplary embodiment or another exemplary embodiment may further provide a first director operably engaged with a first wall of the at least one insert; and a second director operably engaged with an opposing second wall of the at least one insert; wherein the first director and the second director is configured to direct the continuous fluid stream with contaminants in a laminar flow inside of the at least one insert. This exemplary embodiment or another exemplary embodiment may further provide a third outlet connection operably engaged with the housing and the at least one insert, wherein the third outlet connection is adapted to allow a continuous fluid stream with eviscerated contaminants to flow out from the at least one insert to a second output device. This exemplary embodiment or another exemplary embodiment may further provide that the at least one insert further comprises an outer wall extending between a first wall and an opposing second wall of the at least one insert; and an inner wall extending between the first wall and the second wall of the at least one insert; wherein the at least one fluid passage is defined between the outer wall and the inner wall; and wherein the at least one fluid passage is adapted to isolate cavitation of the continuous fluid stream with contaminants inside of the at least one insert remote from the transducer. This exemplary embodiment or another exemplary embodiment may further provide a second fluid passage defined by the inner wall of the at least one insert, wherein the second fluid passage is adapted to isolate cavitation of a second continuous fluid stream inside of the inner wall remote from the transducer and remote from the at least one fluid passage. This exemplary embodiment or another exemplary embodiment may further provide that the second continuous fluid stream contains one of contaminants and eviscerated containments. This exemplary embodiment or another exemplary embodiment may further provide a first flow director operably engaged with the at least one insert inside of the at least one fluid passage; and second flow director operably engaged with the at least one insert inside of the second fluid passage; wherein the first flow director and the second flow director are configured to direct the continuous fluid stream and the second continuous fluid stream with contaminants in a non-laminar flow inside of the at least one insert. This exemplary embodiment or another exemplary embodiment may further provide that the frequency of the sonic waves generated by the transducer is between about 3 kHz up to about 200 kHz.

In another aspect, an exemplary embodiment of the present disclosure may provide a method of eviscerating contaminants in a continuous fluid stream. The method further comprises steps of pumping at least one continuous fluid stream into a solids dissociation apparatus, wherein the at least one continuous fluid stream includes contaminants; guiding the at least one continuous fluid stream, via at least one inlet connection, into at least one insert of the solids dissociation apparatus; transmitting sonic waves, via a transducer of the solids dissociation apparatus, inside of a housing of the solids dissociation apparatus, wherein the transducer is positioned at a distance away from the at least one insert; cavitating a continuous sonic stream inside of the housing; cavitating the at least one continuous fluid stream inside of the at least one insert, wherein the at least one continuous fluid stream is isolated from the continuous sonic stream; and eviscerating the contaminants in the at least one continuous fluid stream.

This exemplary embodiment or another exemplary embodiment may further provide a step of directing the at least one continuous fluid stream with eviscerated contaminants, via at least one outlet connection of the solids dissociation apparatus, to at least one output device. This exemplary embodiment or another exemplary embodiment may further provide a step of directing the at least one continuous fluid stream with eviscerated contaminants, via a second outlet connection of the solids dissociation apparatus, to a second output device. This exemplary embodiment or another exemplary embodiment may further provide steps of pumping a second continuous fluid stream into the fluid treatment apparatus, wherein the second continuous fluid stream includes one of contaminants and eviscerated contaminants; guiding the second continuous fluid stream, via a second inlet connection of the solids dissociation apparatus, into a second insert of the fluid treatment apparatus; cavitating the second continuous fluid stream inside of the at least one insert, wherein the at least one continuous fluid stream is isolated from the continuous sonic stream; eviscerating one of the contaminants and the eviscerated contaminants in the second continuous fluid stream; and directing the second fluid stream with eviscerated contaminants, via a second outlet connection of the solids dissociation apparatus, to a second output device. This exemplary embodiment or another exemplary embodiment may further provide a step of directing the at least one continuous fluid stream, via at least one director, in one of a non-laminar flow and a laminar flow.

In another aspect, an exemplary embodiment of the present disclosure may provide a solids separation apparatus. The solids separation apparatus may comprise a tower; a transducer operably engaged with a first end of the tower, wherein the transducer is configured to generate a standing sonic wave inside of the tower; a reflector operably engaged with an opposing second end of the tower, wherein the reflector is configured to reflect the standing sonic wave towards the transducer; and at least one set of ports defined in an interior wall of at least one solids removal stage of the tower, wherein the at least one set of ports is positioned at anti-nodes of the standing sonic wave to recover solids concentrate from a fluid stream flowing through the tower; wherein the transducer and the reflector are linearly moveable relative to the tower to linearly move the standing sonic wave.

This exemplary embodiment or another exemplary embodiment may further provide that the transducer and the reflector are independently moveable relative to one another along a longitudinal axis defined between the first end and the second end of the tower. This exemplary embodiment or another exemplary embodiment may further provide that each port of the at least one set of ports defines a V-shaped configuration. This exemplary embodiment or another exemplary embodiment may further provide at least one set of shutters operably engaged with the interior wall of the tower, wherein each shutter of the at least one set of shutters is moveable relative to the tower to control the flow rate of the fluid stream in the tower. This exemplary embodiment or another exemplary embodiment may further provide that the tower further comprises an effluent outlet defined by the tower, wherein the effluent outlet is in fluid communication with each port of the at least one set of ports, and wherein the effluent outlet is configured to direct recovered solids concentrate from the fluid stream to at least one effluent output. This exemplary embodiment or another exemplary embodiment may further provide at least one set of passageways defined in the interior wall, wherein each passageway of the at least one set of passageways provides fluid communication between a port of the at least one set of ports and the effluent outlet, and wherein each passage of the at least one set of passages is configured to accept solids concentrate with a first configuration. This exemplary embodiment or another exemplary embodiment may further provide that each shutter of the at least one set of shutters is independently moveable relative to one another. This exemplary embodiment or another exemplary embodiment may further provide that the at least one set of shutters is one of longitudinally moveable, laterally moveable, radially moveable, and circumferentially moveable relative to the tower. This exemplary embodiment or another exemplary embodiment may further provide a diaphragm operably engaged with the tower between the first end and the second end of the tower; wherein the diaphragm is configured to prevent solids concentrate with the first configuration from traveling into a second solids removal stage of the tower. This exemplary embodiment or another exemplary embodiment may further provide that the diaphragm is independently moveable relative to the tower along a longitudinal axis defined between the first end and the second end of the tower. This exemplary embodiment or another exemplary embodiment may further provide at least one transfer connection operably engaged with the tower; wherein the at least one transfer connection provides fluid communication for the fluid stream between the at least one solids removal stage of the tower and a second solids removal stage of the tower. This exemplary embodiment or another exemplary embodiment may further provide a second set of ports defined in an interior wall of the second solids removal stage of the tower, wherein the second set of ports is positioned at anti-nodes of the standing sonic wave to recover solids concentrate with a second configuration from the fluid stream flowing through the tower. This exemplary embodiment or another exemplary embodiment may further provide that each port of the second set of ports defines a V-shaped configuration. This exemplary embodiment or another exemplary embodiment may further provide a second set of shutters operably engaged with the interior wall of the tower; wherein each shutter of the second set of shutters is moveable relative to the tower to control the flow rate of the fluid stream in the tower. This exemplary embodiment or another exemplary embodiment may further provide that each shutter of the second set of shutters is independently moveable relative to one another. This exemplary embodiment or another exemplary embodiment may further provide that the second set of shutters is one of longitudinally moveable, laterally moveable, radially moveable, and circumferentially moveable relative to the tower. This exemplary embodiment or another exemplary embodiment may further provide that a second effluent outlet defined by the tower, wherein the second effluent outlet is in fluid communication with each port of the second set of ports, and wherein the second effluent outlet is configured to direct recovered solids concentrate from the fluid stream to a second effluent output. This exemplary embodiment or another exemplary embodiment may further provide a second set of passageways defined in the interior wall, wherein each passageway of the second set of passageways provides fluid communication between a port of the second set of ports and the second effluent outlet, and wherein each passageway of the second set of passageways is configured to accept solids concentrate with a second configuration smaller than the solids concentrate with a first configuration.

In another aspect, an exemplary embodiment of the present disclosure may provide a method of removing solid concentrates from a fluid stream. The method may comprise the steps of pumping the fluid stream into a tower of a solids separation apparatus, wherein the fluid stream includes solid concentrates of at least one configuration; transmitting a standing sonic wave, via a transducer of the solids separation apparatus, inside of the tower; reflecting the standing sonic wave, via a reflector of the solids separation apparatus, back to the transducer; adjusting one or both of the transducer and the reflector until the anti-nodes of the standing sonic wave are aligned with at least one set of ports defined in the tower; forcing the solid concentrates of the at least one configuration in the fluid stream, via the standing sonic wave, into the at least one set of ports of at least one solids removal stage of the tower; and removing the solid concentrates of the at least one configuration from the fluid stream into the at least one set of ports.

This exemplary embodiment or another exemplary embodiment may further provide a step of directing the solid concentrates of the at least one configuration, via an effluent outlet, from the tower to at least one effluent output. This exemplary embodiment or another exemplary embodiment may further provide a step of transferring the standing sonic wave, via a diaphragm, from the at least one solids removal stage to a second solids removal stage of the tower. This exemplary embodiment or another exemplary embodiment may further provide a step of directing the fluid stream, via at least one transfer connection, from the at least one solids removal stage of the tower to at least one additional solids removal stage of the tower. This exemplary embodiment or another exemplary embodiment may further provide a step of moving at least one set of shutters along an interior wall of the tower to control the flow rate of the fluid stream in the tower. This exemplary embodiment or another exemplary embodiment may further provide steps of forcing solid concentrates of a second configuration in the fluid stream, via the standing sonic wave, into a second set of ports of the second stage of the tower, wherein the solid concentrates of a second configuration are smaller than the solid concentrates of the at least one configuration; and removing the solid concentrates of the second configuration from the fluid stream into second set of ports. This exemplary embodiment or another exemplary embodiment may further provide a step of directing the solid concentrates of the second configuration, via a second effluent outlet, from the tower to a second effluent output.

In another aspect, an exemplary embodiment of the present disclosure may provide fluid cleaning system. The fluid cleaning system may comprise at least one solids dissociation apparatus adapted to receive a continuous fluid stream from a fluid source; wherein the at least one solids dissociation apparatus further comprises: a housing; at least one insert operably engaged with the housing, wherein the at least one insert is adapted to receive the continuous fluid stream; a transducer operably engaged with the housing and disposed about the at least one insert at a distance away from the said at least one insert inside of the housing, wherein the transducer is configured to create cavitation inside of the housing, via sonic waves, to eviscerate contaminants in the continuous fluid stream flowing through the at least one insert; and at least one solids separation apparatus operably connected with the at least one fluid treatment apparatus for receiving the eviscerated contaminants provided in the fluid stream, wherein the at least one solids separation apparatus is adapted to separate the eviscerate contaminants from the fluid stream for at least one separation process.

This exemplary embodiment or another exemplary embodiment may further provide that a portion of the solids separation apparatus is provided inside of the at least one solids dissociation apparatus. This exemplary embodiment or another exemplary embodiment may further provide that the at least one solids dissociation apparatus further comprises a distance measured between the at least one insert and the transducer, wherein the distance is about at least one-half wavelength of a frequency of the sonic waves generated by said transducer. This exemplary embodiment or another exemplary embodiment may further provide that the at least one solids dissociation apparatus further comprises a pressurized chamber defined by the housing, wherein the pressurized chamber is configured to hold a continuous sonic optimization fluid to allow the transducer to generate cavitation in the continuous sonic optimization fluid. This exemplary embodiment or another exemplary embodiment may further provide that the at least one solids dissociation apparatus further comprises at least one fluid passage defined by the at least one insert, wherein the at least one fluid passage is adapted to isolated the continuous fluid stream inside of the at least one insert from the pressurized chamber and remote from the transducer to allow for cavitation inside of the at least one fluid passage via the traveling sonic wave. This exemplary embodiment or another exemplary embodiment may further provide that the at least one solids dissociation apparatus further comprises at least one inlet connection operably engaged with the housing and the at least one insert, wherein the at least one inlet connection is adapted to allow the continuous fluid stream with contaminants to flow into the at least one insert; and at least outlet connection operably engaged with the housing and the at least one insert, wherein the at least one outlet connection is adapted to allow a continuous fluid stream with eviscerated contaminants to flow out from the at least one insert to at least one output device. This exemplary embodiment or another exemplary embodiment may further provide that the at least one solids dissociation apparatus further comprises a second inlet connection operably engaged with the housing, wherein the second inlet connection is adapted to allow a continuous sonic optimization fluid to flow into the pressurized chamber; and a second outlet connection operably engaged with the housing for allowing, wherein the second outlet connection is adapted to allow the continuous sonic optimization fluid to flow out from the pressurized chamber. This exemplary embodiment or another exemplary embodiment may further provide that the at least one insert is made of a rigid or flexible material to allow the sonic waves generated by the transducer to transfer into the at least one insert to create cavitation inside of the at least one insert. This exemplary embodiment or another exemplary embodiment may further provide that the at least one solids dissociation apparatus further comprises at least one director operably engaged with at least one insert; wherein the director is configured to direct the continuous fluid stream with contaminants in a non-laminar flow inside of the at least one insert. This exemplary embodiment or another exemplary embodiment may further provide that the at least one solids separation apparatus further comprises a tower; a second transducer operably engaged with a first end of the tower, wherein the transducer is configured to generate a standing sonic wave inside of the tower; a reflector operably engaged with an opposing second end of the tower, wherein the reflector is configured to reflect the standing sonic wave towards the transducer; and at least one set of ports defined in an interior wall of at least one solids separation stage of the tower, wherein the at least one set of ports is positioned at anti-nodes of the standing sonic wave to recover solids concentrate from a fluid stream flowing through the tower; wherein the transducer and the reflector are linearly moveable relative to the tower to linearly move the standing sonic wave. This exemplary embodiment or another exemplary embodiment may further provide that the at least one solids separation apparatus further comprises at least one set of shutters operably engaged with the interior wall of the tower inside of the effluent outlet; wherein each shutter of the at least one set of shutters is moveable relative to the tower to control the flow rate of the fluid stream in the tower. This exemplary embodiment or another exemplary embodiment may further provide that the at least one solids separation apparatus further comprises an effluent outlet defined by the tower, wherein the effluent outlet is in fluid communication with each port of the at least one set of ports, and wherein the effluent outlet is configured to direct recovered solids concentrate from the fluid stream to at least one effluent output. This exemplary embodiment or another exemplary embodiment may further provide that the at least one solids separation apparatus further comprises at least one set of passageways defined in the interior wall, wherein each passageway of the at least one set of passageways provides fluid communication between a port of the at least one set of ports and the effluent outlet, and wherein each passage of the at least one set of passages is configured to accept solids concentrate with a first configuration. This exemplary embodiment or another exemplary embodiment may further provide a second solids dissociation apparatus operably connected with the at least one solids separation apparatus, wherein the second fluid treatment apparatus is configured to eviscerate contaminants provided in the fluid stream for a second evisceration process. This exemplary embodiment or another exemplary embodiment may further provide that the at least one solids separation apparatus further comprises a second separation process operably connected with the second fluid treatment apparatus, wherein the at least one solids separation apparatus is adapted to separate the eviscerated contaminants from the fluid stream for a second separation process.

In another aspect, an exemplary embodiment of the present disclosure may provide a method of separating contaminants from continuous fluid. The method may comprise the steps of pumping at least one continuous fluid stream into a fluid treatment apparatus, wherein the at least one continuous fluid stream includes contaminants; generating a traveling sonic wave, via a transducer of the apparatus, inside of a housing of the fluid treatment apparatus; cavitating the at least one continuous fluid stream inside of the at least one insert, wherein the at least one continuous fluid stream is isolated from the continuous sonic stream; eviscerating the contaminants in the at least one continuous fluid stream; pumping the at least one continuous fluid stream into a tower of a solids separation apparatus, wherein the fluid stream includes eviscerated contaminants of at least one configuration; generating a standing sonic wave, via a transducer of the solids separation apparatus, inside of the tower; adjusting one or both of the transducer and the reflector until the anti-nodes of the standing sonic wave are aligned with at least one set of ports defined in the tower; forcing the eviscerated contaminants of the at least one configuration, via the standing sonic wave, into the at least one set of ports of at least one removal stage of the tower; and removing the eviscerated contaminants of the at least one configuration from the fluid stream into the at least one set of ports.

This exemplary embodiment or another exemplary embodiment may further provide steps of pumping the at least one continuous fluid stream into a second fluid treatment apparatus; generating a second traveling sonic wave, via a second transducer of the second fluid treatment apparatus, inside of a second housing of the second fluid treatment apparatus; cavitating the at least one continuous fluid stream inside of a second insert, wherein the at least one continuous fluid stream is isolated from a second continuous sonic stream; and eviscerating the contaminants in the at least one continuous fluid stream. This exemplary embodiment or another exemplary embodiment may further provide a step of transferring the standing sonic wave, via a diaphragm, from the at least one solids removal stage to a second solids removal stage of the tower. This exemplary embodiment or another exemplary embodiment may further provide a step of directing the fluid stream, via at least one plumbing member, from the first solids separation stage of the tower to at least one additional solids separation stage of the tower. This exemplary embodiment or another exemplary embodiment may further provide steps of forcing eviscerated contaminants of a second configuration in the fluid stream, via the standing sonic wave, into a second set of ports of the second stage of the tower, wherein the eviscerated contaminants of a second configuration are smaller than the eviscerated contaminants of the at least one configuration; and removing the eviscerated contaminants of the second configuration from the fluid stream into second set of ports.

In another aspect, an exemplary embodiment of the present disclosure may provide a fluid cleaning system. The fluid cleaning system may comprise at least one solids dissociation apparatus adapted to receive a continuous fluid stream from a fluid source, wherein the at least one solids dissociation apparatus is configured to eviscerate contaminants provided in the fluid stream for at least one evisceration process; and at least one solids separation apparatus operably connected with the at least one fluid treatment apparatus for receiving the eviscerated contaminants provided in the fluid stream, the at least one solids separation apparatus comprising housing (tower); a transducer operably engaged with a first end of the tower, wherein the transducer is configured to generate a standing sonic wave inside of the tower; a reflector operably engaged with an opposing second end of the tower, wherein the reflector is configured to reflect the standing sonic wave towards the transducer; and at least one set of ports defined in an interior wall of at least one solids removal stage of the tower, wherein the at least one set of ports is positioned at anti-nodes of the standing sonic wave to recover solids concentrate from a fluid stream flowing through the tower; wherein the transducer and the reflector are linearly moveable relative to the tower to linearly move the standing sonic wave.

This exemplary embodiment or another exemplary embodiment may further provide that a portion of the solids separation apparatus is provided inside of the at least one solids dissociation apparatus. This exemplary embodiment or another exemplary embodiment may further provide that the at least one solids separation apparatus further comprises at least one set of shutters operably engaged with the interior wall of the tower inside of the effluent outlet; wherein each shutter of the at least one set of shutters is moveable relative to the tower to control the flow rate of the fluid stream in the tower. This exemplary embodiment or another exemplary embodiment may further provide that the at least one solids separation apparatus further comprises an effluent outlet defined by the tower, wherein the effluent outlet is in fluid communication with each port of the at least one set of ports, and wherein the effluent outlet is configured to direct recovered solids concentrate from the fluid stream to at least one effluent output. This exemplary embodiment or another exemplary embodiment may further provide that the at least one solids separation apparatus further comprises at least one set of passageways defined in the interior wall, wherein each passageway of the at least one set of passageways provides fluid communication between a port of the at least one set of ports and the effluent outlet, and wherein each passage of the at least one set of passages is configured to accept solids concentrate with a first configuration. This exemplary embodiment or another exemplary embodiment may further provide that the at least one solids dissociation apparatus further comprises a housing; at least one insert operably engaged with the housing, wherein the at least one insert is adapted to receive the continuous fluid stream; and transducer operably engaged with the housing and disposed about the at least one insert at a distance away from the said at least one insert inside of the housing, wherein the transducer is configured to create cavitation inside of the housing, via sonic waves, to eviscerate contaminants in the continuous fluid stream flowing through the at least one insert.

In another aspect, an exemplary embodiment of the present disclosure may provide a fluid treatment loop system. The fluid treatment loop system comprises an acoustic source process cell stage (SPCS), wherein the SPCS comprises: at least one solids dissociation apparatus (SDA) operatively in communication with a continuous fluid stream from a fluid source, wherein the at least one SDA comprises: a housing; at least one insert operably engaged with the housing, wherein the at least one insert is adapted to receive the continuous fluid stream; and a transducer operably engaged with the housing and disposed about the at least one insert at a distance away from said at least one insert inside of the housing, wherein the transducer is configured to create cavitation inside of the housing, via sonic waves, to dissociate contaminants in the continuous fluid stream flowing through the at least one insert; and at least one solids separation apparatus (SSA) operably connected with the at least one fluid treatment apparatus for receiving the dissociated contaminants provided in the continuous fluid stream, wherein the at least one SSA is adapted to separate the dissociated contaminants from the fluid stream for at least one separation process; at least one mining process cell stage (MPCS) operatively in communication with SPCS, wherein the at least one MPCS is adapted to receive the dissociated contaminants from the SPCS; and at least one permeate outlet operatively in communication with SPCS, wherein the at least one permeate outlet is adapted to receive the permeated water from the SPCS.

This exemplary embodiment or another exemplary embodiment may further include that the at least one SSA of the SPCS comprises: a tower; a second transducer operably engaged with a first end of the tower, wherein the transducer is configured to generate a standing sonic wave inside of the tower; a reflector operably engaged with an opposing second end of the tower, wherein the reflector is configured to reflect the standing sonic wave towards the transducer; and at least one set of ports defined in an interior wall of at least one solids separation stage of the tower, wherein the at least one set of ports is positioned at anti-nodes of the standing sonic wave to recover dissociated contaminants from the continuous fluid stream flowing through the tower; wherein the transducer and the reflector are linearly moveable relative to the tower to linearly move the standing sonic wave. This exemplary embodiment or another exemplary embodiment may further include at least one effluent connection operably connected with the at least one SSA and the at least one MPCS; wherein the at least one effluent connection transports the dissociated contaminants of the at least one treatment process from the at least one SSA to the at least one MPCS. This exemplary embodiment or another exemplary embodiment may further include that the SPCS comprises: at second SDA operably connected with the at least one SSA, wherein the at least one SDA is configured to eviscerate the contaminants in the continuous fluid stream in a second treatment process; and a second SSA operably connected with the second SDA for receiving the dissociated contaminants provided in the fluid stream, wherein the at least one SSA is configured to separate the dissociated contaminants from the continuous fluid stream and provide permeated water in the second treatment process. This exemplary embodiment or another exemplary embodiment may further include a second effluent connection operably connected with the second SSA and the at least one MPCS; wherein the second effluent connection transports the dissociated contaminants of the second treatment process from the second SSA to the at least one MPCS. This exemplary embodiment or another exemplary embodiment may further include at least one permeate connection operably connected with the at least one SSA and the at least one permeate outlet; wherein the at least one permeate outlet is adapted to transport the permeated water from the at least one SSA to the at least one permeate outlet. This exemplary embodiment or another exemplary embodiment may further include at least one freshwater channel; and at least one freshwater connection operably connected with the at least one permeate outlet and the at least one freshwater channel; wherein the at least one freshwater connection is adapted to transport the permeated water from the at least one permeate outlet to the at least one freshwater channel. This exemplary embodiment or another exemplary embodiment may further include at least one potable water channel; and at least one potable water connection operably connected with the at least one permeate outlet and the at least one potable water channel; wherein the at least one potable water connection is adapted to transport the permeated water from the at least one permeate outlet to the at least one potable water channel. This exemplary embodiment or another exemplary embodiment may further include at least one battery process cell stage (BPCS); at least one battery process connection operably connected with the at least one MPCS and the BPCS; and a first mined stream collected by the at least one MPCS; wherein the at least one battery process connection is adapted to transport the first mined stream from the at least one MPCS to the at least one BPCS. This exemplary embodiment or another exemplary embodiment may further include that the first mined stream includes a mixture of brine and sodium hydroxide. This exemplary embodiment or another exemplary embodiment may further include at least one hydrogen fuel cell generator process cell stage (GPCS); at least one battery fluid stream collected by the at least one GPCS; and at least one generator process connection operably connected with the at least one BPCS and the at least one GPCS; wherein the at least one generator process connection is adapted to transport the at least one battery fluid stream from the at least one GPCS to the at least one BPCS. This exemplary embodiment or another exemplary embodiment may further include that wherein the at least one battery fluid stream transported from the at least one BPCS to the at least one GPCS includes one of hydrogen solution and sodium hydroxide solution. This exemplary embodiment or another exemplary embodiment may further include a first battery fluid stream collected by the at least one GPCS comprising of hydrogen; a second battery fluid stream collected by the at least one GPCS comprising of sodium hydroxide; a first generator process connection operably connected with the at least one BPCS and the at least one GPCS, wherein the first generator process connection is adapted to transport the first battery fluid stream from the at least one BPCS to the at least one GPCS; and a second generator process connection operably connected with the at least one BPCS and the at least one GPCS, wherein the second generator process connection is adapted to transport the second battery fluid stream from the at least one BPCS to the at least one GPCS. This exemplary embodiment or another exemplary embodiment may further include at least one hydrogen process cell stage (HPCS); a second mined stream collected by the at least one MPCS having a mixture of brine and sodium chloride; and at least one hydrogen process connection operably connected with the at least one HPCS and the at least one MPCS; wherein the at least one hydrogen production connection is adapted to transport the second mined stream from the at least one GPCS to the at least one MPCS. This exemplary embodiment or another exemplary embodiment may further include a liquid discharge process cell stage (LPCS) operably connected with the at least one BPCS, the at least one GPCS, and the at least one HPCS; wherein the LPCS is configured to receive to at least one brine stream from each of the at least one BPCS, the at least one GPCS, and the at least one HPCS; wherein the LPCS is configured to remove brine in the at least one brine stream from each of the at least one BPCS, the at least one GPCS, and the at least one HPCS. This exemplary embodiment or another exemplary embodiment may further include a concentrate connection operably connecting the at least one SPCS with each of the at least one BPCS, the at least one GPCS, the at least one HPCS, and the LPCS; wherein the concentrate connection is configured to transport concentrate brine removed in the at least one brine stream from each of the at least one BPCS, the at least one GPCS, and the at least one HPCS to the at least one SPCS. This exemplary embodiment or another exemplary embodiment may further include that wherein the fluid treatment loop system is adapted to be operatively connected with a preexisting desalination process.

In another aspect, an exemplary embodiment of the present disclosure may provide a method. The method comprises steps of pumping a continuous fluid stream, via a fluid source, into a solids dissociation apparatus (SDA) of an acoustic source process cell stage (SPCS); generating a traveling sonic wave, via a transducer of the SDA, inside of a housing of the fluid treatment apparatus; cavitating the continuous fluid stream inside of at least one insert of the SDA, wherein the at least one continuous fluid stream is isolated from the continuous sonic stream; dissociating contaminants, via the transducer of the SDA, from the continuous fluid stream; pumping the continuous fluid stream into a tower of a solids separation apparatus (SSA) of the SPCS, wherein the fluid stream includes the dissociated contaminants; removing the dissociated contaminants, via the SSA of the SPCS, from the continuous fluid stream; outputting the dissociated contaminants, via an effluent connection, to at least one mining process cell stage (MPCS); and outputting permeate water, via a permeate connection, to one of at least one permeate output and at least one freshwater output.

This exemplary embodiment or another exemplary embodiment may further include steps of generating a standing sonic wave, via a transducer of the SSA, inside of the tower; adjusting one or both of the transducer and the reflector until the anti-nodes of the standing sonic wave are aligned with at least one set of ports defined in the tower; and forcing the dissociated contaminants, via the standing sonic wave, into the at least one set of ports of at least one removal stage of the tower of the SSA. This exemplary embodiment or another exemplary embodiment may further include steps of mining at least one mineral, via the at least one MPCS, from the dissociated contaminants, wherein the at least one mineral is a mixture of brine and sodium chloride; and outputting the at least one mineral, via at least one battery process connection, to at least one battery process cell stage (BPCS). This exemplary embodiment or another exemplary embodiment may further include steps of mining at least another mineral, via the at least one MPCS, from the dissociated contaminants, wherein the at least another mineral is a mixture of brine and sodium chloride; and outputting the at least another mineral, via at least one generator process connection, to at least one hydrogen production stage (HPCS). This exemplary embodiment or another exemplary embodiment may further include steps of outputting a first battery fluid stream, via a first generator process connection, from the at least one GPCS to the at least one BPCS, wherein the first battery fluid includes hydrogen; and outputting a second battery fluid stream, via a second generator process connection, from the at least one GPCS to the at least one BPCS, wherein the second battery fluid includes sodium hydroxide. This exemplary embodiment or another exemplary embodiment may further include a step of outputting at least one hydrogen stream, via at least one hydrogen production connection, from the at least one HPCS to the at least one GPCS. This exemplary embodiment or another exemplary embodiment may further include a step of outputting at least one brine stream, via at least one brine stream connection, from at least one of the at least one BPCS, the at least one GPCS, and the at least one HPCS to a liquid discharge process cell stage (LPCS). This exemplary embodiment or another exemplary embodiment may further include a step of outputting at least one freshwater stream from the LPCS to the at least one freshwater output. This exemplary embodiment or another exemplary embodiment may further include a step of outputting concentrate brine, via at least one concentrate brine connection, from the LPCS to the at least one SPCS. This exemplary embodiment or another exemplary embodiment may further include a step of powering at least one of the at least one SPCS, the at least one BPCS, the at least one GPCS, and the at least one HPCS, via at least one electrical connection, from an electrical controller.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 5A is a diagrammatic sectional view of an alternative SDA of another fluid cleaning system.

Similar numbers refer to similar parts throughout the drawings.

DETAILED DESCRIPTION

Figure 1A:
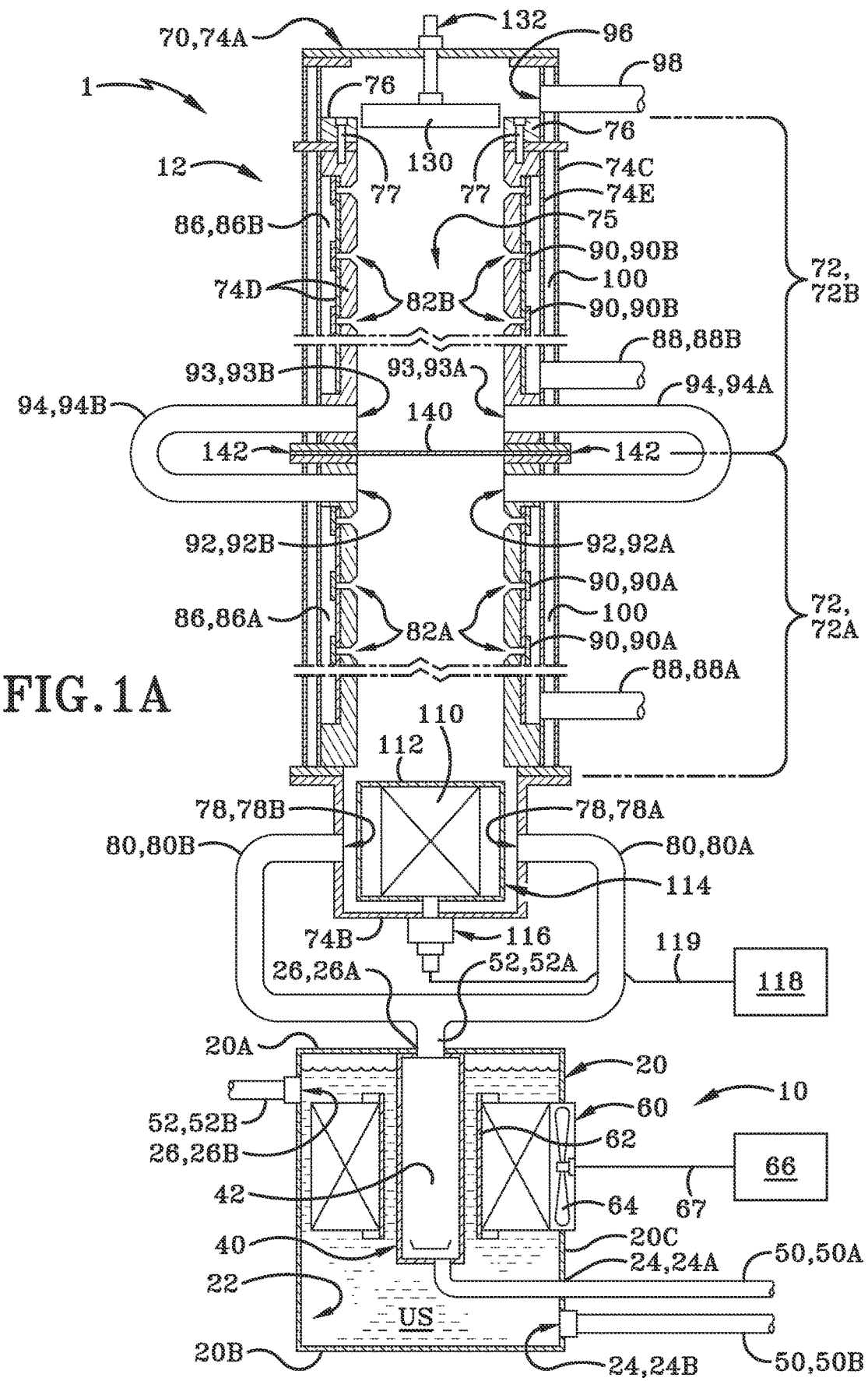
FIG. 1A is diagrammatic sectional view of a fluid cleaning system having a solids dissociation apparatus (SDA) and a solids separation apparatus (SSA).

FIGS. 1A-1B, 2, 3, and 4A-4B illustrate a fluid treatment system generally referred to as 1. The fluid treatment system 1 may include at least one solids dissociation apparatus (or "SDA" hereinafter) which is generally referred to as 10. The at least one solids dissociation apparatus 10 is configured to dissociate and/or disintegrate complex substances or solids into simpler constituents and/or elements. In other words, the at least one solids dissociation apparatus 10 is configured to eviscerate and/or break up complex substances found in a fluid source for cleaning and decontaminating said fluid source. Such dissociation of complex substances and solids via the at least one solids dissociation apparatus 10 is described in more detail below.

The fluid treatment system 1 may also include at least one solids separation apparatus (or hereinafter "SSA") which is generally referred to as 12. The at least one solids separation apparatus 12 is operably engaged with the at least one solids dissociation apparatus 10 where the at least one SDA 10 and the at least one SSA 12 are in fluid communication with one another. Due to this fluid communication, the at least one SSA 12 is configured to separate simple constituents (i.e., dissociated complex substances) from the fluid stream subsequent to the dissociation operation caused by the at least one SDA 10. Such separation of simple constituents from the fluid stream via the at least one solids separation apparatus 12 is described in more detail below.

The complex substances, contaminants, or solids referenced herein that are dissociated and/or disintegrated into simple constituents by the at least one SDA 10 and separated from a fluid stream (e.g., a water source or other types of fluid of the like) by the at least SSA 12 may be any complex substances or solids found in said fluid source. The constituents may be totally dissolved solids (e.g., totally dissolved minerals and salts in the fluid) and may be totally suspended solids (e.g., solids that float or suspend in water and affect the turbidity and/or transparency of the water). Examples of complex substances or solids that may be dissociate and/or disintegrated by at least one SDA include microorganisms (e.g., Dinoflagellates (ceratium), Rotifers, Copepod Adults, Copepodites, Copepod Nauplii, Bivalve Larve, Cladocerans, Polychaete Larve, Ostracods, Protozoan, Decapod Larve, *Staphylococcus, E. coli*, substantially all bacteria, molds, and/or viruses), chemical compounds (e.g., nitrate compounds to manufacture fertilizer, oil compounds, and other of the like), and solids provided in seawater (e.g., salt solids, sediment, clay, sand, minerals, metals, and other solids of the like found in seawater). Moreover, the at least one SDA 10 may be configured to neutralize basic and acidic compounds through its dissociation and disintegration capabilities.

As described herein, the term "fluid" herein is a substance, as a fluid or a gas, that is capable of flowing and capable of changing its shape at a steady rate when acted upon by a force tending to changes its shape. As such, any fluid known may be used herein when experiencing the at least one SDS 10 and the at least one SSA 12.

It should be understood that FIGS. 1A-1B, 2, 3, and 4A-4B are diagrammatic only for the fluid treatment system 1 and do not illustrate exact and precise dimensions of any component, assembly, or apparatus provided herein. Such diagrammatic illustrations of the at least one SDA 10 and the at least one SSA 12 of the fluid treatment system 1 shown in FIGS. 1A-1B, 2, 3, and 4A-4B should not limit the exact positioning, orientation, or location of the at least one SDA 10 and the at least one SSA 12 relative to one another.

As illustrated in FIGS. 1A-1B and 4A-4B, the fluid treatment system 1 includes a single SDA 10 operably engaged with a single SSA 12 for treating a continuous fluid stream. The continuous fluid stream is denoted by arrows labeled "LS" in FIGS. 1B, 2 and 3. In other exemplary embodiments, any suitable number of SDAs and SSAs may be used in a fluid treatment system, which is described in more detail below.

While the SDA 10 and the SSA 12 are oriented in upright, vertical positions as illustrated in FIGS. 1A-1B, 2, 3, and 4A-4B, the SDA 10 and the SSA 12 may be oriented in any suitable position. In one exemplary embodiment, at least one SDA and at least one SSA of a fluid treatment system may be oriented in lateral, horizontal position. In another exemplary embodiment, at least one SDA of a fluid treatment system may be oriented in a first position (upright, vertical position) and at least one SSA of the fluid treatment system may be oriented in a second position (lateral, horizontal position). In another exemplary embodiment, at least one SDA and at least one SSA of a fluid treatment system may be oriented in any suitable position based on the particular application of said fluid treatment system.

Figure 1B:
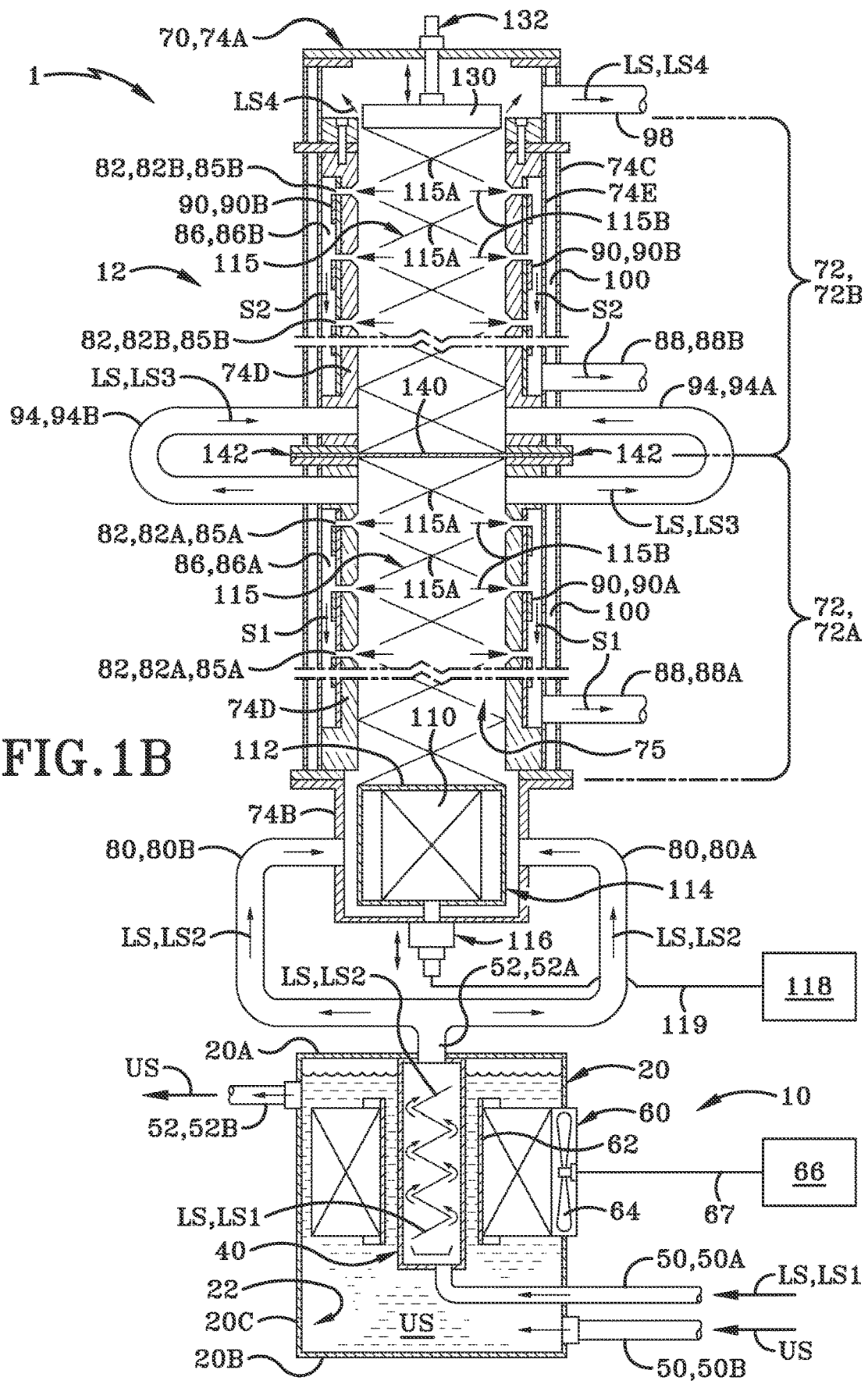
FIG. 1B is a diagrammatic sectional view of the fluid cleaning system similar to FIG. 1A, with the fluid cleaning system performing a fluid cleaning operation for a continuous fluid stream.
Figure 2:
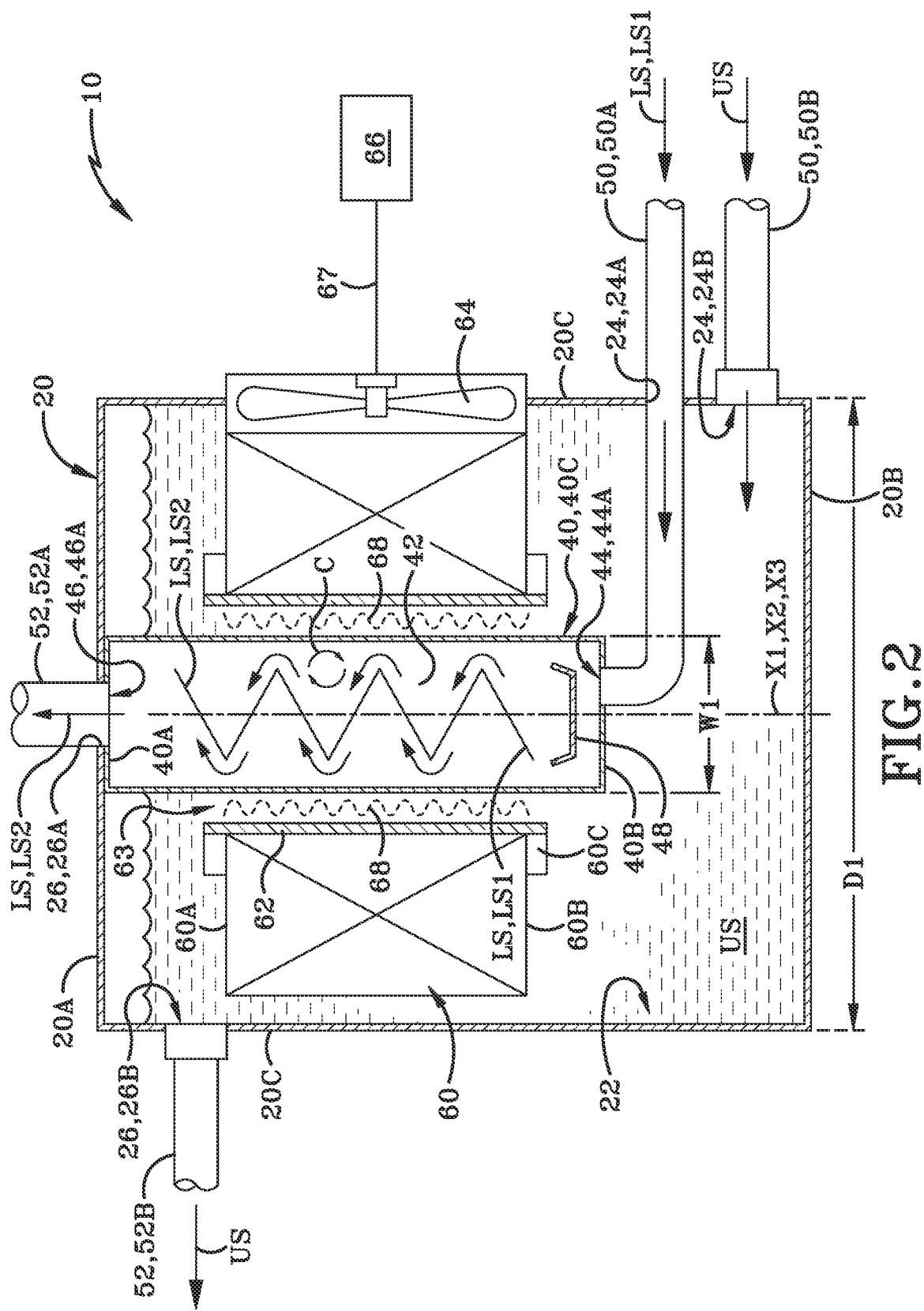
FIG. 2 is a diagrammatic sectional view of the SDA of the fluid cleaning system shown in FIG. 1A.

As illustrated in FIGS. 1A-2, the SDA 10 includes a housing 20. The housing 20 has a first or top wall 20A, an opposing second or bottom wall 20B, and a longitudinal axis "X1" defined therebetween. The housing 20 also includes a circumferential wall 20C that extends between the top wall 20A and the bottom wall 20B along an axis parallel with the longitudinal axis "X1" of the housing 20. The circumferential wall 20C also defines diameter or width "D1" that is continuous between the top and bottom walls 20A, 20B as shown in FIG. 2. In the illustrated embodiment, the housing 20 is tubular and/or cylindrically-shaped. In other exemplary embodiments, a housing may have any shape or configuration based on various considerations. Examples of suitable shapes or configuration for a housing include spherical, cubical, cuboidal, conical, triangular, torus-shaped, pyramidal, polyhedron-shaped, and other suitable shapes or configuration for a housing of a SDA.

Referring to FIG. 2, the housing 20 also defines a pressurized reservoir 22 that is collectively defined by the top wall 20A, the bottom walls 20B, and the circumferential wall 20C. In one exemplary embodiment, the pressurized reservoir 22 may be held at a pressure that is greater than the surrounding atmospheric pressure for various process reasons, which are described in more detail below. In another exemplary embodiment, the pressurized reservoir 22 may be held at a pressure that is less than the surrounding atmospheric pressure. In another exemplary embodiment, the pressurized reservoir 22 may be held at a pressure that is substantially equal to the surrounding atmospheric pressure. The housing 20 also defines at least one inlet 24 that allows fluid communication between the pressurized reservoir 22 and the external environment without depressurizing the pressurized reservoir 22. In the illustrated embodiment, the housing 20 defines a first inlet 24A at a first position in the circumferential wall 20C between the top and bottom ends 20A, 20B. The housing 20 also defines a second inlet 24B at a second position in the circumferential wall 20C between the top and bottom ends 20A, 20B. In the illustrated embodiment, the first and second inlets 24A, 24B are defined proximate to the bottom end 20B. Such uses of the first and second inlets 24A, 24B defined in the housing 20 are described in more detail below.

While the first and second inlets 24A, 24B of the housing 20 are defined at first and second positions in the circumferential wall 20C, first and second inlets of a housing may be defined along any portion of the housing. In one exemplary embodiment, first and second inlets of a housing may be defined in a bottom wall of the housing. In another exemplary embodiment, first and second inlets of a housing may be defined in a top wall of the housing. In another exemplary embodiment, a first inlet of a housing may be defined in a first wall of the housing and the second inlet of a housing may be defined a second different wall of the housing.

Still referring to FIG. 2, the housing 20 also defines at least one outlet 26 that allows fluid communication between the pressurized reservoir 22 and the external environment without depressurizing the pressurized reservoir 22. In the illustrated embodiment, the housing 20 defines a first outlet 26A in the top wall 20A to provide fluid communication between the pressurized reservoir 22 and the external environment without depressurizing the pressurized reservoir 22. The housing 20 also defines a second outlet 26B at a third positioning the circumferential wall 20C opposite to the second position of the second inlet 24B between the pressurized reservoir 22 and the external environment without depressurizing the pressurized reservoir 22. Such uses of the first and second outlets 26A, 26B defined in the housing 20 are described in more detail below.

While the first outlet 26A is defined in the top wall 20A and the second outlet 26B is the circumferential wall 20C, first and second outlets of a housing may be defined in any portion of the housing. In one exemplary embodiment, first and second outlets of a housing may be defined in a bottom wall of the housing. In another exemplary embodiment, first and second outlets of a housing may be defined in a top wall of the housing. In another exemplary embodiment, first and second outlets of a housing may be defined in a circumferential wall of the housing. In another exemplary embodiment, a first outlet of a housing may be defined a first wall of the housing and the second outlet of a housing may be defined a second different wall of the housing.

Still referring to FIG. 2, the SDA 10 also includes at least one insert 40. The at least one insert 40 is operably engaged with the housing 20 inside of the pressure reservoir 22. In the illustrated embodiment, the at least one insert 40 is operably engaged with an interior surface of the top wall 20A of the housing 20. In other exemplary embodiments, at least one insert may be operably engaged with any portion of the housing, more particularly an interior surface of any portion of the housing. In addition, the at least one insert 40 is configured to receive a continuous fluid stream "LS" from an external fluid source to help isolate dissociation and disintegration of complex substances and solids. Such dissociation and disintegration of complex substances and solids inside of the at least one insert 40 is described in more detail below.

In the illustrated embodiment, the insert 40 is a made and/or formed of a flexible, resilient material that is able to deform when pressure is applied to the insert 40, which is described in more detail below. In other exemplary embodiments, an insert described and illustrated herein may be made and/or formed of a rigid, resilient material.

As illustrated in FIG. 2, the SDA 10 includes a single insert to help isolate dissociation and disintegration of complex substances and solids. In other exemplary embodiments, any suitable number of inserts may be used in a SDA to help isolate dissociation and disintegration of complex substances and solids, which is described in more detail below.

Referring to FIG. 2, the insert 40 includes a first or upper wall 40A, an opposing second or bottom wall 40B, and a longitudinal axis "X2" defined therebetween. As shown in FIG. 2, the longitudinal axis "X2" of the insert 40 is parallel with the longitudinal axis "X1" of the housing 20. The insert 40 also includes a peripheral wall 40C that extends between the upper wall 40A and the lower wall 40B along an axis parallel with the longitudinal axis "X2" of insert 40. The peripheral wall 40C also defines a diameter or width "W1" as shown in FIG. 2. In the illustrated embodiment, the insert 40 is tubular and/or cylindrically-shaped. In other exemplary embodiments, an insert may have any shape or configuration based on various considerations. Examples of suitable shapes or configuration for an insert include spherical, cubical, cuboidal, conical, triangular, torus-shaped, pyramidal, polyhedron-shaped, and other suitable shapes or configuration for an insert of a SDA.

Still referring to FIG. 2, a fluid passage 42 is collectively defined by the upper wall 40A, the lower wall 40B, and the peripheral wall 40C of the insert 40. The fluid passage 42 is accessible via at least one inlet opening 44 and at least one outlet opening 46. In the illustrated embodiment, the fluid passage 42 is accessible via an inlet opening 44A defined in the lower wall 40B of the insert 40. The fluid passage 42 is accessible via an outlet 46A defined in the upper wall 40A of the insert 40. Such uses of the inlet opening 44A and the outlet opening 46A are described in more detail below.

While the first inlet 44A is defined in the lower wall 40B of the insert 40 and the first outlet 46A is defined in the upper wall 40A, a first inlet and a first outlet of an insert may be defined in any portion of the insert. In one exemplary embodiment, a first inlet and a first outlet of an insert may both be defined in a bottom wall of the insert. In another exemplary embodiment, a first inlet and a first outlet of an insert may both be defined in a top wall of the insert. In another exemplary embodiment, a first inlet and a first outlet of an insert may both be defined in a peripheral wall of the insert. In another exemplary embodiment, a first inlet of an insert may be defined in a first wall of the insert and a first outlet of an insert may be defined in a second different wall of the insert.

Still referring to FIG. 2, the insert 40 may also include a flow director or baffle 48. The flow director 48 is operably engaged with the peripheral wall 40C of the insert 40 proximate to the lower wall 40B and the first inlet 44A of the insert 40. As described in more detail below, the flow director 48 creates a specific flow to a continuous fluid stream "LS" that is pumped into the insert 40. In this illustrated embodiment, the flow director 48 creates a non-laminar flow pattern on the continuous fluid stream "LS" shown in FIGS. 1B and 2. In other exemplary embodiments, a flow director or baffle may be omitted from an insert. The use of the flow director 48 is considered advantageous at least because the flow pattern caused by the flow direction 48 on the continuous fluid stream "LS" creates a longer dwell time on the continuous fluid stream "LS" to travel through the insert 40. Such dwell time allows the continuous fluid stream "LS" to experience more cavitation inside of the insert 40 to further dissociate and/or disintegrate complex contaminants in the continuous fluid stream "LS", which is described in more detail below.

While a single flow director 48 is provided with the insert 40, any suitable number of flow directors may be installed in an insert for various considerations, including the desired dwell time of the continuous fluid stream inside of the insert, the intensity and desired turbulence of a continuous fluid stream, and other various considerations. While a flow director 48 is positioned proximate to the first inlet 44A of the insert 40, a flow director may be positioned along any suitable position inside of an insert for various considerations, including the desired dwell time of the continuous fluid stream inside of the insert, the intensity and desired turbulence of a continuous fluid stream, and other various considerations.

Still referring to FIG. 2, at least one inlet connection 50 may be operably engaged with the housing 20 and/or insert 40 for delivering a continuous fluid stream "LS" or a continuous sonic optimization fluid stream "US" for dissociation operations. In the illustrated embodiment, a first inlet connection 50A is operably engaged with the housing 20, via the first inlet 24A, and operably engaged with the insert 40, via the first inlet opening 44A. As shown in FIG. 2, the first inlet connection 50A is configured to direct the continuous fluid stream "LS" pumped from a fluid source (i.e., a body of water or fluid) and into the fluid passage 42 of the insert 40 via the fluid communication between the first inlet connection 50A and the insert 40. In addition, a second inlet connection 50B is operably engaged with the housing 20 via the second inlet 26A. As shown in FIG. 2, the second inlet connection 50B is configured to direct the continuous sonic optimization fluid stream "US" pumped from a sonic optimization fluid source and into the pressurized reservoir 22 of the housing 20 via the fluid communication between the second inlet connection 50B and the housing 20. As illustrated in FIG. 2, the first inlet connection 50A isolates the continuous fluid stream "LS" from the continuous sonic optimization fluid stream "US" pumped into the pressure reservoir 22 to prevent any mixing of or interaction between the continuous fluid stream "LS" and the continuous sonic optimization fluid stream "US" during dissociation processes, which is described in more detail below.

Still referring to FIG. 2, at least one outlet connection 52 may be operably engaged with the housing 20 and/or insert 40 for delivering a continuous fluid stream "LS" with dissociated substances and/or solids or delivering a continuous sonic optimization fluid stream "US" from the housing 20 for dissociation purposes. In the illustrated embodiment, a first outlet connection 52A is operably engaged with the housing 20, via the first outlet 26A, and operably engaged with the insert 40 via the first outlet opening 46A. As shown in FIG. 2, the second outlet connection 52A is configured to direct the continuous fluid stream "LS" with dissociated substances and/or solids from the fluid passage 42 of the insert 40 to an output device. In one exemplary embodiment, an output device may be a solids separation apparatus, such as SSA 12, for separating the dissociated substances and/or solids from the continuous fluid stream for purification/cleaning purpose. In another exemplary embodiment, an output device may be a waste facility for receiving dissociated substances and/or solids. In another exemplary embodiment, an output device may be another solids dissociation apparatus, such as SDA 10, for providing another process of dissociation.

Still referring to FIG. 2, a second outlet connection 52B is operably engaged with the housing 20 via the second outlet 26B. The second outlet connection 52B is configured to direct the continuous sonic optimization fluid stream "US" from the pressurized reservoir 22 of the housing 20 to a sonic optimization fluid output device or to the original sonic inlet device. Such pumping and removing of sonic optimization fluid "US" allows for a continuous flow of sonic optimization fluid into the pressure reservoir 22 for adequate generation of sonic waves during dissociation processes, which is described in more detail below.

Still referring to FIG. 2, the SDA 10 also includes at least one transducer 60 operably engaged inside of the housing 20. In particular, the transducer 60 is operably engaged with the circumferential wall 20C of the housing 20 inside of the pressured reservoir 22 of said housing 20. In the illustrated embodiment, the at least one transducer 60 includes a first or top end 60A, an opposing second or bottom end 60B, and a longitudinal axis "X3" extending between the top and bottom ends 60A, 60B of the transducer 60. The longitudinal axis "X3" of the transducer 60 is parallel with the longitudinal axes "X1", "X2" of the housing 20 and the inlet 40.

Still referring to FIG. 2, the at least one transducer 60 includes a collar 60C extending between the top and bottom end 60A, 60B of the at least one transducer 60. The at least one transducer 60 also defines a reflector plate 62 operably engaged with the collar 60C for allowing the transducer to generate sonic waves inside of the housing 20 via the sonic optimization fluid stream "US", which is described in more detail below. As illustrated in FIG. 2, the collar 60C and the reflector plate 62 collectively define a passageway 63 extending between the top and bottom ends 60A, 60B of the transducer 60 along an axis parallel with the longitudinal axis "X3" of the at least one transducer 60. The at least one transducer 60 includes a heat exhaust fan 64 to disseminate heat generated by the transducer when generating sonic waves inside of the housing 20.

As illustrated in FIG. 2, a single transducer 60 is provided with the SDA 1 in this embodiment. In other exemplary embodiments, any suitable number of transducers may be provided in a SDA for various considerations, including the size, shape, and configuration of an SDA.

As illustrated in FIGS. 1B and 2, the transducer 60 may be operatively connected with a generator 66 via an electrical connection or wire 67. The connection between the transducer 60 and the generator 66 allows the transducer 60 to send a traveling sonic wave 68 inside of the housing 20 and against the insert 40 for creating cavitation and causing dissociation and/or evisceration of the complex substances into simple substances, which is described in more detail below. The generator 66 may be any suitable generator that is capable of generating a range of frequencies to cause a transducer to create cavitation resulting in dissociation and/or evisceration of complex substances into simple substances. In one exemplary embodiment, a suitable range of frequency generated by a generator for creating cavitation and causing dissociation and/or evisceration of complex substances into simple constituents is a frequency range from about 3 kHz up to about 200 kHz.

Referring to FIG. 2, the transducer 60 is disposed about a portion of the insert 40 via the passageway 63 defined collectively by the collar 60C and the reflector plate 62. In the illustrated embodiment, the transducer 60 is disposed at a distance away from the insert 40. In one example, the insert 40 and the transducer 60 may be disposed at a distance of about at least one-half wavelength of a frequency of the sonic waves transmitted by the transducer 60. Such configuration of the insert 40 inside of the transducer 60 allows the transducer 60 to direct and send the traveling sonic wave 68 against the insert 40 to cause cavitation inside of said insert 40 during dissociation operations. Here, the traveling sonic wave 68 generated by the transducer 60, via power from the generator 66, creates a first or primary cavitation in the continuous sonic optimization fluid stream "US" inside of the passageway 63 of the transducer 60. This cavitation remains inside of the passageway 63 of the transducer 60 until the transducer 60 is powered off. Upon this cavitation, the energy on the sonic optimization fluid stream "US" creates micro-mechanical implosions on the sonic fluid stream.

Upon this cavitation, a second or secondary cavitation occurs inside of the insert 40 upon the continuous fluid stream "LS" via the traveling sonic wave 68 generated by the transducer 60. As shown in FIG. 2, traveling sonic wave 68 penetrates against the outer wall of the insert 40 causing the second cavitation to occur on the continuous fluid stream "LS" as said continuous fluid stream "LS" flows through the insert 40. The second cavitation caused by sonic waves generated by the transducer 60 is denoted by rotating arrows labeled "C" in FIG. 2. As described in more detail below, the combination of both non-laminar flow and the second cavitation "C" on the continuous fluid stream "LS" allow for dissociation and/or disintegration of the complex substances and solids provided in the continuous fluid stream "LS." As the complex substances and solids reach the first outlet 46A of the inlet 40, substantially all or all of the complex substances and solids are dissociated in that the complex substances are simple constituents that no longer making up a specific substance or solid recognized prior to such dissociation operations.

The configuration of the SDA 10 is considered advantageous at least because the cavitation's caused by the traveling sonic wave 68, via the wave frequency generated by the generator 66, is able to dissociate complex substances of the continuous fluid stream "LS" into simple constituents when being bombarded with the traveling sonic wave 68 of the transducer 60. The cavitation created by the transducer 60 produces cavitation with pressures of at least 20,000 psi and with temperatures of at least 10,000 degrees Fahrenheit with each cavitation energy implosion occurring every wave cycle (e.g., every second). Moreover, the configuration of the SDA 10 is considered advantageous at least because the cavitation caused by the traveling sonic wave 68, via the wave frequency generated by the generator 66, is able to create a uniform cavitation in the continuous fluid stream "LS" for dissociating the complex substances of the continuous fluid stream "LS" into simple constituents.

In the illustrated embodiment, the traveling sonic wave 68 transmitted by the transducer 60 is provided in a sinusoidal wave form. In other exemplary embodiments, a transducer may transmit a traveling sonic wave having any suitable wave form to create cavitation inside of a housing and inside of an insert of a SDA. Examples of suitable wave forms to create cavitation inside of a housing and inside of an insert of a SDA include square wave form, a triangle wave form, a saw tooth wave form, or other suitable waveforms to create cavitation inside of a housing and inside of an insert of a SDA.

In the illustrated embodiment, the transducer 60 of the SDA 10 may be constructed of any suitable materials for transmitting a traveling sonic wave (such as traveling sonic wave 68) inside of the housing 20. In one exemplary embodiment, a transducer of a SDA may be constructed of magnetostrictive-type construction with magnetostrictive materials. In another exemplary embodiment, a transducer of a SDA may be constructed of a electrostrictive-type construction with piezoelectric or electrostrictive materials. In another exemplary embodiment, a transducer of a SDA may be constructed of smart materials. In another exemplary embodiment, a transducer of a SDA may be constructed of ferromagnetic materials.

Figure 3:
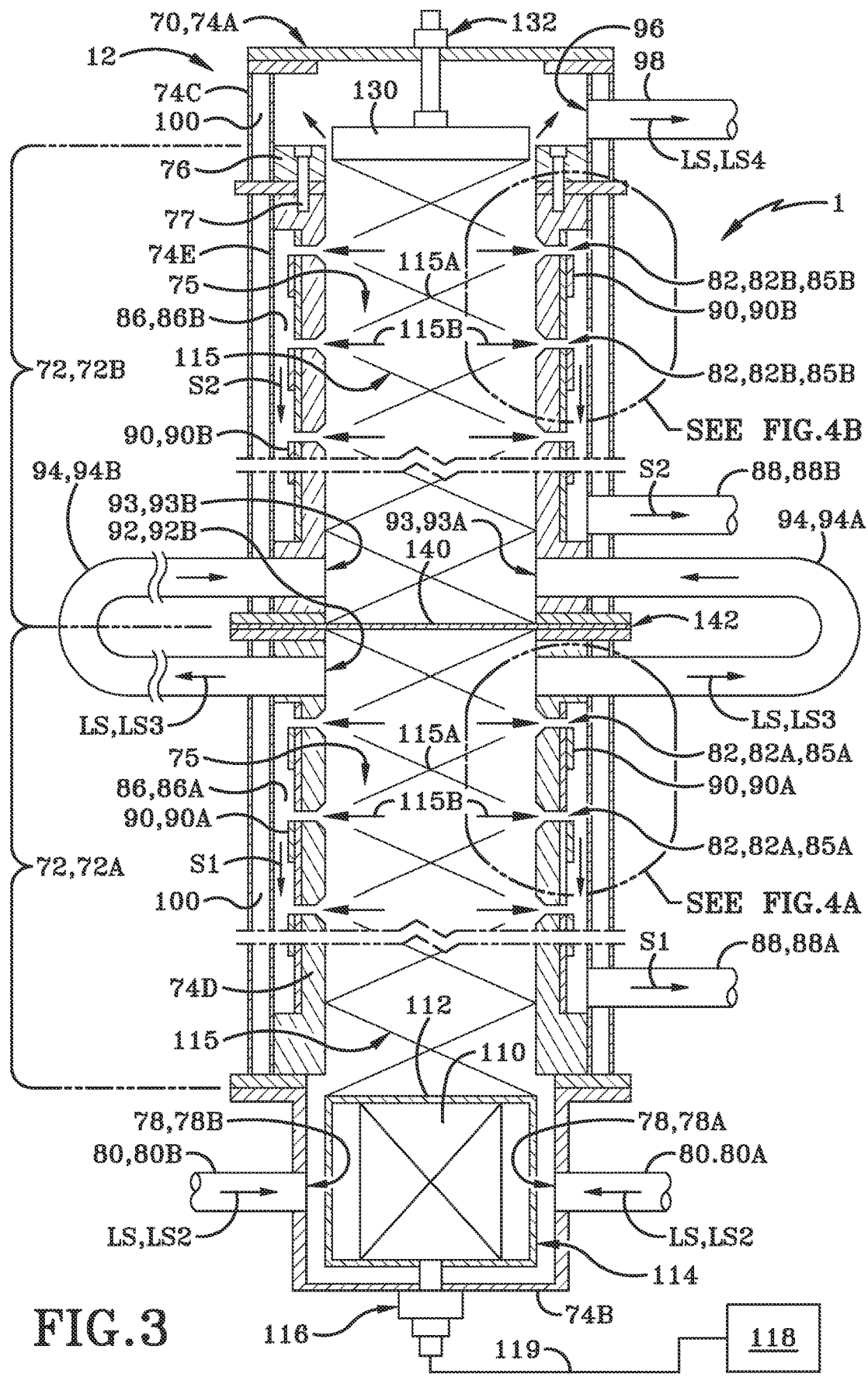
FIG. 3 is a diagrammatic sectional view of the SSA of the fluid cleaning system shown in FIG. 1B.

Referring to FIGS. 1A-1B and 3, the SSA 12 may include a column or tower 70 operably connected with the SDA 10. The tower 70 includes at least one stage 72 for separating or removing the simple constituents dissociated by the SDA 10. In the illustrated embodiment, the tower 70 includes a first stage 72A for removing a first set of simple constituents from the fluid stream "LS" and a second stage 72B for removing a second set of simple constituents from the fluid stream "LS" where the second set of simple constituents have a smaller configuration than the first set of simple constituents. Such removal of first and second sets of constituents from the fluid stream is described in more detail below. The first and second stages 72A, 72B of the tower 70 are similar to one another, except as detailed below. Inasmuch as the first and second stages 72A, 72B are similar, the following description will relate to the first stage 72A. It should be understood, however, that the description of the first stage 72A applies substantially equally to the second stage 72B, except as detailed below.

Referring to FIGS. 1A-1B and 3, the tower 70 includes a top or first wall 74A, an opposing bottom or second wall 74B, and a longitudinal axis defined therebetween. The tower 70 also includes a first or exterior circumferential wall 74C extending along the longitudinal axis of the tower 70 between the top wall 74A and the bottom wall 74B. The tower 70 also includes a second or interior circumferential wall 74D extending along the longitudinal axis of the tower 70 between the top wall 74A and the bottom wall 74B. The tower 70 also includes a third or medial circumferential wall 74E extending along the longitudinal axis of the tower between the top wall 74A and the bottom wall 74B. The medial circumferential wall 74E is positioned between the exterior circumferential wall 74C and the interior circumferential wall 74D. The top wall 74A, the bottom wall 74B, and the interior circumferential wall 74D collectively define a pressurized chamber 75 that extends along the longitudinal axis of the tower 70. In one exemplary embodiment, the pressurized chamber 75 may be held at a pressure that is greater than the surrounding atmospheric pressure for various process reasons, which are described in more detail below. In another exemplary embodiment, the pressurized chamber 75 may be held at a pressure that is less than the surrounding atmospheric pressure. In another exemplary embodiment, the pressurized chamber 75 may be held at a pressure that is substantially equal to the surrounding atmospheric pressure.

Referring to FIG. 1A, the tower 70 may include a peripheral engagement wall 76 that operably engages with each of the exterior circumferential wall 74A, the interior circumferential wall 74B, and the medial circumferential wall 74C via attachment mechanisms 77 (e.g., a connector and a nut). Such use of the peripheral engagement wall 76 with attachment mechanisms 77 provides a structural configuration to hold each of the exterior circumferential wall 74A, the interior circumferential wall 74B, and the medial circumferential wall 74C together. In one exemplary embodiment, any suitable number of peripheral engagement walls may be used to provide additional support between an exterior circumferential wall, an interior circumferential wall, and a medial circumferential wall.

Still referring to FIGS. 1A-1B through 3, the tower 70 may define at least one fluid stream inlet 78 defined in the bottom wall 74B of the tower 70. The at least one fluid stream inlet 78 may be configured to allow at least one inlet connection 80 to be operably engaged with the tower 80 to allow the continuous fluid stream "LS" to be directed from the SDA 10 to the SSA 12 for separating the simple constituents from said fluid stream "LS." In the illustrated embodiment, a first fluid stream inlet 78A is defined in the bottom wall 74B of the tower 70. The first fluid stream inlet 78A is configured to allow a first inlet connection 80A to be operably connected with the tower 70 to allow the fluid stream "LS" to flow from the SDA 10 into the SSA 12 (see FIG. 1B). Additionally, a second fluid stream inlet 78B is defined in the bottom wall 74B of the tower 70 where the second fluid stream inlet 78B is coaxial with the first fluid stream inlet 78A. The second fluid stream inlet 78B is configured to allow a second inlet connection 80B to be operably connected with the tower 70 to allow the fluid stream "LS" to flow from the SDA 10 into the SSA 12 (see FIG. 1B).

As illustrated herein, the first outlet connection 52A of the SDA 10 may be continuous with the first and second inlet connections 80A, 80B of the SSA 12 such that the connections 52A, 80A, 80B are a single unitary connection. In other exemplary embodiments, a first outlet connection of a SDA may be coupled with first and second inlet connections of a SSA via various coupling devices and/or connectors (e.g., pipe couplers, flanges, valves, etc.)

Figure 4A:
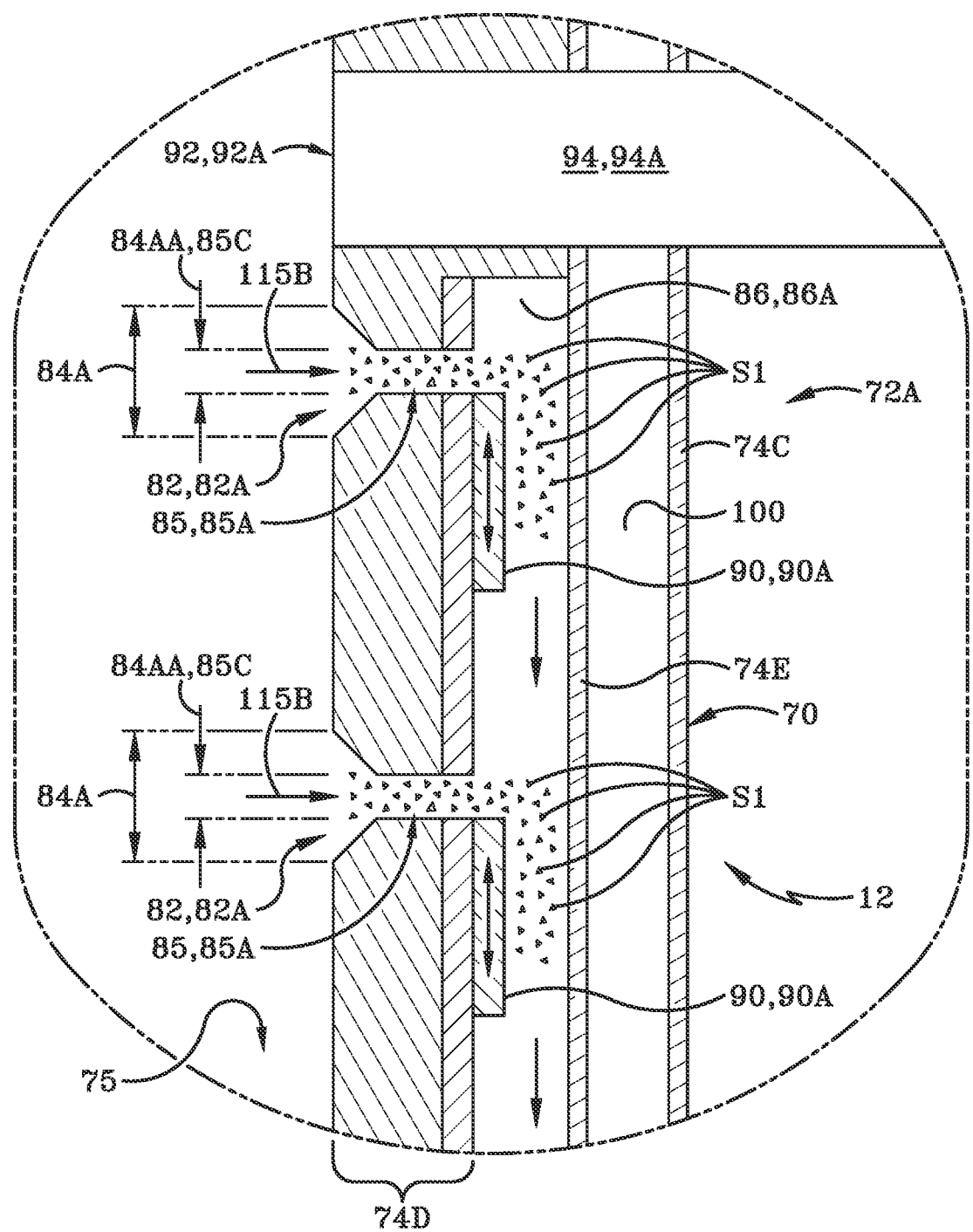
FIG. 4A is an enlargement view of the highlighted region shown in FIG. 3.

Referring to FIG. 3, the tower 70 may define at least one set of ports 82 in the interior circumferential wall 74D of at least one stage 72 of said tower 70. In the illustrated embodiment, the tower 70 defines a first set of ports 82A in the interior circumferential wall 74D of the first stage 72A of said tower 70. As illustrated in FIG. 4A, each port of the first set of ports 82A includes a first diameter 84A defined in the interior circumferential wall 74D along the inner surface of the interior circumferential wall 74D proximate to the pressurized chamber 75. Still referring to FIG. 4A, each port of the first set of ports 82A also includes a second diameter 84AA defined in the interior circumferential wall 74A inside of the interior circumferential wall 74D remote from the pressurized chamber 75; the second diameter 84AA is less than the first diameter 84A. As such, the first set of ports 82A defined by the interior circumferential wall 74D are V-shaped or funnel-shaped in which the first diameter 84A of each port 82A tapers to the second diameter 84AA.

Figure 4B:
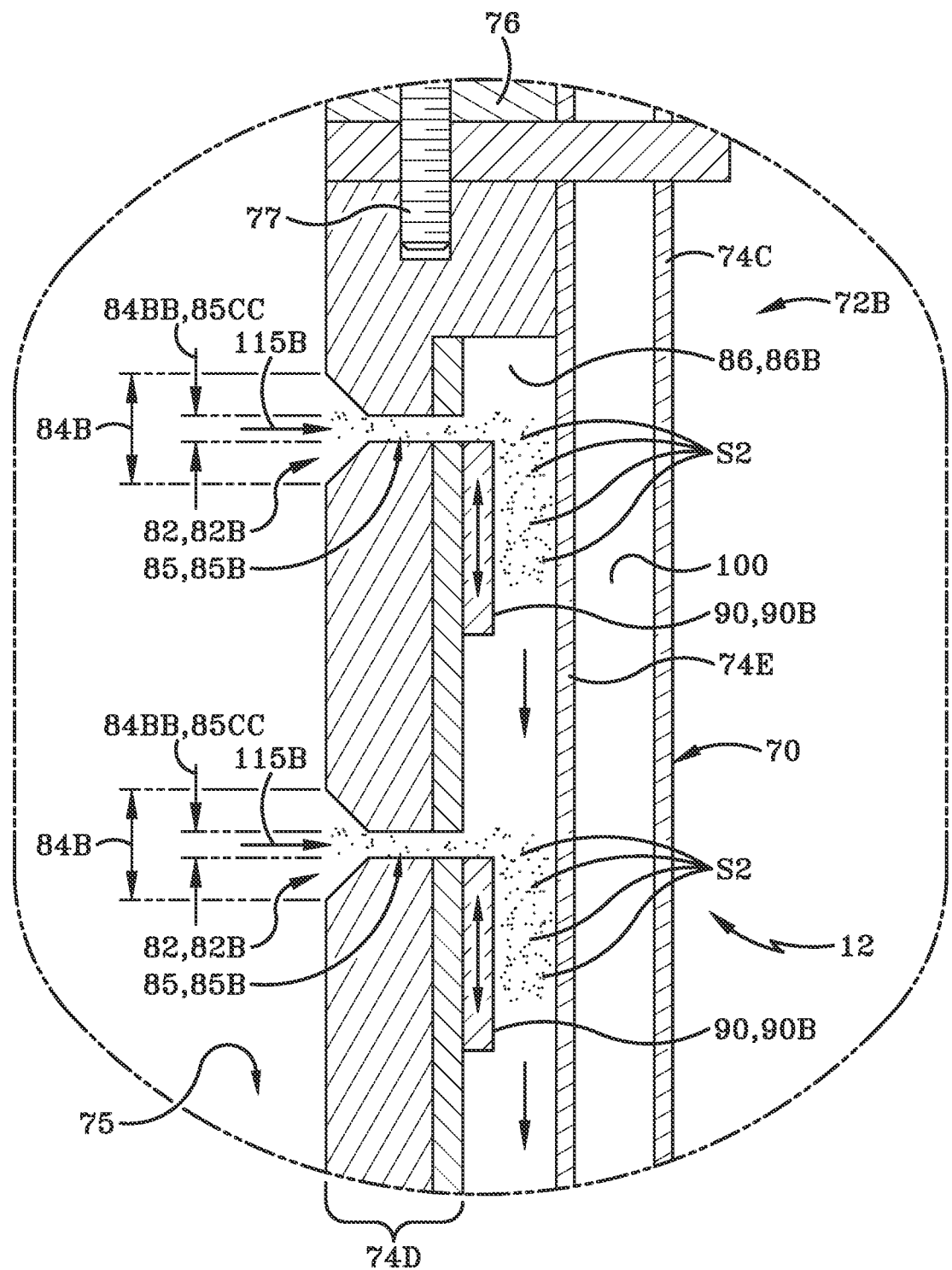
FIG. 4B is an enlargement view of the highlighted region shown in FIG. 3.

Referring to FIG. 4B, the tower 70 defines a second set of ports 82B in the interior circumferential wall 74D of the second stage 72B of said tower 70. As illustrated in FIG. 4B, each port of the second set of ports 82B includes a first diameter 84B defined in the interior circumferential wall 74D along the inner surface of the interior circumferential wall 74D proximate to the pressurized chamber 75. Still referring to FIG. 4B, each port of the second set of ports 82B also includes a second diameter 84BB defined in the interior circumferential wall 74A inside of the interior circumferential wall 74D remote from the pressurized chamber 75; the second diameter 84BB is less than the first diameter 84B. Additionally, the second diameter 84BB of each port of the second set of ports 84B is less than the second diameter 84AA of each port of the first set of ports 84A for receiving constituents of a smaller size than the first set of ports 82A, which is described in more detail below. As such, the second set of ports 82B defined by the interior circumferential wall 74D are also V-shaped or funnel-shaped in which the first diameter 84B of each port 82B tapers to the second diameter 84BB.

Still referring to FIG. 4A, the interior circumferential wall 74D also defines at least one set of passageways 85 that is in fluid communication with the at least one set of ports 82. In the illustrated embodiment, the interior circumferential wall 74D defines a first set of passageways 85A that is in fluid communication with the first set of ports 82A in the first stage 72A of the tower 70. Each passageway of the first set of passageways 85A defines a third diameter 85C that extends along the entire length of each passageway of the first set of passageways 85A. In the illustrated embodiment, the third diameter 85C of each passageway of the first set of passageways 85A is equal to the second diameter 84AA of each port of the first set of ports 82A. The configuration between the first set of ports 82A and the first set of passageways 85A allows the first set of ports 82A to capture and recover first simple constituents "S1" from the fluid stream "LS" dissociated by the SDA 10 in previous operations. Such operations of capturing and recovering the first simple constituents "S1" from the fluid stream "LS" dissociated by the SDA 10 is described in more detail below.

Referring to FIG. 4B, the interior circumferential wall 74D defines a second set of passageways 85B that is in fluid communication with the second set of ports 82B in the second stage 72B of the tower 70. Each passageway of the second set of passageways 85B defines a third diameter 85CC that extends along the entire length of each passageway of the second set of passageway 85B. In the illustrated embodiment, the third diameter 85CC of each passageway of the second set of passageways 85B is equal to the second diameter 84BB of each port of the second set of ports 82B. The configuration between the second set of ports 82B and the second set of passageways 85B allows the second set of ports 82B to capture and recover second simple constituents "S2" from the fluid stream "LS" dissociated by the SDA 10 in previous operations where the second simple constituents are smaller in size than the first simple constituents "S1." Such operations of capturing and recovering the second simple constituents "S2" from the fluid stream "LS" dissociated by the SDA 10 is described in more detail below.

Referring to FIGS. 3 and 4A, the tower 70 also includes at least one effluent and/or concentrated waste stream outlet 86 defined by the exterior circumferential wall 74C and the medial circumferential wall 74E for at least one stage 72 of the tower 70. The at least one effluent outlet 86 is in fluid communication with the pressurized chamber 75 of the tower 70 for disposing of simple constituents recovered by the at least one set of ports 82. Additionally, the at least one effluent outlet 86 may be configured to allow at least one effluent outlet connection 88 to operably engage with the tower 70 for dispensing simple constituents to an output location (e.g., waste facility, another SDA such as SDA 10, etc.).

Referring to FIGS. 3 and 4A, the tower 70 includes a first effluent outlet 86A defined between the exterior circumferential wall 74C and the medial circumferential wall 74E for the first stage 72A of the tower 70. The first effluent outlet 86A is in fluid communication with the pressurized chamber 75 of the tower 70 via the first set of ports 82A and the first set of passageways 85A. Such communication with the pressurized chamber 75, the first set of ports 82A, and the first set of passageways 85A allows the first effluent outlet 86A to dispose of the first simple constituents "S1" recovered by the first set of ports 82A. The first effluent outlet 86A may also be configured to allow the tower 70 to operably engage with a first effluent outlet connection 88A for dispensing the first simple constituents "S1" in an output location.

Referring to FIGS. 3 and 4B, the tower 70 also includes a second effluent outlet 86B defined between the exterior circumferential wall 74C and the medial circumferential wall 74E for the second stage 72B of the tower 70. The second effluent outlet 86B is in fluid communication with the pressurized chamber 75 of the tower 70 via the second set of ports 82B and the second set of passageways 85B. Such communication with the pressurized chamber 75, the second set of ports 82B, and the second set of passageways 85B allows the second effluent outlet 86B to dispose of the second simple constituents "S2" recovered by the second set of ports 82B. The second effluent outlet 86B may also be configured to allow the tower 70 to operably engage with a second effluent outlet connection 88B for dispensing the second simple constituents "S2" in an output location.

As illustrated in FIGS. 1A-1B and 3-4B, the SSA 12 includes at least one set of shutters 90 operably engaged with the tower 70 in the at least one stage 72. Each shutter of the at least one set of shutters 90 is moveable relative to the tower 70 for controlling the flow rate of the fluid stream "LS" depending on the position of each shutter of the at least one set of shutters 90 relative to a respective passageway of the at least one set of passageways 85.

As illustrated in FIGS. 3 and 4A, the SSA 12 includes a first set of shutters 90A operably engaged with the tower 70 in the first stage 72A. As illustrated in FIG. 4A, each shutter of the first set of shutters 90A is operably engaged with the interior circumferential wall 74D of the tower 70 inside of the first effluent outlet 86A. As illustrated herein, each shutter of the first set of shutters 90A is linearly moveable between a covered position and an uncovered position relative to first set of ports 82A and the first set of passageways 85A defined in the interior circumferential wall 74D of the tower 70. Such linear movement of the first set of shutters 90A is denoted by arrows labeled "LM1" in FIG. 4A. Prior to operation, each shutter of the first set of shutters 90A may be provided in the covered position to fully cover a respective passageway of the first set of passageways 85A for preventing any first simple constituents "S1" and fluid stream "LS" from entering into the first effluent outlet 86A (see FIG. 1A). During a separation operation, each shutter of the first set of shutter 90A may be provided in the uncovered position to uncover (see FIG. 4A) a respective passageway of the first set of passageways 85A for allowing first simple constituents "S1" and fluid stream "LS" to enter into the first effluent outlet 86A. While not illustrated herein, the shutters of first sets of shutters 90A may be configured to partially cover and/or uncover a respective passageway of the first set of passageways 85A for controlling a desired flow rate through the first set of ports 82A and the first set of passageways 85A. While not illustrated herein, each shutter of the second sets of shutters 90B may also be configured to move independently of one another.

As illustrated in FIGS. 3 and 4B, the SSA 12 includes a second set of shutters 90B operably engaged with the tower 70 in the second stage 72B. As illustrated in FIG. 4B, each shutter of the second set of shutters 90B is operably engaged with the interior circumferential wall 74D of the tower 70 inside of the second effluent outlet 86B. As illustrated herein, each shutter of the second set of shutters 90B is linearly moveable between a covered position and an uncovered position relative to second set of ports 82B and the second set of passageways 85B defined in to the interior circumferential wall 74D of the tower 70. Such linear movement of the second set of shutters 90B is denoted by arrows labeled "LM2" in FIG. 4B. Prior to operation, each shutter of the second set of shutters 90B may be provided in the covered position to fully cover a respective passageway of the second set of passageways 85B for preventing any second simple constituents "S2" and fluid stream "LS" from entering into the second effluent outlet 86B (see FIG. 1A). During a separation operation, each shutter of the second set of shutter 90B may be provided in the uncovered position to uncover (see FIG. 4B) a respective passageway of the second set of passageways 85B for allowing second simple constituents "S2" and fluid stream "LS" to enter into the second effluent outlet 86B. While not illustrated herein, the shutters of second sets of shutters 90B may be also configured to partially cover and/or uncover a respective passageway of the second set of passageways 85B for controlling a desired flow rate through the second set of ports 82B and the second set of passageways 85B. While not illustrated herein, each shutter of the second sets of shutters 90B may also be configured to move independently of one another.

While the shutters in the first and second sets of shutters 90A, 90B are longitudinally moveable along the interior circumferential wall 74D of the tower 70 relative to the longitudinal axis of said tower 70, shutters of first and second sets of shutters may be moveable along an interior circumferential wall of a tower relative to any suitable axis of said tower. In one exemplary embodiment, shutters of one or both of first and second sets of shutters may be radially or transversally moveable along an interior circumferential wall of a tower relative to a horizontal or transverse of said tower. In another exemplary embodiment, shutters of one or both of first and second sets of shutters may be circumferentially moveable about an interior circumferential wall of a tower relative to a longitudinal axis of said tower. In another exemplary embodiment, shutters of one of both of first and second sets of shutters may be rotatably moveable on an interior circumferential wall of a tower relative to a longitudinal axis of said tower. In another exemplary embodiment, shutters of one or both of first and second sets of shutters may be laterally moveably on an interior circumferential wall of a tower relative to a longitudinal axis of said tower.

While the shutters in the first and second sets of shutters 90A, 90B are longitudinally moveable along the interior circumferential wall 74D of the tower 70, any suitable mechanism and/or drive systems may be used to move shutters in first and second sets of shutters. Examples of suitable mechanisms and/or drive systems for moving shutters in first and second sets of shutters include linkage mechanisms, slider-crank mechanisms, cam mechanisms, gear mechanisms, and other suitable mechanism and/or drive systems for moving shutters in first and second sets of shutters. Additionally, any suitable device or machine may be used to move shutters in first and second sets of shutters for controlling flow rate in a tower. In one exemplary embodiment, devices or machines operably engaged with first and second sets of shutters may be manually operated for moving shutters of the first and second sets of shutters to control flow rate in a tower. In another exemplary embodiment, devices or machines operably engaged with first and second sets of shutters may be automated and/or autonomously controlled for moving shutters of the first and second sets of shutters to control flow rate in a tower.

As illustrated in FIGS. 1A-1B and 3, the SSA 12 includes at least one transfer inlet 92 defined in the interior circumferential wall 74D of the first stage 72A of the tower 70. The SSA 12 also includes at least one transfer outlet 93 defined in the interior circumferential wall 74D of the second stage 72B of said tower 70. The at least one transfer inlet 92 and the least one transfer outlet 93 are configured to allow at least one transfer connection 94 to be operably engaged with the interior circumferential wall 74D of the tower 70. Due to this configuration between the at least one transfer connection 94 and the tower 70, the at least one transfer connection 94 is able to transfer and/or direct the fluid stream "LS" having second simple constituents "S2" from the first stage 72A of the tower to the second stage 72B of the tower 70 via the at least one transfer inlet 92 and the at least one transfer outlet 93.

In the illustrated embodiment, the SSA 12 has a first transfer inlet 92A that is defined in the interior circumferential wall 74D of first stage 72A of the tower 70. The SSA 12 also has a first transfer outlet 93A that is defined in the interior circumferential wall 74D of the second stage 72B of the tower 70. As illustrated in FIG. 3, the first transfer inlet 92A and the first transfer outlet 93A are configured to allow a first transfer connection 94A to be operably engaged with the interior circumferential wall 74D of the tower 70. Due to this configuration between the first transfer connection 94A and the tower 70, the first transfer connection 94A is able to transfer and/or direct the fluid stream "LS" having second simple constituents "S2" from the first stage 72A of the tower to the second stage 72B of the tower 70 via the first transfer inlet 92A and the first transfer outlet 93A.

Similarly, the SSA 12 may also have a second transfer inlet 92B that is defined in the interior circumferential wall 74D of first stage 72A of the tower 70. The SSA 12 also has a second transfer outlet 93B that is defined in the interior circumferential wall 74D of the second stage 72B of the tower 70. As illustrated in FIG. 3, the second transfer inlet 92B and the second transfer outlet 93B are configured to allow a second transfer connection 94B to be operably engaged with the interior circumferential wall 74D of the tower 70. Due to this configuration between the second transfer connection 94B and the tower 70, the second transfer connection 94A is able to transfer and/or direct the fluid stream "LS" having second simple constituents "S2" from the first stage 72A of the tower to the second stage 72B of the tower 70 via the second transfer inlet 92B and the second transfer outlet 93B. Such inclusion of the second transfer connection 94B allows for a greater volume of the fluid stream "LS" having second simple constituents "S2" to be directed from the first stage 72A of the tower into the second stage 72B of the tower 70.

Referring to FIGS. 1A-1B and 3, the SSA 12 may include at least one cleaned fluid outlet 96 defined in the interior circumferential wall 74D of the tower 70. The at least one cleaned fluid outlet 96 may be configured to allow at least one cleaned fluid outlet connection 98 to operably engage with the tower 70. The configuration between the at least one cleaned fluid outlet connection 98 and the tower 70 allows the at least one fluid outlet connection 98 to be in fluid communication with the pressurized chamber 75 in the second stage 72B of the tower 70. The at least one fluid outlet connection 98 is also in fluid communication with an output device or facility for holding the clean or permeate fluid stream "LS" subsequent the separation process performed by the SSA 12.

As illustrated in FIGS. 1A-1B, 3, and 4A-4B, the tower 70 may define at least one air space 100 circumferential disposed about the pressurized chamber 75 of the tower 70. More particularly, the at least one air space 100 may be defined between the exterior circumferential wall 74C and the medial circumferential wall 74E. The at least one air space 100 is considered advantageous at least because the at least one air space 100 separates and isolates sonic waves being used in the SSA 12 from sonic waves being used in the SDA 10, which is described in more detail below.

As illustrated in FIGS. 1A-1B and 3, the SSA 12 may include at least one transducer 110 operably engaged with the tower 70 inside of the pressurized chamber 75. The at least one transducer 110 is selectively adjustable relative to the tower 70, which is described in more detail below. In the illustrated embodiment, a single transducer 110 is operably engaged with the tower 70 inside of the pressurized chamber 75.

Referring to FIGS. 1A-1B and 3, the transducer 110 includes a reflector plate 112 operably engaged with a pressurized housing 114 encapsulating the transducer 110. Such configuration between the reflector plate 112 and the pressurized housing 114 allows the transducer 110 to generate a standing sonic wave 115 along the entire length of the tower 70 inside of the pressurized chamber 75.

Figure 3A:
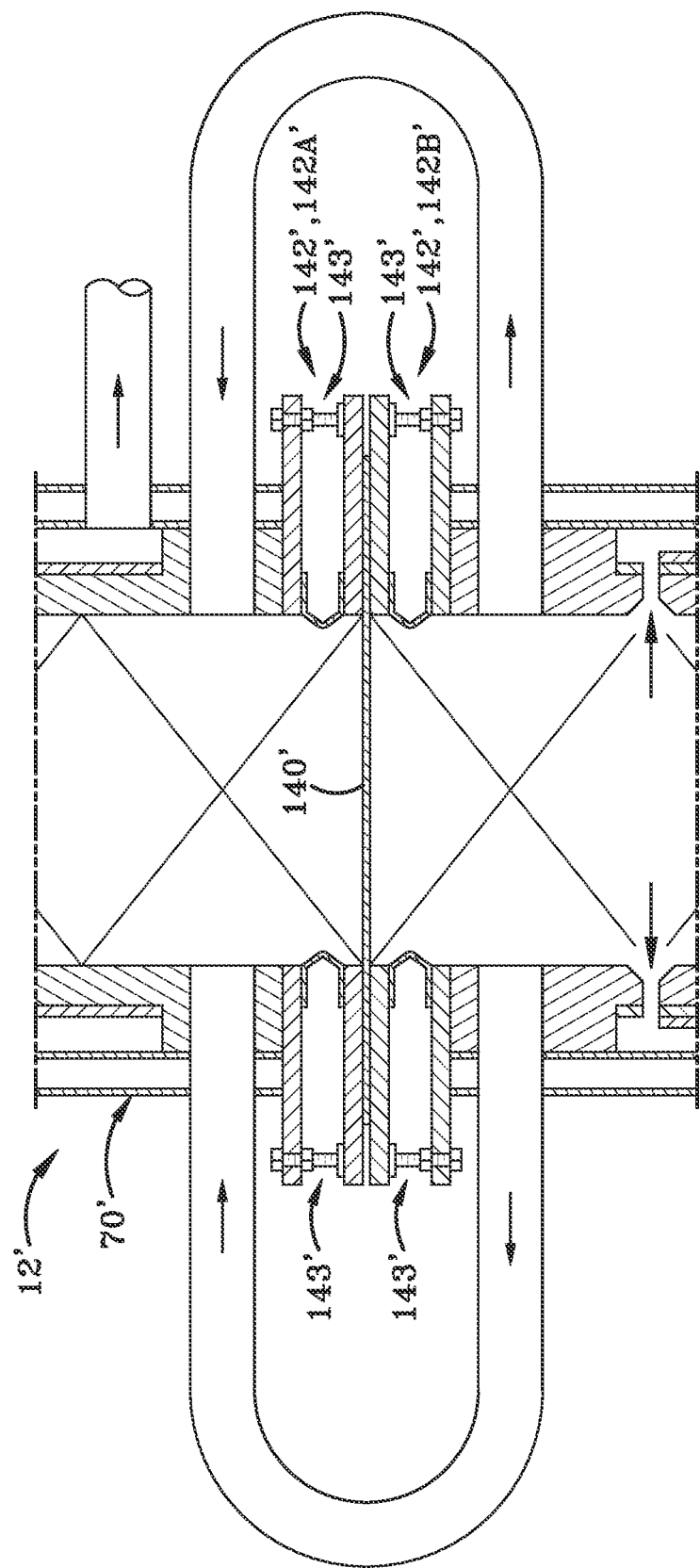
FIG. 3A is a partial diagrammatic sectional view of an alternative adjustment assembly for a diaphragm of the SSA of the fluid cleaning system shown in FIG. 1B.

As shown in FIGS. 1B and 3, the standing sonic wave 115 generated by the transducer 110 includes a plurality of nodes 115A and a plurality of anti-nodes 115B positioned along the longitudinal axis of the tower 70. As illustrated in FIGS. 3 and 3A, the plurality of nodes 115A signifies a first pressure being exerted against the simple constituents "S1", "S2" generated by the standing sonic wave 115. The plurality of nodes 115A is also positioned between each port of the first and second sets of ports 82A, 82B to allow the fluid stream "LS" to flow through the pressurized chamber 75. As illustrated in FIGS. 3 and 4A-4B, the plurality of anti-nodes 115B signify a second pressure being exerted against the simple constituents "S1", "S2" generated by the standing sonic wave 115; the second pressure of the plurality of anti-nodes 115B is greater than the first pressure of the plurality of nodes 115A. Each anti-node of plurality of anti-nodes 115B is positioned directly over a port of one or both of the first and second sets of ports 82A, 82B to direct simple constituents "S1", "S2" into a respective port 82A, 82B in the first or second stages 72A, 72B of the tower 70. In other exemplary embodiments, each anti-node of a plurality of anti-nodes may be positioned outside of a port of one or both of first and second sets of ports due to the size of constituents, the velocity of the fluid, and other similar considerations of the like.

As illustrated in FIG. 3, the transducer 110 is also moveable relative to the tower 70. In the illustrated embodiment, an adjustment mechanism 116 (e.g., a nut threadably engaged with a threaded shaft) is operably engaged with the transducer 110 (more particularly the pressurized housing 114) for linearly moving the transducer 110 along the longitudinal axis of the tower 70. Such movement of the transducer 110 is considered advantageous at least because the linear movement of the transducer 110 allows a user to fine-tune or precisely adjust on the standing sonic wave 115 inside of the tower 70. With this adjustment capability, a user of the SSA 12 may adjust the positioning of the standing sonic wave 115 so that the plurality of nodes 115A are positioned directly between each port of the first and second sets of ports 82A, 82B and the plurality of anti-nodes 115B are positioned directly inside of each port of the first and second sets of ports 82A, 82B. The adjustment capability via the adjustment mechanism 116 is helpful when the transducer 110 becomes misaligned causing the plurality of nodes 115A and the plurality of anti-nodes 115B of standing sonic wave 115 to be misaligned with the ports of the first and second sets of ports 82A, 82B.

While the transducer 110 is moveable relative to the tower 70 via the adjustment mechanism 116 described and illustrated herein, any suitable adjustment mechanism may be used to move a transducer relative to a tower. In one exemplary embodiment, a transducer may be moveable relative to a tower via an adjustment mechanism that is manually adjusted for moving the transducer. In another exemplary embodiment, a transducer may be moveable relative to a tower via an adjustment mechanism that is mechanical adjusted via a machine enabled to move the transducer via the adjustment mechanism; examples of suitable machines that are able to move the transducer via the adjustment mechanism include motors, actuators, and other suitable types of machines for moving the transducer.

As illustrated in FIGS. 1B and 3, the transducer 110 may be operatively connected with a generator 118 via an electrical connection or wire 119. The connection between the transducer 110 and the generator 118 allows the transducer 110 to transmit the standing sonic wave 115 inside of the tower 70 for separating and removing simple constituents "S1", "S2" from the fluid stream "LS" flowing in the pressurized chamber 75 of the tower 70. The generator 118 may be any suitable generator that is capable of generating a range of frequencies to cause the separation of simple constituents from a continuous fluid stream inside of a tower. In one exemplary embodiment, a suitable range of frequency generated by a generator for separating simple substances from a continuous fluid stream is a frequency range from about 3 kHz up to about 200 kHz. More particularly, a suitable range of frequency generated by a generator for separating simple substances from a continuous fluid stream is a frequency range from about 10 kHz up to about 40 kHz. Specifically, a suitable range of frequency generated by a generator for separating simple substances from a continuous fluid stream is a frequency range from about 19 kHz up to about 25 kHz.

In the illustrated embodiment, the transducer 110 of the SSA 12 may be constructed of any suitable materials for transmitting a standing sonic wave (such as standing sonic wave 115) inside of the tower 70. In one exemplary embodiment, a transducer of a SSA may be constructed of magnetostrictive-type construction with magnetostrictive materials. In another exemplary embodiment, a transducer of a SSA may be constructed of a electrostrictive-type construction with piezoelectric or electrostrictive materials. In another exemplary embodiment, a transducer of a SSA may be constructed of smart materials. In another exemplary embodiment, a transducer of a SSA may be constructed of ferromagnetic materials.

While the generator 118 is shown being a separate component from the tower 70 and the transducer 110, any suitable configuration may be used between a generator and a tower and a transducer. In one exemplary embodiment, a generator may be operably engaged with a tower of a SSA where the generator is positioned inside of or on the tower.

Referring to FIGS. 1B-3, the SSA 12 also includes a reflector 130. In the illustrated embodiment, the reflector 130 is operably engaged with a top wall 74A of the tower 70 directly opposite to the transducer 110 relative to the longitudinal axis of the tower 70. The reflector 130 is configured to reflect the standing sonic wave 115, transmitted by the transducer 110, back to the transducer 110 along the longitudinal axis of the tower 70. Such reflection creates a mirrored wave inside of the tower 70 in order for the standing sonic wave 115 to be consistent along the entire length of the tower 70 inside of the pressurized chamber 75.

Similar to the transducer 110, the reflector 130 is also moveable relative to the tower 70 via an adjustment mechanism 132 (e.g., a nut threadably engaged with a threaded shaft) operably engaged with the reflector 130. In the illustrated embodiment, the adjustment mechanism 132 is able to linearly move the reflector 130 along the longitudinal axis of the tower 70 similar to the movement of the transducer 110. Such movement of the reflector 130 is considered advantageous at least because the linear movement of the reflector 130 allows a user to fine-tune or precisely adjust on the standing sonic wave 115 inside of the tower 70. With this adjustment capability, a user of the SSA 12 may adjust the positioning of the standing sonic wave 115 so that the plurality of nodes 115A are positioned directly between each port of the first and second sets of ports 82A, 82B and the plurality of anti-nodes 115B are positioned directly inside of each port of the first and second sets of ports 82A, 82B. The adjustment capability via the adjustment mechanism 132 is helpful when the reflector 130 becomes misaligned causing the plurality of nodes 115A and the plurality of anti-nodes 115B of standing sonic wave 115 to be misaligned with the ports of the first and second sets of ports 82A, 82B. As such, the adjustment capability of both the transducer 110 and the reflector 130 provides a user with two independent options in fine tuning and precisely adjusting the standing sonic wave 115 inside of the pressurized chamber 75 due to the transducer 110 and the reflector 130 being independently moveable relative to one another.

Referring to FIGS. 1B through 3, the SSA 12 may also include at least one diaphragm 140. In the illustrated embodiment, a single diaphragm 140 is operably engaged with the tower 70 between the transducer 110 and the reflector 130. The diaphragm 140 is configured to transfer the standing sonic wave 115 between the first stage 72A and the second stage 72B. during a separation operation inside of the tower 70. The use of the diaphragm is considered advantageous at least because a single transducer 110 may only be used in the SSA 12 for generating a standing sonic wave. While the SSA 12 may include at least one diaphragm 140 operably engaged with the tower 70 inside of the pressurized chamber 75 for transferring the standing sonic wave 115 between the first and second stages 72A, 72B, any suitable number of diaphragms may be used for transferring a standing sonic wave between any suitable number of stages included in a tower. As such, the number of diaphragms may be dependent upon the number of stages defined in a tower for a separation operation.

Similar to the transducer 110 and the reflector 130, the diaphragm 140 is also moveable relative to the tower 70 via an adjustment mechanism 142 operably engaged with the diaphragm 140 (see FIG. 3A). In the illustrated embodiment, the adjustment mechanism 142 is able to linearly move the diaphragm 140 along the longitudinal axis of the tower 70 similar to the movement of the transducer 110 and the reflector 130. The adjustment mechanism 142 may allow the diaphragm 140 to be selectively adjustable along the tower 70 for various considerations, including collecting excessive first simple constituents "S1" from the fluid stream "LS" that were not forced through the first set of ports 82A via the standing sonic wave 115, aligning with the standing sonic wave 115 inside of the tower 70, and other various considerations for selectively adjusting the diaphragm 170.

While the diaphragm 140 is moveable along the tower 70 and is selectively adjustable along the tower 70 via the adjustment mechanism 142, any suitable adjustment mechanism may be operably engaged with a diaphragm. In one exemplary embodiment, a mechanical assembly or system may be operably engaged with a diaphragm and a tower of a SSA to allow a user to manually adjust the diaphragm relative to the tower. In another exemplary embodiment, a mechanical assembly or system powered by at least one machine or apparatus may be operably engaged with a diaphragm and a tower of a SSA to allow a user to automatically adjust the diaphragm relative to the tower via inputs placed on the at least one machine or apparatus.

As illustrated in FIG. 3A, an alternative adjusting mechanism 142' may use a first jackscrew assembly 142A' and an opposing second jackscrew assembly 142B' for selectively adjusting an alternative diaphragm 140' substantially similar to the diaphragm 140 described above. In this alternative embodiment, each jackscrew mechanism 143' in the first and second jackscrew assemblies 142A', 142B' is able to incrementally move the diaphragm 140' along the tower 70 relative to the longitudinal axis of the tower 70. Additionally, each jackscrew mechanism 143' in the first and second jackscrew assemblies 142A', 142B' are independently moveable to allow a user to selectively adjust one more of the jackscrew mechanisms 143' based on the misalignment scenario.

Such movement of the diaphragm 140 is considered advantageous at least because the linear movement of the diaphragm 140 allows a user fine-tune or precisely adjust on the standing sonic wave 115 inside of the tower 70. With this adjustment capability, a user of the SSA 12 may adjust the positioning of the standing sonic wave 115 so that the plurality of nodes 115A are positioned directly between each port of the first and second sets of ports 82A, 82B and the plurality of anti-nodes 115B are positioned directly inside of each port of the first and second sets of ports 82A, 82B. The adjustment capability via the adjustment mechanism 142 is helpful when the diaphragm 140 becomes misaligned causing the plurality of nodes 115A and the plurality of anti-nodes 115B of standing sonic wave 115 to be misaligned with the ports of the first and second sets of ports 82A, 82B. As such, the adjustment capability of the transducer 110, the reflector 130, and the diaphragm 140 provides a user with three independent options in fine tuning and precisely adjusting the standing sonic wave 115 inside of the pressurized chamber 75 due to the transducer 110, the reflector 130, and the diaphragm 140 being independently moveable relative to one another.

Having now described the fluid treatment system 1 having at least one SDA 10 and at least one SSA 12, a method of use is described in more detail below.

Upon operation, the continuous fluid stream "LS" is pumped from a contaminated or polluted fluid source (e.g., water stream, pond, lake, ocean, etc.) and into the SDA 10 via the first inlet connection 50A. At this period, the continuous fluid stream "LS" is of a first fluid stream state "LS1" where the first fluid stream state "LS1" includes various types of complex substances and solids (examples of such complex substances and solids are provided above).

Prior to or upon the introduction of the first fluid stream state "LS1" into the SDA 10, the continuous sonic optimization fluid stream "US" is pumped into the pressurized reservoir 22 of the housing 20 via the second inlet connection 50B. The sonic optimization fluid stream "US" is continuously pumped into and out of the pressurized reservoir 22 during operation of the SDA 10 where the pressurized reservoir 22 remains pressurized.

Prior to introduction of the first fluid stream state "LS1" into the SDA 10, the transducer 60 and the generator 66 are activated from an OFF state to an ON state for generating the traveling sonic wave 68 and causing cavitation inside of the housing 20 and the insert 40 subsequent to the introducing of the continuous sonic optimization fluid "US". Upon activation from the OFF state to the ON state, the generator 66 is able to generate and transmit the desired traveling sonic wave 68 frequency to the transducer 60 via the electrical connection 67. Once received, the transducer 60 transmits the traveling sonic wave 68 into the pressurized reservoir 22 of the housing 20 causing the primary cavitation "C1" on the continuous sonic optimization fluid stream "US" shown in FIG. 2. With the assistance of the primary cavitation "C1" in the pressurized reservoir 22, the transducer 60 is able transmit the secondary cavitation "C2" inside of the insert 40 to dissociate various types of complex substances and solids included in the first fluid stream state "LS1", which is described in more detail below.

Once pumped through the first inlet connection 50A, the fluid stream "LS1" passes through the first inlet 44A of the insert 40 and contacts the flow director 48. Upon this contact, the flow director 48 directs the fluid stream "LS1" into a non-laminar flow state when traveling through the fluid passage 42 of the insert 40. As stated previously, the non-laminar flow state caused by the flow director 48 on the fluid stream "LS1" creates a longer dwell time on the fluid stream "LS1" when traveling through fluid passage 42. Such excessive dwell times allows the secondary cavitation "C2" generated by the traveling sonic wave 68 on the fluid stream "LS1" to dissociate and disintegrate the complex substances and solids provided in the fluid stream "LS1". As the fluid stream "LS1" reaches the first outlet 46A of the insert 40, the continuous fluid stream "LS" transitions from the first fluid stream state "LS1" to a second fluid stream state "LS2" including dissociated and disintegrated complex substances and solids. In other words, the fluid stream "LS" in the second fluid stream state "LS2" includes simple constituents from the secondary cavitation "C2" caused on the continuous fluid stream "LS" when passing through the insert 40 and the transducer 60.

Prior to introducing the fluid stream "LS2" into the SSA 12 from the SDA 10, the transducer 110 and the generator 120 are actuated from an OFF state to an ON state for generating the standing sonic wave 115 inside of the pressurized chamber 75 of the housing 70. Upon being actuated from the OFF state to the ON state, the generator 120 is able to generate and transmit the desired standing sonic wave 115 frequency to the transducer 110 via the electrical connection 118. Once received, the transducer 110 transmits the standing sonic wave 115 into the pressurized chamber 75 of the tower 70 along the longitudinal axis of the tower 70. As the standing sonic wave 115 is transmitted from the transducer 110, the standing sonic wave 115 travels through the diaphragm 140 and towards the reflector 130. As the standing sonic wave 115 contacts the reflector 130, the reflector 130 reflects the standing sonic wave 115 back through the diaphragm 140 and to the transducer 110. Such configuration between the transducer 110, the reflector 130, and the diaphragm 140 allows for a uniform standing sonic wave 1116 to continuously transmit through the tower 70 for separating simple substances and solids from the fluid stream "LS2".

Optionally, a user of the SSA 12 may selectively adjust the transducer 110, the reflector 130, and the diaphragm 140 in order for the plurality of anti-nodes 115B of the standing sonic wave 115 to be directly aligned with the first and second sets of ports 82A, 82B of the tower 70. As illustrated in FIGS. 3 and 4A-4B, at least one of the transducer 110, the reflector 130, and the diaphragm 140 may be selectively adjusted by the user so that the plurality of anti-nodes 115B are aligned with the first set of ports 82A in the first stage 72A of the tower 70 and/or aligned with the second set of ports 82A in the second stage 72B of the tower 70. As such, a user may cause at least one of the transducer 110, the reflector 130, and the diaphragm 140 to be linearly moved along the tower 70 relative to the longitudinal axis of the tower 70 until the plurality of anti-nodes 115B of the standing sonic wave 115 is directly aligned with the first and second sets of ports 82A, 82B of the tower 70.

Once the standing sonic wave 115 is generated inside of the tower 70, the fluid stream "LS2" may be pumped from the fluid passage 42 of the insert 40 of the SDA 10 and into the pressurized chamber 75 of the tower 70 via the first and second inlet connection 80 being in fluid communication with the insert 40 and the tower 70. As the fluid stream "LS2" is pumped into the pressurized chamber 75 of the tower 70, the fluid stream "LS2" flows towards the diaphragm 140 in the first stage 72A. As the fluid stream "LS2" travels through the pressurized chamber 75, the plurality of anti-nodes 115B of the standing sonic wave 115 force the first plurality of constituents "S1" of the fluid stream "LS2" into the first set of ports 82A.

As illustrated in FIGS. 1B, 3, and 4A, the first set of shutters 90A are provided in the uncovered position in which the first set of shutters 90A are completely removed away from the first set of ports 82A and the first set of passageways 85A. In this position, the first set of shutters 90A creates the greatest amount of flow through the first set of ports 82A the first set of passageways 85A in the tower 70 for removing the largest volume of first plurality of constituents "S1" and effluent fluid. As discussed above, the first set of shutters 90A may be positioned at any suitable position between the covered position (see FIG. 1A) and the uncovered position (FIGS. 1B, 3, and 4A) for a desired flow rate of effluent fluid and the first plurality of constituents "S1." Once the first plurality of constituents "S1" passes through the first set of ports 82A, the first plurality of constituents "S1" passes through the first set of passageways 85A and into the first effluent outlet 86A. The first plurality of constituents "S1", along with effluent fluid, is outputted to an output container or facility via the first effluent outlet connection 88A.

Upon the separation of the first plurality of constituents "S1" from the fluid stream "LS2", the fluid stream "LS" transitions from the second fluid stream state "LS2" to a third fluid stream state "LS3" as the fluid stream "LS" is pumped from the first stage 72A to the second stage 72B via one of both of the first and second transfer connections 94A, 94B. Once pumped into the second stage 72B, the fluid stream "LS3" flows away from the diaphragm 140 and towards the reflector 130. As the fluid stream "LS3" travels through the pressurized chamber 75 in the second stage 72B of the tower 70, the plurality of anti-nodes 115B of the standing sonic wave 115 force the second plurality of constituents "S2" of the fluid stream "LS3" into the second set of ports 82B substantially similar to the first plurality of constituents "S1" of the fluid stream "LS2" into the first set of ports 82A.

As illustrated in FIGS. 1B, 3, and 4B, the second set of shutters 90B are provided in the uncovered position in which the second set of shutters 90B are completely removed from the second set of ports 82B and the second set of passageways 85B. In this position, the second set of shutters 90B creates the greatest amount of flow through the second set of ports 82B in the tower 70 for removing the largest volume of second plurality of constituents "S2" and effluent fluid. As discussed above, the second set of shutters 90B may be positioned at any suitable position between the covered position (see FIG. 1A) and the uncovered position (FIGS. 1B, 3, and 4B) for a desired flow rate of effluent fluid and the second plurality of constituents "S2." Once the second plurality of constituents "S2" passes through the second set of ports 82B, the second plurality of constituents "S2" passes through the second set of passageways 85B and into the second effluent outlet 86B. The second plurality of constituents "S2", along with effluent fluid, is outputted to an output container or facility via the second effluent outlet connection 88B.

Once the second plurality of constituents "S2" is separated from the third fluid stream state "LS3" in the second stage 72B, the fluid stream "LS" transitions from the third fluid stream state "LS3" to a fourth fluid stream state "LS4". Here, the fluid stream "LS4" is separated from first and second pluralities of constituents "S1", "S2" where the fluid stream "LS4" is substantially free of substances and solids and is considered a cleaned fluid. Upon this separation, the fluid stream "LS4" escapes around the reflector 130 and moves towards the at least one cleaned fluid outlet 96. The fluid stream "LS4" is then pumped to a clean fluid output container or facility, via the at least one cleaned fluid outlet connection 98, from the tower 70.

The method of cleaning a fluid stream, such as fluid stream "LS", may be repeated for continuously dissociating complex substances in the fluid stream, via at least one SDA 10, and separating the dissociated complex substances from the fluid stream, via at least one SSA 12.

FIG. 5A illustrates another fluid treatment system 201 having at least one SDA 210. The SDA 210 is substantially similar to the SDA 10 of the fluid treatment system 1 described above and illustrated in FIGS. 1A-1B, 2A, and 3, expect as detailed hereinafter. The SDA 210 includes a housing 220, at least one insert 240 operably engaged with the housing 220, at least one inlet connection 250 operably engaged with the housing 220 and/or insert 240 for delivering a continuous fluid stream "LS" or a continuous sonic optimization fluid stream "US" into the housing 220 and/or insert 240 for dissociation operations, at least one outlet connection 252 operably engaged with the housing 220 and/or insert 240 for delivering a continuous fluid stream "LS" or a continuous sonic optimization fluid stream "US" from the housing 220 and/or insert 240 subsequent dissociation operations, and a transducer 260 operably engaged inside of the housing 220 disposed about the insert 240.

It should be understood that FIG. 5A is diagrammatic only for the SDA 210 and does not illustrate exact and precise dimensions of any component or assembly of the SDA 210 provided herein. Such diagrammatic illustrations of the SDA 210 shown in FIG. 5A should not limit the exact positioning, orientation, or location of the SDA 210.

As illustrated in FIG. 5A, the housing 220 has a first or top wall 220A, an opposing second or bottom wall 220B, and a longitudinal axis "X1" defined therebetween. The housing 220 also includes a circumferential wall 220C that extends between the top wall 220A and the bottom wall 220B along an axis parallel with the longitudinal axis "X1" of housing 220. The circumferential wall 220C also defines a diameter or width "D2" as shown in FIG. 5A. The diameter "D2" of the housing 220 is greater than the diameter "D1" of the housing 20 of the SDA 10 described above and illustrated in FIG. 2. The larger diameter "D2" of the housing 220 is considered advantageous at least because the large diameter "D2" allows for more space for the transducer 260 to generate uniform cavitation inside of the housing 220 for dissociating complex substances and solids found in the continuous contaminated fluid stream "LS".

Figure 5B:
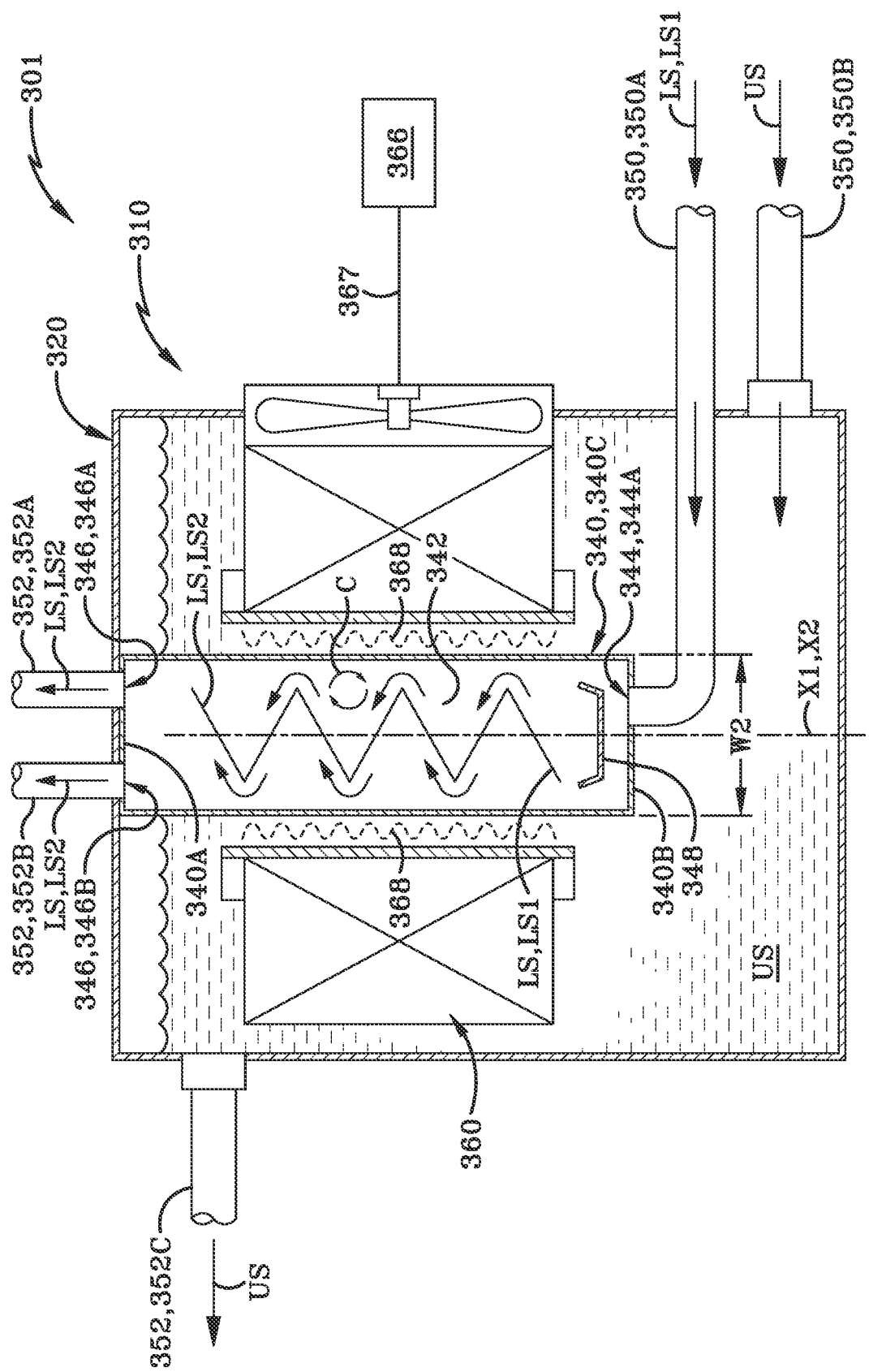
FIG. 5B is a diagrammatic sectional view of an alternative SDA of another fluid cleaning system.

FIG. 5B illustrates another fluid treatment system 301 having at least one SDA 310. The SDA 310 is substantially similar to the SDAs 10, 210 of the fluid treatment systems 1, 201 described above and illustrated in FIGS. 1A-1B, 2, 3, and 5A expect as detailed hereinafter. The SDA 310 includes a housing 320, at least one insert 340 operably engaged with the housing 320, at least one inlet connection 350 operably engaged with the housing 310, at least one outlet connection 352 operably engaged with the housing 310, and a transducer 360 operably engaged inside of the housing 320 disposed about the insert 340 and operatively connected with a generator 366, via an electrical connection 367, to generate a traveling sonic wave 368.

It should be understood that FIG. 5B is diagrammatic only for the SDA 310 and does not illustrate exact and precise dimensions of any component or assembly of the SDA 310 provided herein. Such diagrammatic illustrations of the SDA 310 shown in FIG. 5B should not limit the exact positioning, orientation, or location of the SDA 310.

As illustrated in FIG. 5B, the SDA 10 includes a single insert 340 to help isolate dissociation and disintegration of complex substances and solids into simple constituents. The insert 340 includes a first or upper wall 340A, an opposing second or bottom wall 340B, and a longitudinal axis "X2" defined therebetween. As shown in FIG. 5B, the longitudinal axis "X2" of the insert 340 is parallel with a longitudinal axis "X1" of the housing 320. The insert 340 also includes a peripheral wall 340C that extends between the upper wall 340A and the lower wall 340B along an axis parallel with the longitudinal axis "X2" of insert 340. The peripheral wall 340C also defines a diameter or width "W2" as shown in FIG. 5B. In the illustrated embodiment, the insert 340 is tubular and/or cylindrically-shaped. In other exemplary embodiments, an insert may have any shape or configuration based on various considerations. Examples of suitable shapes or configuration for an insert include spherical, cubical, cuboidal, conical, triangular, torus-shaped, pyramidal, polyhedron-shaped, and other suitable shapes or configuration for an insert of a SDA.

Still referring to FIG. 5B, a fluid passage 342 is collectively defined by the upper wall 340A, the lower wall 340B, and the peripheral wall 340C of the insert 340. The fluid passage 342 is accessible via at least one inlet opening 344 and at least one outlet opening 346. In the illustrated embodiment, the fluid passage 342 is accessible via an inlet opening 344A defined in the lower wall 340B of the insert 340. The fluid passage 342 is also accessible via a first outlet 346A defined in the upper wall 340A of the insert 340 and an adjacent second outlet 346B defined in the upper wall 340A relative to the upper wall 340A. Such uses of the inlet opening 344A and the first and second outlet openings 346A, 346B are described in more detail below.

While the first inlet 344A is defined in the lower wall 340B of the insert 340 and the first and second outlets 346A, 346B are defined in the upper wall 340A, a first inlet and first and second outlets of an insert may be defined in any portion of the insert. In one exemplary embodiment, a first inlet and first and second outlets of an insert may both be defined in a bottom wall of the insert. In another exemplary embodiment, a first inlet and first and second outlets of an insert may both be defined in a top wall of the insert. In another exemplary embodiment, a first inlet and first and second outlets of an insert may both be defined in a peripheral wall of the insert. In another exemplary embodiment, a first inlet of an insert may be defined in one of first, second, and third walls of the insert, a first outlet of an insert may be defined in one of first, second, and third walls of the insert, and a second outlet of an insert may be defined in one of first, second, and third walls of the insert.

Still referring to FIG. 5B, the insert 340 may also include a flow director or baffle 348. The flow director 348 is operably engaged with the peripheral wall 340C of the insert 340 proximate to the lower wall 340B and the first inlet 344A of the insert 340. As described in more detail below, the flow director 348 creates a specific flow to a continuous fluid stream that is pumped into the insert 340; the flow director 348 in this embodiment creates a non-laminar flow pattern on the continuous fluid stream.

While a single flow director 348 is provided with the insert 340, any suitable number of flow directors may be installed in an insert for various considerations, including the desired dwell time of the continuous fluid stream inside of the insert, the intensity and desired turbulence of a continuous fluid stream, and other various considerations. While a flow director 348 is positioned proximate to the first inlet 344A of the insert 340, a flow director may be positioned along any suitable position inside of an insert for various considerations, including the desired dwell time of the continuous fluid stream inside of the insert, the intensity and desired turbulence of a continuous fluid stream, and other various considerations.

Still referring to FIG. 5B, the at least one inlet connection 350 may be operably engaged with the housing 320 and/or insert 340 for delivering a continuous fluid stream "LS" or a continuous sonic optimization fluid stream "US" for dissociation purposes. In the illustrated embodiment, a first inlet connection 350A is operably engaged with the housing 320 (substantially similar to the first inlet connection 50A and housing 20 described above) and operably engaged with the insert 340 via the first inlet opening 344A. As shown in FIG. 5B, the first inlet connection 350A is configured to direct the continuous fluid stream "LS" from a fluid source (i.e., a body of water or fluid) and into the fluid passage 342 of the insert 340 via the fluid communication between the first inlet connection 350A and the insert 340. In addition, a second inlet connection 350B is operably engaged with the housing 320 via the second inlet 326A. As shown in FIG. 5B, the second inlet connection 350B is configured to direct the continuous sonic optimization fluid stream "US" from a sonic optimization fluid source into the housing 320 via the fluid communication between the second inlet connection 350B and the housing 320 (substantially similar to the housing 20 described above). The first inlet connection 350A isolates the continuous fluid stream "LS" from the continuous sonic optimization fluid stream "US" pumped into the housing 320 to prevent any mixing of or interaction between the continuous fluid stream "LS" and the continuous sonic optimization fluid stream "US" during a solids dissociation process as described above.

Still referring to FIG. 5B, at least one outlet connection 352 may be operably engaged with the housing 320 and/or insert 340 for delivering a continuous fluid stream "LS" with dissociated substances and/or solids or delivering a continuous sonic optimization fluid stream "US" from the housing 320 for dissociation purposes. In the illustrated embodiment, a first outlet connection 352A is operably engaged with the housing 320 (substantially similar to the first outlet connection 52A and housing 20 described above) and operably engaged with the insert 340 via the first outlet opening 346A. As shown in FIG. 5B, the first outlet connection 352A is configured to direct the continuous fluid stream "LS" with dissociated substances and/or solids (i.e., simple constituents) from the fluid passage 342 of the insert 340 to a first output device. In one exemplary embodiment, an output device may be a solids separation apparatus, such as SSA 12, for separating the dissociated substances and/or solids from the continuous fluid stream for purification/cleaning purpose. In another exemplary embodiment, an output device may be another solids dissociation apparatus, such as SDA 10, SDA 210, or SDA 310, or other suitable SDAs described herein for providing another process of dissociation.

Additionally, a second outlet connection 352B is operably engaged with the housing 320 (substantially similar to the first outlet connection 52A and housing 20 described above) and operably engaged with the insert 340 via the second outlet opening 346B. As shown in FIG. 5B, the second outlet connection 352B is configured to direct the continuous fluid stream "LS" with dissociated substances and/or solids (i.e., simple constituents) from the fluid passage 342 of the insert 340 to a second output device. In one exemplary embodiment, an output device may be a solids separation apparatus, such as SSA 12, for separating the dissociated substances and/or solids from the continuous fluid stream for purification/cleaning purpose. In another exemplary embodiment, an output device may be another solids dissociation apparatus, such as SDA 10, SDA 210, or SDA 310, or other suitable SDAs described herein, for providing another process of dissociation.

The configuration of the insert 340 with the first and second outlet connections 352A, 352B, via the first and second outlets 346A, 346B, is considered advantageous at least because the fluid stream "LS" with dissociated substances and solids may be outputted to different devices and apparatuses for various fluid cleaning operations. In one instance, the first and second outlet connections 352A, 352B may be in fluid communication with first and second SSAs, such as SSA 12, to allow for more than one SSA to separate dissociated substances from the fluid stream "LS" in the fluid treatment system 301. In another instance, the first outlet connection 352A may be in fluid communication with a SSA, such as SSA 12, to separate dissociated substances from the fluid stream "LS" in the fluid treatment system 301, and the second outlet connection 352B may be in fluid communication with another SDA, such as SDA 10, SDA 210, or SDA 310, to provide further dissociation of the dissociated substances in the fluid stream "LS" in the fluid treatment system 301.

Still referring to FIG. 5B, a third outlet connection 352C is operably engaged with the housing 320 (substantially similar to the second outlet connection 52B operably engaged with the housing 20). The third outlet connection 352C is configured to direct the continuous sonic optimization fluid stream "US" from the housing 320 to a sonic optimization fluid output device or to the original sonic inlet device. Such pumping and removing of sonic optimization fluid "US" allows for a continuous flow of sonic optimization fluid into the housing 320 for adequate generation of sonic waves during dissociation processes, which is described in more detail below.

Figure 5C:
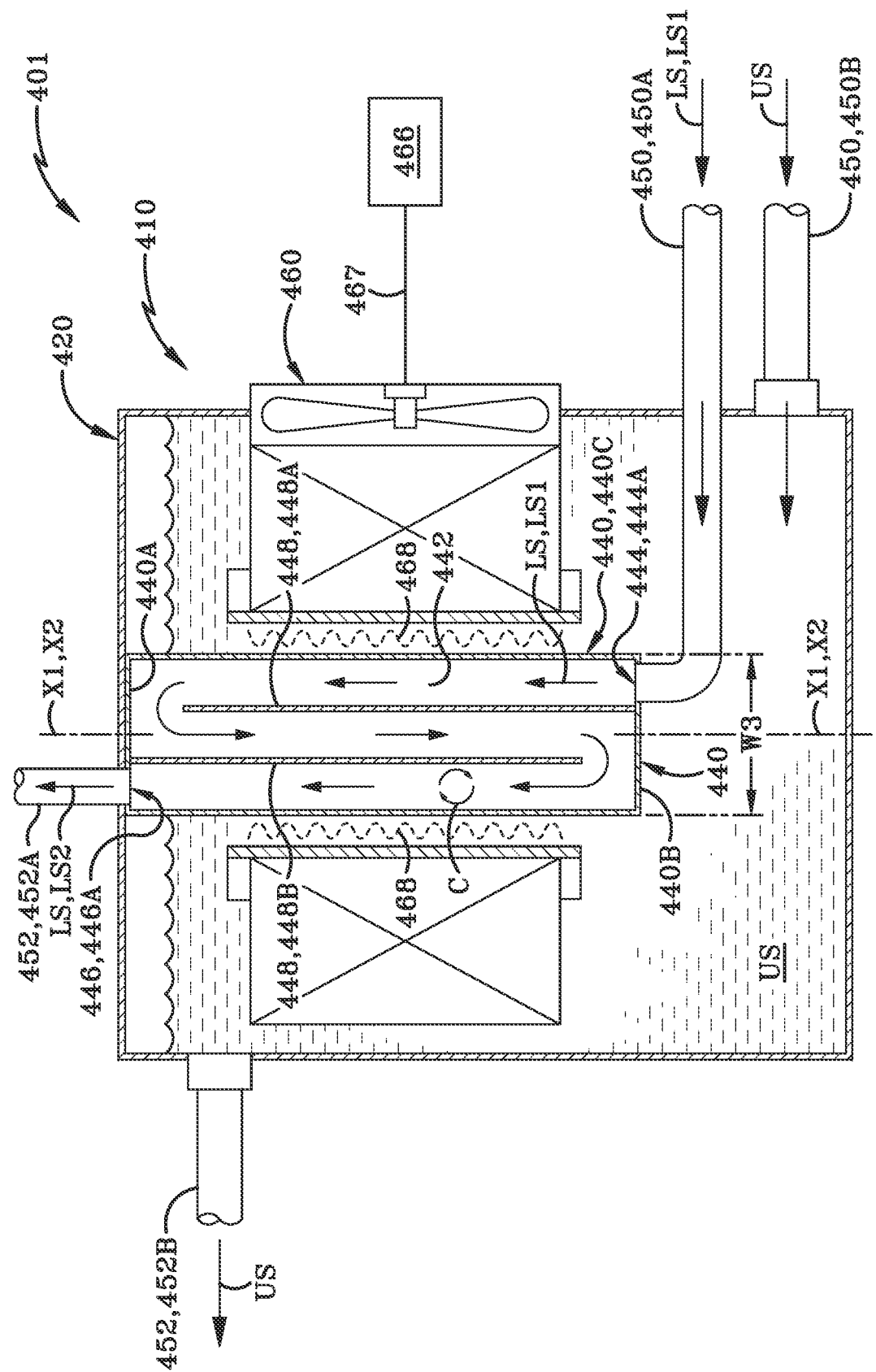
FIG. 5C is a diagrammatic sectional view of an alternative SDA of another fluid cleaning system.

FIG. 5C illustrates another fluid treatment system 401 having at least one SDA 410. The SDA 410 is substantially similar to the SDAs 10, 210, 310 of the fluid treatment systems 1, 201, 301 described above and illustrated in FIGS. 1A-1B, 2, 3, and 5A-5B expect as detailed hereinafter. The SDA 410 includes a housing 420, at least one insert 440 operably engaged with the housing 420, at least one inlet connection 450 operably engaged with the housing 410, at least one outlet connection 452 operably engaged with the housing 410, and a transducer 460 operably engaged inside of the housing 420 disposed about the insert 440 and operatively connected with a generator 466, via an electrical connection 467, to generate a traveling sonic wave 468.

It should be understood that FIG. 5C is diagrammatic only for the SDA 410 and does not illustrate exact and precise dimensions of any component or assembly of the SDA 410 provided herein. Such diagrammatic illustrations of the SDA 410 shown in FIG. 5C should not limit the exact positioning, orientation, or location of the SDA 410.

As illustrated in FIG. 5C, the SDA 410 includes a single insert 440 to help isolate dissociation and disintegration of complex substances and solids. The insert 440 includes a first or upper wall 440A, an opposing second or bottom wall 440B, and a longitudinal axis "X2" defined therebetween. As shown in FIG. 5C, the longitudinal axis "X2" of the insert 440 is parallel with a longitudinal axis "X1" of the housing 420. The insert 440 also includes a peripheral wall 440C that extends between the upper wall 440A and the lower wall 440B along an axis parallel with the longitudinal axis "X2" of insert 440. The peripheral wall 440C also defines a diameter or width "W3" as shown in FIG. 5C; the width "W3" of the insert 440 is equal to the widths "W1", "W2" of the inserts 240, 340 of the SDA 210, 310 described and illustrated herein. In the illustrated embodiment, the insert 440 is tubular and/or cylindrically-shaped. In other exemplary embodiments, an insert may have any shape or configuration based on various considerations. Examples of suitable shapes or configuration for an insert include spherical, cubical, cuboidal, conical, triangular, torus-shaped, pyramidal, polyhedron-shaped, and other suitable shapes or configuration for an insert of a SDA.

Still referring to FIG. 5C, a fluid passage 442 is collectively defined by the upper wall 440A, the lower wall 440B, and the peripheral wall 440C of the insert 440. The fluid passage 442 is accessible via at least one inlet opening 444 and at least one outlet opening 446. In the illustrated embodiment, the fluid passage 442 is accessible via a first inlet opening 444A defined in the lower wall 440B of the insert 440. The fluid passage 442 is also accessible via a first outlet 446A defined in the upper wall 440A of the insert 440. Such uses of the first inlet opening 444A and the first outlet opening 446A are described in more detail below.

While the first inlet 444A is defined in the lower wall 440B of the insert 440 and the first outlet 446A is defined in the upper wall 440A, a first inlet and a first outlet of an insert may be defined in any portion of the insert. In one exemplary embodiment, a first inlet and a first outlet of an insert may both be defined in a bottom wall of the insert. In another exemplary embodiment, a first inlet and a first outlet of an insert may both be defined in a top wall of the insert. In another exemplary embodiment, a first inlet and a first outlet of an insert may both be defined in a peripheral wall of the insert. In another exemplary embodiment, a first inlet of an insert may be defined in one of first, second, and third walls of the insert and a first outlet of an insert may be defined in one of first, second, and third walls of the insert.

Still referring to FIG. 5C, the insert 440 may also include at least one flow director or baffle 448. The at least one flow director 448 of the insert 440 is different than the flow directors 48, 348 of the inserts 40, 340 described above. In the illustrated embodiment, a first flow director 448A operably engages with the lower wall 440B of the insert 440 and extends upwardly away from the lower wall 440B towards the upper wall 440A. A second flow director 448B is operably engaged with the upper wall 440A of the insert 440 and extends downwardly away from the upper wall 440A towards the lower wall 440B. The first and second flow directors 448A, 448B collectively define a flow path 448C inside of the insert 440 where the flow path 448C provides the fluid stream "LS" in a laminar flow state. The configurations of the flow directors 448A, 448B are considered advantageous at least because the flow directors 448A, 448B extend the dwell time of the fluid stream "LS" inside of the insert 440 so that the fluid stream "LS" may experience a desired amount of cavitation inside of the insert 440. Such extended dwell time inside of insert 440 may allow for a greater occurrence of dissociation for the complex substances present in the fluid stream "LS".

While two flow directors 448A, 448B are provided with the insert 440, any suitable number of flow directors may be installed with an insert for various considerations, including the intensity and desired turbulence of a continuous fluid stream. While the first and second flow directors 448A, 448B are oriented on axes parallel with the longitudinal axis "X2" of the insert, any flow director may be oriented at any suitable angle or position inside of an insert for various considerations, including the intensity and desired turbulence of a continuous fluid stream. In one exemplary embodiment, first and second flow directors may be oriented on axes orthogonal to a longitudinal axis of an insert. In another exemplary embodiment, a first flow director may be oriented on an axis parallel to a longitudinal axis of an insert, and a second flow director may be oriented on an axis orthogonal to the longitudinal axis of the insert. In another exemplary embodiment, a first flow director may be oriented on a first axis measured at a first angle relative to a longitudinal axis of an insert, and a second flow director may be oriented on a second axis measured at a second angle measured relative to the longitudinal axis of the insert where the first and second angle are different from one another.

Figure 5D:
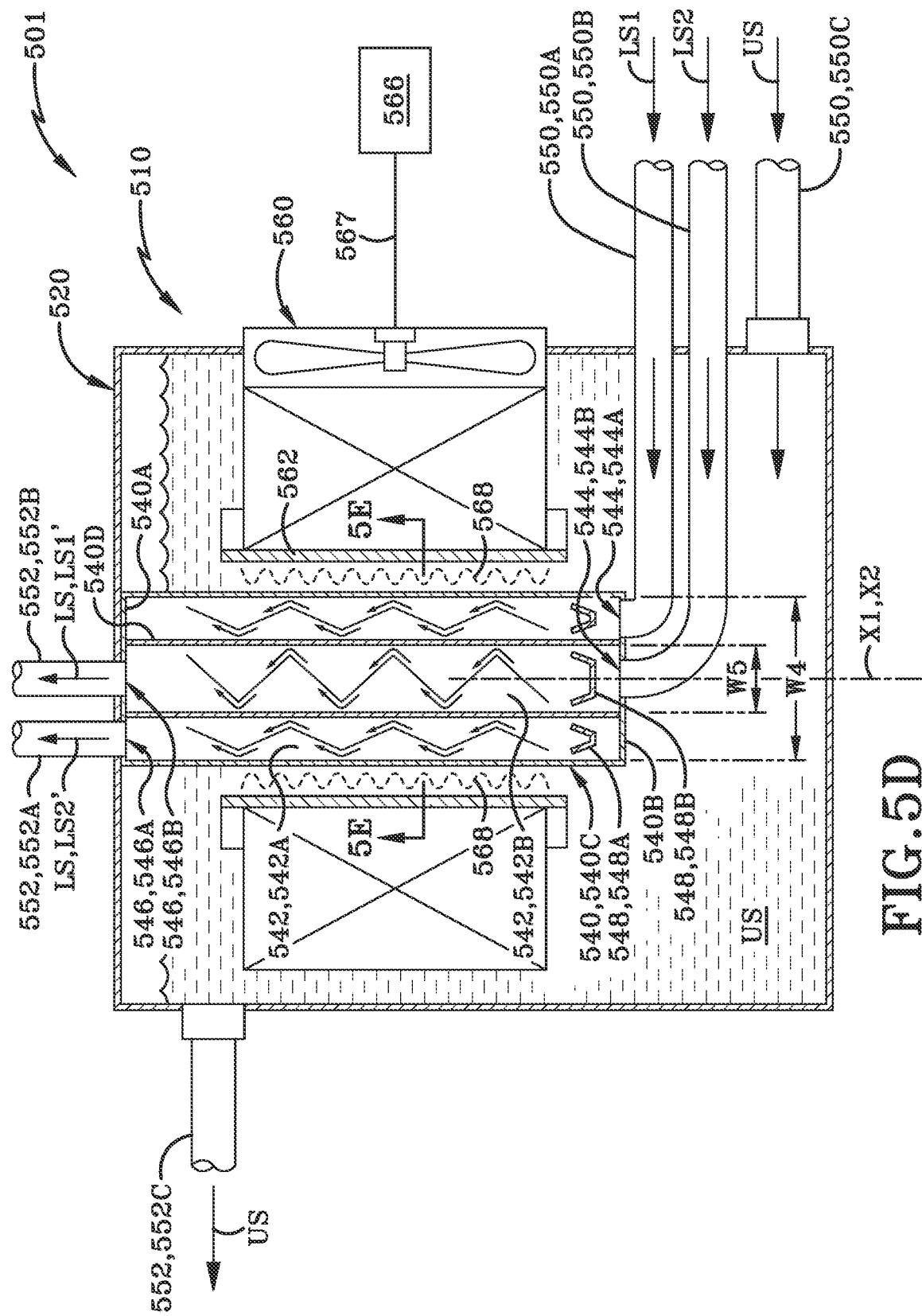
FIG. 5D is a diagrammatic sectional view of an alternative SDA of another fluid cleaning system.
Figure 5E:
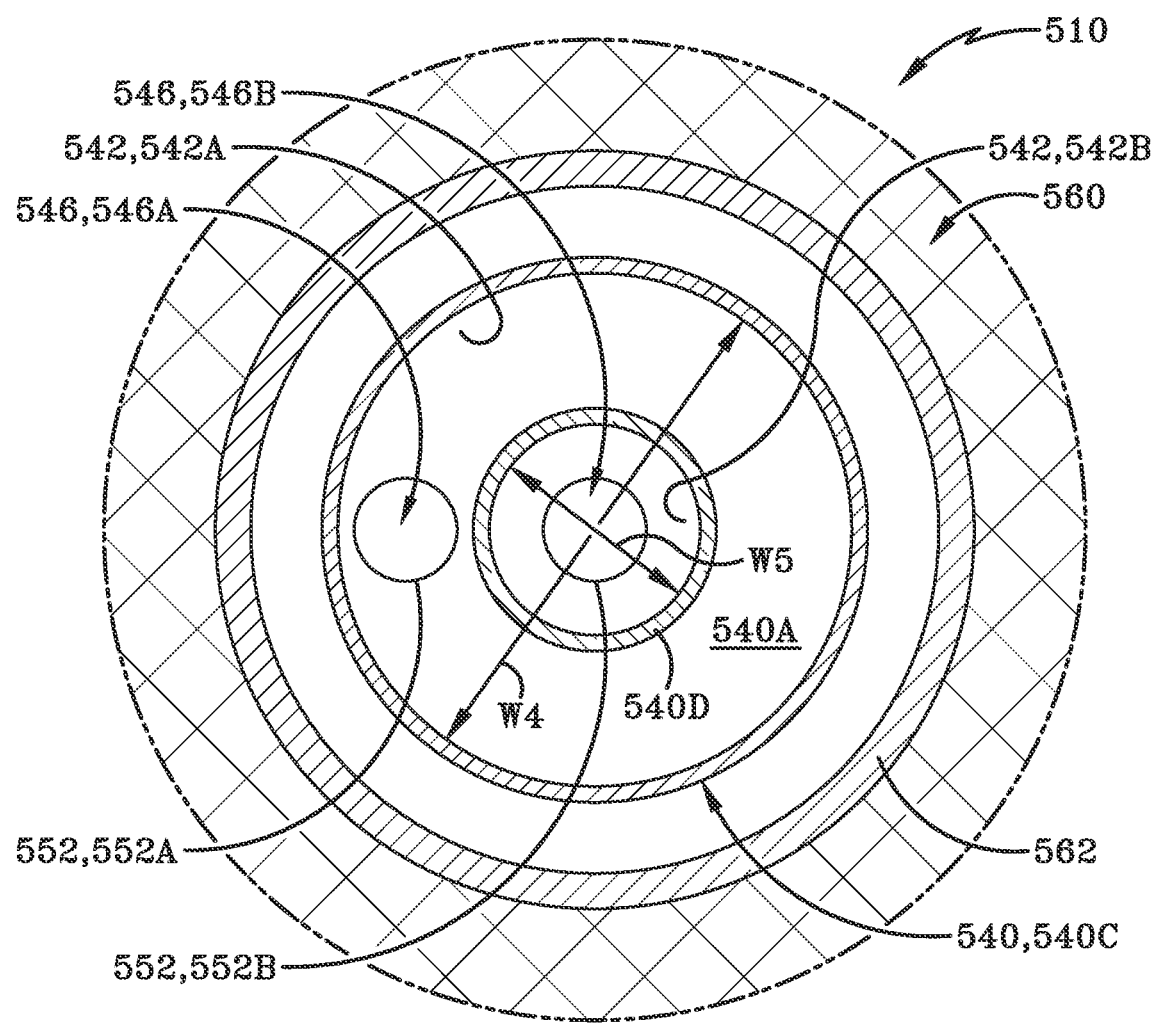
FIG. 5E is a diagrammatic cross-section view of the alternative SDA shown in FIG. 5D taken in the direction of line 5E-5E in FIG. 5D.

FIGS. 5D-5E illustrate another fluid treatment system 501 having at least one SDA 510. The SDA 510 is substantially similar to the SDAs 10, 210, 310, 410 of the fluid treatment systems 1, 201, 301, 401 described above and illustrated in FIGS. 1A-1B, 2, 3, and 5A-5C expect as detailed hereinafter. The SDA 510 includes a housing 520, at least one insert 540 operably engaged with the housing 520, at least one inlet connection 550 operably engaged with the housing 510, at least one outlet connection 552 operably engaged with the housing 510, and a transducer 560 operably engaged inside of the housing 520 disposed about the insert 540 and operatively connected with a generator 566, via an electrical connection 567, to generate a traveling sonic wave 568.

It should be understood that FIGS. 5D-5E are diagrammatic only for the SDA 510 and does not illustrate exact and precise dimensions of any component or assembly of the SDA 510 provided herein. Such diagrammatic illustrations of the SDA 510 shown in FIGS. 5D-5E should not limit the exact positioning, orientation, or location of the SDA 510.

As illustrated in FIG. 5D, the SDA 10 includes a single insert 540 to help isolate dissociation and disintegration of complex substances and solids. The insert 540 includes a first or upper wall 540A, an opposing second or bottom wall 540B, and a longitudinal axis "X2" defined therebetween. As shown in FIGS. 5D-5E, the longitudinal axis "X2" of the insert 540 is parallel with a longitudinal axis "X1" of the housing 520. The insert 540 also includes a first or outer peripheral wall 540C that extends between the upper wall 540A and the lower wall 540B along an axis parallel with the longitudinal axis "X2" of the insert 540. The outer peripheral wall 540C also defines a diameter or width "W4" as shown in FIG. 5E. The insert 540 also includes a second or inner peripheral wall 540D that extends between the upper wall 540A and the lower wall 540B along an axis parallel with the longitudinal axis "X2" of the insert 540. The inner peripheral wall 540D is positioned interior to the outer peripheral wall 540D of the insert 540. The inner peripheral wall 540D also defines a diameter or width "W5" as shown in FIG. 5E; the width "W5" defined by the inner peripheral wall 540D is less than the width "W4" defined by the outer peripheral wall 540C. In the illustrated embodiment, the insert 540 is tubular and/or cylindrically-shaped. In other exemplary embodiments, an insert may have any shape or configuration based on various considerations. Examples of suitable shapes or configuration for an insert include spherical, cubical, cuboidal, conical, triangular, torus-shaped, pyramidal, polyhedron-shaped, and other suitable shapes or configuration for an insert of a SDA.

Still referring to FIGS. 5D-5E, a first or outer fluid passage 542A is collectively defined by the upper wall 540A, the lower wall 540B, and the outer peripheral wall 540C of the insert 540. Additionally, a second or inner fluid passage 542B is collectively defined by the upper wall 540A, the lower wall 540B, and the inner peripheral wall 540D of the insert 540. The outer and inner fluid passages 542A, 542B are accessible via at least one inlet opening 344 and at least one outlet opening 346. In the illustrated embodiment, the outer fluid passage 542A is accessible via a first inlet opening 544A defined in the lower wall 540B of the insert 540. The outer fluid passage 542A is also accessible via a first outlet opening 546A defined in the upper wall 540A of the insert 540. Additionally, the inner fluid passage 542B is accessible via a second inlet opening 544B defined in the lower wall 540B of the insert 540. The inner fluid passage 542B is also accessible via a second outlet opening 546B defined in the upper wall 540A of the insert 540.

While the first and second inlets 544A, 544B are defined in the lower wall 540B of the insert 540 and the first and second outlets 546A, 546B is defined in the upper wall 340A, first and second inlets and first and second outlets of an insert may be defined in any portion of the insert.

Still referring to FIGS. 5D-5E, the insert 540 may also include at least one flow director or baffle 548. In the illustrated embodiment, a first flow director 548A is operably engaged with the outer peripheral wall 540C of the insert 540 proximate to the lower wall 540B and the first inlet 544A of the insert 540. Additionally, a second flow director 548B is operably engaged with the inner peripheral wall 540D of the insert 540 proximate to the lower wall 540B and the second inlet 544B of the insert 540. Each of the first and second flow directors 548A, 548B create a specific flow to first and second continuous fluid streams "LS1", "LS2" that are pumped into the insert 540; the first and second flow directors 548A, 548B in this embodiment create non-laminar flow patterns on the first and second continuous fluid streams "LS1", "LS2". In other exemplary embodiments, flow directors or baffles may be omitted from an insert.

While a single flow director 548A, 548B is provided inside each fluid passage 542A, 542B, any suitable number of flow directors may be installed in a fluid passage of an insert for various considerations, including the desired dwell time of the continuous fluid stream inside of the insert, the intensity and desired turbulence of a continuous fluid stream, and other various considerations. While the first and second flow directors 548A, 542A are positioned proximate to the first and second inlet openings 544A, 544B of the insert 540, flow directors may be positioned along any suitable position inside of an insert for various considerations, including the desired dwell time of the continuous fluid stream inside of the insert, the intensity and desired turbulence of a continuous fluid stream, and other various considerations.

Still referring to FIG. 5D-5E, the at least one inlet connection 550 may be operably engaged with the housing 520 and/or insert 540 for delivering a continuous fluid stream "LS" or a continuous sonic optimization fluid stream "US" for dissociation purposes. As illustrated in FIG. 5D, a first inlet connection 550A is operably engaged with the housing 520 (substantially similar to the first inlet connection 50A and housing 20 described above) and operably engaged with the insert 540 via the first inlet opening 544A. As shown in FIG. 5D, the first inlet connection 550A is configured to direct the first continuous fluid stream "LS1" from a fluid source (i.e., a body of water or fluid) and into the outer fluid passage 542A of the insert 540 via the fluid communication between the first inlet connection 550A and the insert 540. As illustrated in FIG. 5D, a second inlet connection 550B is operably engaged with the housing 520 and operably engaged with the insert 540 via the second inlet opening 544B. As shown in FIG. 5D, the second inlet connection 550B is configured to direct the second continuous fluid stream "LS2" from a fluid source (i.e., a body of water or fluid) or another device in the fluid treatment system 501 (such as a SSA described herein or another SDA 510 or similar SDA described herein) and into the inner fluid passage 542B of the insert 540 via the fluid communication between the second inlet connection 550B and the insert 540.

In addition, a third inlet connection 550C is operably engaged with the housing 320 (substantially similar to the engagement between the second inlet connection 50B and housing 20 described above). As shown in FIG. 5D, the third inlet connection 550C is configured to direct and/or pump the continuous sonic optimization fluid stream "US" from a sonic optimization fluid source into the housing 520 via the fluid communication between the third inlet connection 550C and the housing 520 (substantially similar to the housing 20 described above).

With these configurations, the first and second inlet connections 550A, 550B isolate the first and second continuous fluid streams "LS1", "LS2" from the continuous sonic optimization fluid stream "US" pumped into the housing 520. Such configuration prevents any mixing of or interaction between first and second continuous fluid streams "LS1", "LS2" and the continuous sonic optimization fluid stream "US" during a solids dissociation process as described above in previous solids dissociation processes.

Referring to FIGS. 5D-5E, at least one outlet connection 552 may be operably engaged with the housing 520 and/or insert 540 for delivering a continuous fluid stream "LS" with dissociated substances and/or solids or delivering a continuous sonic optimization fluid stream "US" from the housing 520 for dissociation purposes. In the illustrated embodiment, a first outlet connection 552A is operably engaged with the housing 520 (substantially similar to the first outlet connection 52A and housing 20 described above) and operably engaged with the insert 540 via the first outlet opening 546A. As shown in FIG. 5D, the first outlet connection 552A is configured to direct the first continuous fluid stream "LS1" with dissociated substances and/or solids from the outer fluid passage 542A of the insert 540 to a first output device. In one exemplary embodiment, an output device may be a solids separation apparatus, such as SSA 12, for separating the dissociated substances and/or solids from the continuous fluid stream for purification/cleaning purpose. In another exemplary embodiment, an output device may be another solids dissociation apparatus, such as SDA 10, SDA 210, SDA 310, SDA 410, SDA 510, or other SDAs described and illustrated herein, for providing another process of dissociation.

Additionally, a second outlet connection 552B is operably engaged with the housing 520 (substantially similar to the first outlet connection 52A and housing 20 described above) and operably engaged with the insert 540 via the second outlet opening 546B. As shown in FIG. 5D, the second outlet connection 552B is configured to direct the second continuous fluid stream "LS2" with dissociated substances and/or solids from the inner fluid passage 542B of the insert 540 to a second output device. In one exemplary embodiment, an output device may be a solids separation apparatus, such as SSA 12 or other SSA described and illustrated herein, for separating the dissociated substances and/or solids from the continuous fluid stream for purification/cleaning purpose. In another exemplary embodiment, an output device may be another solids dissociation apparatus, such as SDA 10, SDA 210, SDA 310, SDA 410, SDA 510, or other SDAs described and illustrated herein, for providing another process of dissociation.

The configuration of the insert 540 with the first and second outlet connections 552A, 552B, via the first and second outlets 546A, 546B, is considered advantageous at least because the first and second continuous fluid stream "LS1", "LS2" with dissociated substances and solids may be outputted to different devices and apparatuses for various fluid cleaning operations. In one instance, the first and second outlet connections 552A, 552B may be in fluid communication with first and second SSAs, such as SSA 12, to allow for more than one SSA to separate dissociated substances from the first and second continuous fluid streams "LS1", "LS2" in the fluid treatment system 501. In another instance, the first outlet connection 552A may be in fluid communication with a SSA, such as SSA 12, to separate dissociated substances from the first continuous fluid stream "LS1" in the fluid treatment system 501, and the second outlet connection 552B may be in fluid communication with another SDA, such as SDA 10, SDA 210, SDA 310, SDA 410, or SDA 510, or other SDAs described and illustrated herein, to provide further dissociation of the dissociated substances in the second continuous fluid stream "LS2" in the fluid treatment system 501.

Referring to FIG. 5D, a third outlet connection 552C is operably engaged with the housing 520 (substantially similar to the second outlet connection 52B operably engaged with the housing 20). The third outlet connection 552C is configured to direct and/or pump the continuous sonic optimization fluid stream "US" from the housing 520 to a sonic optimization fluid output device or to the original sonic inlet device. Such pumping and removing of sonic optimization fluid "US" allows for a continuous flow of sonic optimization fluid into the housing 520 for adequate generation of sonic waves during dissociation processes, which are described in more detail below.

Figure 5F:
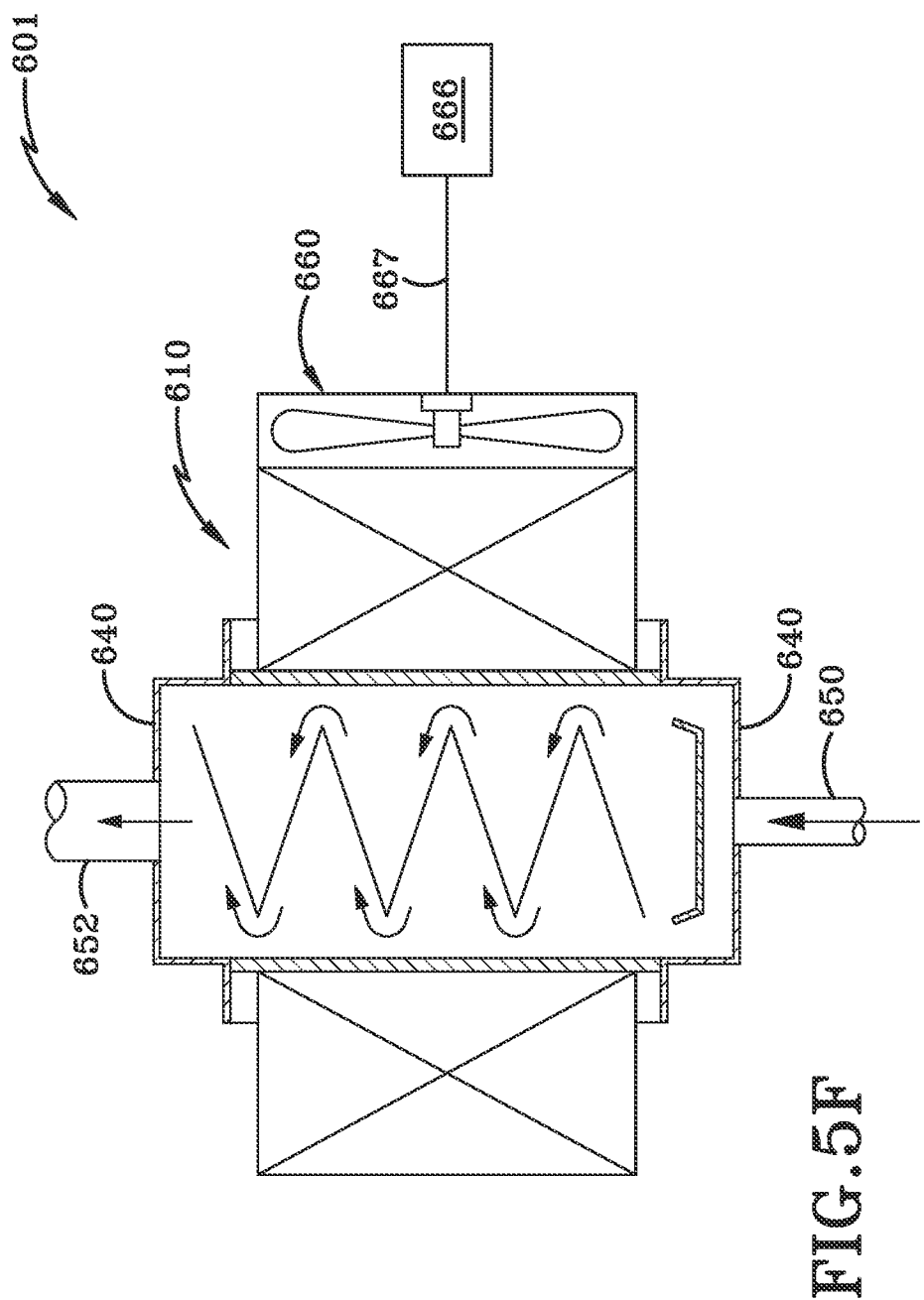
FIG. 5F is a diagrammatic sectional view of an alternative SDA of another fluid cleaning system.

FIG. 5F illustrates another fluid treatment system 601 having at least one SDA 610. The SDA 610 is substantially similar to the SDAs 10, 210, 310, 410, 510 of the fluid treatment systems 1, 201, 301, 401, 501 described above and illustrated in FIGS. 1A-1B, 2, 3, and 5A-5E expect as detailed hereinafter. The SDA 610 includes at least one flange 640, at least one inlet connection 650 operably engaged with the at least one flange 640, at least one outlet connection 652 operably engaged with the at least one flange 640, and a transducer 660 operably engaged with the at least one flange 640 about said at least one flange 640. It should be understood that FIG. 5F is diagrammatic only for the SDA 610 and does not illustrate exact and precise dimensions of any component or assembly of the SDA 610 provided herein. Such diagrammatic illustrations of the SDA 610 shown in FIG. 5F should not limit the exact positioning, orientation, or location of the SDA 610.

In the illustrated embodiment, the SDA 610 includes two flanges 640 operably engaged with the transducer 650 as compared to the insert 40, 240, 340, 440, 540 being operably engaged with the housing 20, 220, 320, 420, 520 and being separate from the transducer 60, 260, 360, 460, 560 as presented in SDAs 10, 210, 310, 410, 510 described and illustrated herein. As such, the flange 640 is directly abutting a circumferential interior wall of the transducer 660 to maximize space between the flanges 640 and the transducer 660. Additional sealing members, such as first and second couples 554A, 554B or other suitable sealing members, may be used for sealing a continuous fluid stream "LS" inside of the flanges 640.

Such configuration between the flanges 640 and the transducer 660 of SDA 610 is considered advantageous at least because this configuration provides a smaller form factor as compared to the other SDAs 10, 210, 310, 410, 510 described and illustrated herein. This small form factor of SDA 610 may be used in tight or small fluid source spaces where the SDA 610 would perform dissociated processes on a smaller volume of fluid stream passing through the SDA 610.

In one exemplary embodiment, an insert of an SDA may have a greater length than the inserts described and illustrated herein, such as inserts 40, 240, 340, 440, 540, 640 of SDAs 10, 210, 310, 410, 510, 610, to prolong dwell time of a continuous fluid stream flowing through the insert. Such additional dwell time allows for the continuous fluid stream to experience a greater time of cavitation inside of the insert for dissociating substances and solids provided in said continuous fluid stream. Additionally, this insert of this exemplary SDA may define any suitable shape to prolong dwell time of a continuous fluid stream flowing through the insert. Examples of suitable shapes and/or configurations for this insert may include coil-shaped, helical-shaped, serpentine-shaped, spiral-shaped, zig-zag-shaped, and any other suitable shapes and/or configurations to prolong dwell time of a continuous fluid stream flowing through the insert.

Figure 6:
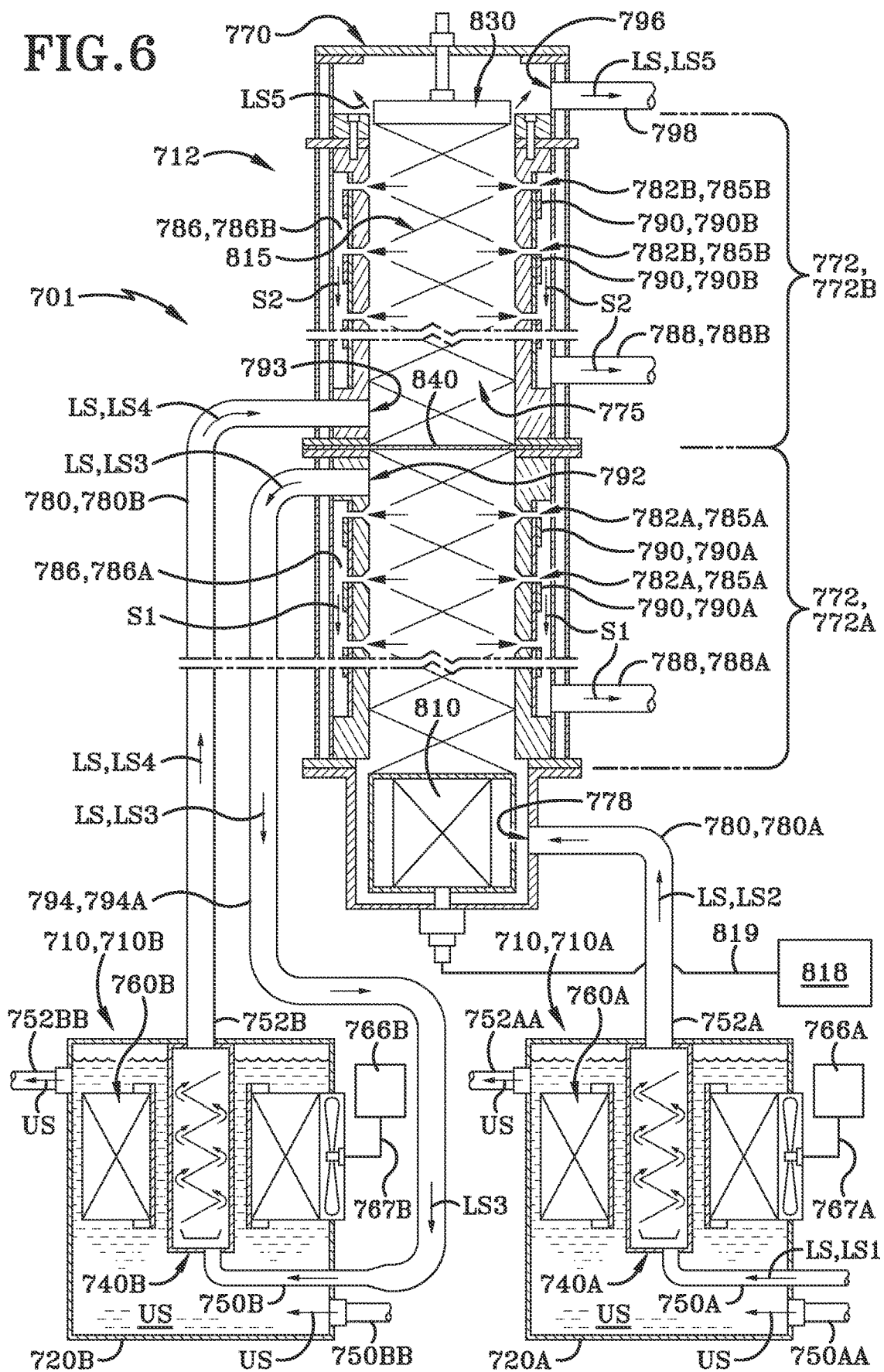
FIG. 6 is a diagrammatic sectional view of another fluid cleaning system having first and second SDAs operably engaged with a SSA.

FIG. 6 illustrates another fluid treatment system 701 having a first SDA 710A and a second SDA 710B operably engaged with at least one SSA 712. The first and second SDA 710A, 710B are substantially similar to the SDA 10 of the fluid treatment system 1 described above and illustrated in FIGS. 1A-1B, 2, 3, and 4A-4B, expect as detailed hereinafter. The SSA 712 is also substantially similar to the SSA 12 of the fluid treatment system 1 described above and illustrated in FIGS. 1A-1B, 2, 3, and 4A-4B, expect as detailed hereinafter.

It should be understood that FIG. 6 is diagrammatic only for the fluid treatment system 701 and do not illustrate exact and precise dimensions of any component, assembly, or apparatus provided herein. Such diagrammatic illustrations of the at least one SDA 710 and the at least one SSA 712 of the fluid treatment system 701 shown in FIG. 6 should not limit the exact positioning, orientation, or location of the at least one SDA 710 and the at least one SSA 712 relative to one another.

As illustrated in FIG. 6, the first SDA 710A includes a housing 720A, an insert 740A operably engaged with the housing 720A inside said housing 720A, a first inlet connection 750A operably engaged with the housing 720A and the insert 740A where the first inlet connection 750A directs a continuous fluid stream "LS" into the insert 740A, a second inlet connection 750AA operably engaged with the housing 720A where the second inlet connection 750AA directs a continuous sonic optimization fluid stream "US" into the housing 720A, a first outlet connection 752A operably engaged with the housing 720A and the insert 740A where the first outlet connection 752A directs the fluid stream "LS" out from the insert 740A, a second outlet connection 752AA operably engaged with the housing 720A where the second outlet connection 752AA directs the continuous sonic optimization fluid stream "US" from the housing 720A, and a transducer 760A operably engaged with the housing 720A inside said housing 720A and disposed about the insert 740A.

Similarly, the second SDA 710B includes a housing 720B, an insert 740B operably engaged with the housing 720B inside said housing 720B, a first inlet connection 750B operably engaged with the housing 720B and the insert 740B where the first inlet connection 750B directs a continuous fluid stream "LS" into the insert 740B, a second inlet connection 750BB operably engaged with the housing 720B where the second inlet connection 750BB directs a continuous sonic optimization fluid stream "US" into the housing 720B, a first outlet connection 752B operably engaged with the housing 720B and the insert 740B where the first outlet connection 752B directs the fluid stream "LS" out from the insert 740B, a second outlet connection 752BB operably engaged with the housing 720B where the second outlet connection 752BB directs the continuous sonic optimization fluid stream "US" from the housing 720B, and a transducer 760B operably engaged with the housing 720B inside said housing 720B and disposed about the insert 740B.

Still referring to FIG. 6, the SSA 712 includes a tower 770 having at least a first stage 772A and a second stage 772B. In the first stage 772A of the tower 770, a first fluid stream inlet 778 is defined in the tower 770 for providing fluid access into the tower 770, specifically into a chamber 775 defined by the tower 770. Additionally, a first inlet connection 780A operably engages with the first SDA 710A and the SSA 712 to provide fluid communication between said first SDA 710A and said SSA 712. In the illustrated embodiment, the first inlet connection 780A and the at least one outlet connection 752A are separate connections that are operably engaged with one another. In one exemplary embodiment, a first inlet connection of a tower and at least one outlet connection of a first SDA are a single, unitary member providing fluid communication between the tower and the first SDA.

Still referring to FIG. 6, the first stage 772A of the tower 770 defines a first set of ports 782A substantially similar to the first set of ports 82A defined in the first stage 72A of the tower 70 in the fluid cleaning system 1 described above. Additionally, the first stage 772A of the tower 770 also defines a first set of passageways 785A between the first set of ports 782A and a first effluent outlet 786A defined in the first stage 772A of the tower 770. Such configuration between the first set of ports 782A, the first set of passageways 785A, and the first effluent outlet 786A is substantially similar to the configuration between the first set of ports 82A, the first set of passageways 85A, and the first effluent outlet 86A of the first stage 72A of the tower 70 in the fluid cleaning system 1 described above. A first effluent outlet connection 788A may be also be operably engaged with the tower 770 to provide fluid communication between the first effluent outlet 786A and an output device or facility for delivering dissociated solids and effluent fluids. Moreover, a first set of shutters 790A may be operably engaged with the first stage 772A of the tower to control the flow rate of the fluid stream "LS" flowing through the first stage 772A of the tower 770, the first set of shutters 790A are substantially similar to the first set of shutters 90A of the first stage 72A of the tower 70 in the fluid cleaning system 1 described above.

Referring to FIG. 6, the tower 770 also defines a first stream outlet 792 that provides fluid communication to the first stage 772A. The first stream outlet 792 also allows a first transfer connection 794A to operably engage with the tower 770 to transfer fluid from the first stage 772A of the tower 770 to the second SDA 710B. Such transferring of fluid from the first stage 772A of the tower 770 to the second SDA 710B is described in more detail below.

Similarly, a second fluid stream inlet 793 is defined in the tower 770 for providing fluid access into the tower 770. Additionally, a second inlet connection 780B operably engages with the second SDA 710B and the SSA 712 to provide fluid communication between said second SDA 710B and said SSA 712. Additionally, the second stage 772B of the tower 770 defines a second set of ports 782B substantially similar to the second set of ports 82B defined in the second stage 72B of the tower 70 in the fluid cleaning system 1 described above. Additionally, the second stage 772B of the tower 770 also defines a second set of passageways 785B between the second set of ports 782B and a second effluent outlet 786B defined in the second stage 772B of the tower 770. Such configuration between the second set of ports 782B, the second set of passageways 785B, and the second effluent outlet 786B is substantially similar to the configuration between the second set of ports 82B, the second set of passageways 85B, and the second effluent outlet 86B of the second stage 72B of the tower 70 in the fluid cleaning system 1 described above. A second effluent outlet connection 788B may be also be operably engaged with the tower 770 to provide fluid communication between the second effluent outlet 786B and an output device for delivering dissociated solids and effluent fluids. Moreover, a second set of shutters 790B may be operably engaged with the second stage 772B of the tower to control the flow rate of the fluid stream "LS" flowing through the second stage 772B of the tower 770; the second set of shutters 790B are substantially similar to the second set of shutters 90B of the second stage 72B of the tower 70 in the fluid cleaning system 1 described above.

Moreover, the SSA 712 also includes an adjustable transducer 810, an adjustable reflector 830, and an adjustable diaphragm 840 for fine tuning and precisely adjusting the standing sonic wave 816 inside of the tower 770. The adjustable transducer 810, adjustable reflector 830, and adjustable diaphragm 840 are substantially similar to the adjustable transducer 110, adjustable reflector 130, and adjustable diaphragm 140 of the SSA 12 in the fluid cleaning apparatus 1 described above.

Having now described the components and assemblies of the fluid cleaning system 701, the method of use is described in more detail below. The method of using the fluid cleaning system 701 is substantially similar to the method of using the fluid cleaning system 1 described above, except as detailed below.

Similar to fluid cleaning system 1, a continuous fluid stream "LS" in a first state, which is generally referred to as "LS1" via arrows in FIG. 6, is pumped into the first SDA 710A, via the first inlet connection 750A, to provide continuous dissociation and disintegration of complex substances and solids found in the fluid steam "LS1". Once the complex substances and solids provided in the fluid stream "LS" are dissociated by the first SDA 710A, the continuous fluid stream "LS" of the first state "LS1" transitions to a continuous fluid stream of a second state, which is generally referred to as "LS2" via arrows in FIG. 6, containing dissociated substances and solids. Such dissociation of the complex substances and solids occurs via the operation of the transducer 760A is substantially similar to the operations performed by the transducer 60 described above.

Still referring to FIG. 6, the continuous fluid stream "LS2" is then pumped into the first stage 772A of the tower 770 via the first fluid steam inlet connection 780A. Once inside of the first stage 772A of the tower 770, a first plurality of dissociated solids "S1" is separated from the continuous fluid stream "LS2" through the first set of ports 782A, the first set of passageways 785A, and the first effluent outlet 786A. The first plurality of dissociated solids "S1" is denoted by arrows labeled "S1" in FIG. 6. Once the first plurality of dissociated solids "S1" is separated, the continuous fluid stream of the second state "LS2" transitions to a continuous fluid stream of a third state, which is generally referred to as "LS3" via arrows in FIG. 6.

Still referring to FIG. 6, the continuous fluid stream "LS3" is then pumped from the first stage 772A of the tower 770 and into the second SDA 710B via the first transfer connection 794A; the first transfer connection 794A provides fluid communication between the first stage 772A of the tower 770 and the second SDA 710B. Similar to the first SDA 710A, the second SDA 710B provides an additional continuous dissociation and disintegration of complex substances and solids that may still be provided in the continuous fluid steam "LS3". Once the complex substances and solids provided in the continuous fluid stream "LS3" are dissociated by the second SDA 710B, the continuous fluid stream of the third state "LS3" transitions to a continuous fluid stream of a fourth state, which is generally referred to as "LS4" via arrows in FIG. 6, containing dissociated substances and solids. Such dissociation of the complex substances and solids occurs via the operation of the transducer 760B is substantially similar to the operations performed by the transducer 60 described above.

As such, this configuration of the fluid cleaning system 701 allows a continuous fluid stream to experience two operations of dissociation and disintegration in a single pass through the fluid cleaning system 701 via the use of the first and second SDAs 710A, 710B. With this configuration, any complex substances that may have remained associated or integrated during the first dissociation and disintegration operation and/or remained with the continuous fluid stream during the separation operation may now be fully dissociated and disintegrated before entering the second stage 772B of the tower 770.

Still referring to FIG. 6, the continuous fluid stream "LS4" is then pumped into the second stage 772B of the tower 770 via the second inlet connection 780B; the second inlet connection 780B provides fluid communication between the second SDA 710B and the second stage 772B of the tower 770. Once inside of the second stage 772B of the tower 770, a second plurality of dissociated solids "S2" is separated from the continuous fluid stream "LS4" through the second set of ports 782B, the second set of passageways 785B, and the first effluent outlet 786A. The second plurality of dissociated solids is denoted by arrows labeled "S2" in FIG. 6. Once the second plurality of dissociated solids "S2" is separated, the continuous fluid stream of the fourth state "LS4" transitions to a continuous fluid stream of a fifth state, which is generally referred to as "LS5" via arrows in FIG. 6. The continuous fluid stream "LS5" is then pumped from the second stage 772B of the tower 770 to a clean fluid container or vessel via at least one cleaned fluid outlet 796 defined in the tower 770 and at least one cleaned fluid outlet connection 798 operably engaged with the tower 770 and the clean fluid container or vessel.

While first and second SDAs 710A, 710B are used with a single SSA 712 described above, any suitable number of SDAs may be used with any suitable number of SSAs for dissociating complex substances and separating these dissociated complex substances to produce clean fluid. Additionally, while the first and second SDAs 710A, 710B of the fluid cleaning system 701 were similar to the SDA 10 of the fluid cleaning system 1 described above, any suitable SDA described and illustrated herein may be used such as SDA 10, SDA 210, SDA 310, SDA 410, SDA 510, and SDA 610.

Figure 7:
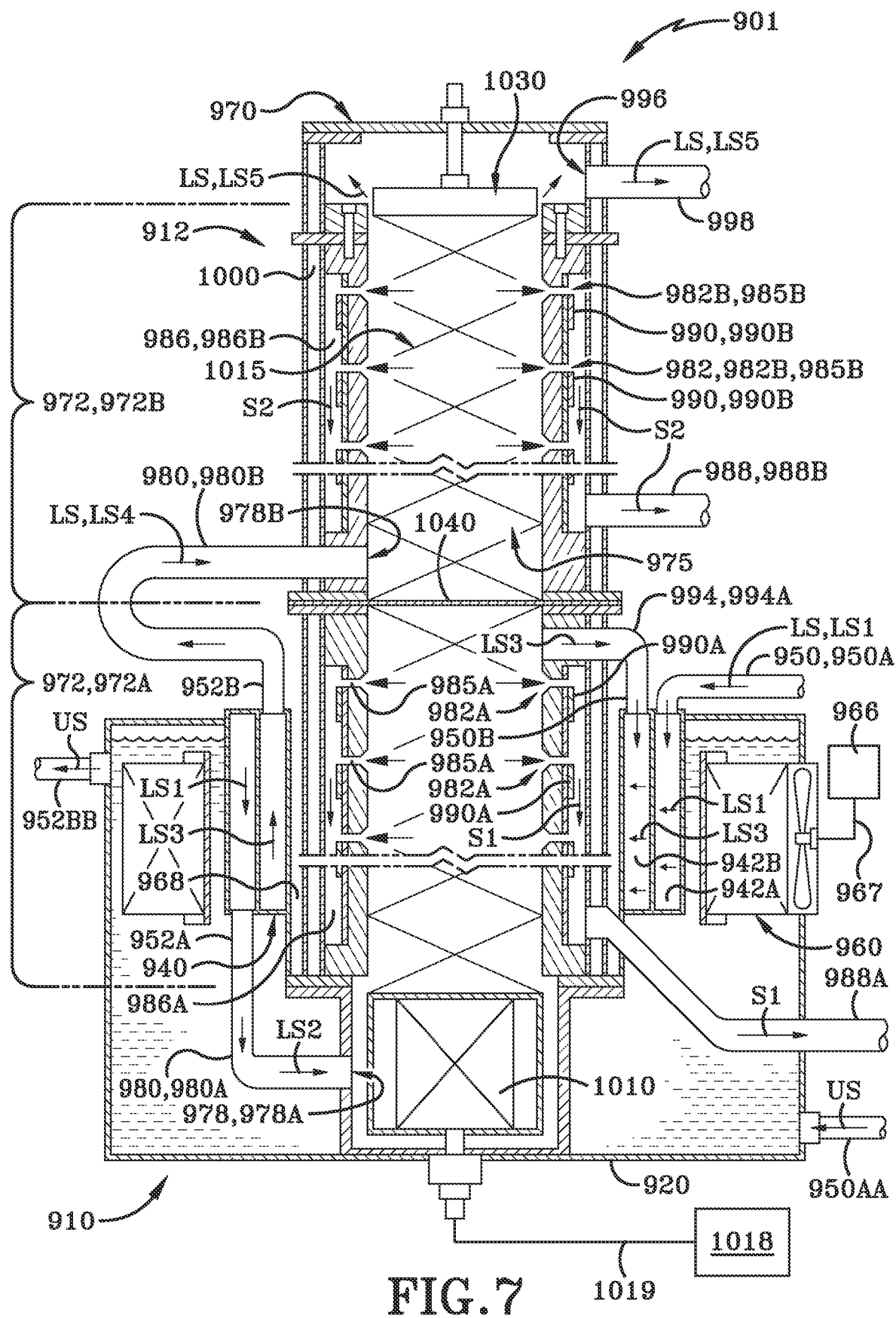
FIG. 7 is a diagrammatic sectional view of another fluid cleaning system having a SDA operably engaged with a SSA, wherein a portion of the SSA is provided inside of the SDA.

FIG. 7 illustrates another fluid treatment system 901 having at least one SDA 910 and operably engaged with at least one SSA 912. The at least one SDA 910 is substantially similar to the SDA 510 of the fluid treatment system 501 described above and illustrated in FIGS. 5D-5E, expect as detailed hereinafter. The SSA 912 is also substantially similar to the SSA 12 of the fluid treatment system 1 described above and illustrated in FIGS. 1A-1B, 2, 3, and 4A-4B, expect as detailed hereinafter.

It should be understood that FIG. 7 is diagrammatic only for the fluid treatment system 901 and do not illustrate exact and precise dimensions of any component, assembly, or apparatus provided herein. Such diagrammatic illustrations of the at least one SDA 910 and the at least one SSA 912 of the fluid treatment system 901 shown in FIG. 7 should not limit the exact positioning, orientation, or location of the at least one SDA 910 and the at least one SSA 912 relative to one another.

As illustrated in FIG. 7, a single SDA 910 is used in the fluid treatment system 901. The SDA 910 includes a housing 920, an insert 940 operably engaged with the housing 920 inside said housing 920. As shown in FIG. 7, the insert 940 has a first or outer fluid passage 942A and a second or inner fluid passage 942B substantially similar to the insert 540 that has outer and inner fluid passages 542A, 542B in SDA 510. Additionally, first and second flow directors (not illustrated) are provided inside the outer and inner fluid passages 942A, 942B to direct the continuous fluid stream "LS" from the insert 940 and into the tower 970 of the SSA 912. The SDA 910 also includes a first inlet connection 950A and a first outlet connection 952A operably engaged with the inlet 940 where the first inlet connection 950A and the first outlet connection 952A are in fluid communication with the outer fluid passage 942A. The SDA 910 also includes a second inlet connection 950B and a second outlet connection 952B operably engaged with the inlet 940 where the second inlet connection 950A and the second outlet connection 952A are in fluid communication with the inner fluid passage 942B. The SDA 910 also includes a third inlet connection 950AA and third outlet connection 952BB to provide a continuous sonic optimization fluid stream "US" through the housing 920 for cavitation operations (described previously). Additionally, the SDA 910 includes a transducer 960 to provide dissociation of complex substances and compounds provided in a continuous fluid stream "LS" traveling through the insert 940.

Still referring to FIG. 7, the SDA 910 defines an air gap 968 between the insert 940 and the SSA 912. The air gap 968 between the SDA 910 and the SSA 912 isolates the traveling sonic wave (not illustrated) transmitted by the transducer 960 of the SDA 910 from the any sonic wave transmitted by a device in the SSA 912 during operation of the fluid treatment system 901, which is described in more detail below.

Still referring to FIG. 7, the SSA 912 includes a tower 970 having at least at one stage 972. In the illustrated embodiment, the tower 970 includes a first stage 972A and a second stage 972B. In the first stage 972A of the tower 970, at least one fluid steam inlet 978 and at least one fluid stream outlet 980 is defined in the tower 970. As illustrated in FIG. 7, a first fluid stream inlet 978A is defined in the tower 970 for providing fluid access into the tower 970, specifically into the chamber 975 defined by the tower 970. Additionally, a first inlet connection 980A operably engages with the SDA 910A and the SSA 912 to provide fluid communication between said first SDA 910A and said SSA 912. In the illustrated embodiment, the first inlet connection 980A and the first outlet connection 952A are separate connections that are operably engaged with one another. In one exemplary embodiment, a first inlet connection of a tower and at least one outlet connection of a SDA are a single, unitary member providing fluid communication between the tower and the SDA.

Still referring to FIG. 7, the first stage 972A of the tower 970 defines a first set of ports 982A substantially similar to the first set of ports 82A defined in the first stage 72A of the tower 70 in the fluid cleaning system 1 described above. Additionally, the first stage 972A of the tower 970 also defines a first set of passageways 985A between the first set of ports 982A and a first effluent outlet 986A defined in the first stage 972A of the tower 970. Such configuration between the first set of ports 982A, the first set of passageways 985A, and the first effluent outlet 986A is substantially similar to the configuration between the first set of ports 82A, the first set of passageways 85A, and the first effluent outlet 86A of the first stage 72A of the tower 70 in the fluid cleaning system 1 described above. A first effluent outlet connection 988A may be also be operably engaged with the tower 970 to provide fluid communication between the first effluent outlet 986A and an output device or facility for delivering dissociated solids and effluent fluids. Moreover, a first set of shutters 990A may be operably engaged with the first stage 972A of the tower 970 to control the flow rate of the fluid stream "LS" flowing through the first stage 972A of the tower 970; the first set of shutters 990A are substantially similar to the first set of shutters 90A of the first stage 72A of the tower 70 in the fluid cleaning system 1 described above.

Similarly, a second fluid stream inlet 978B is defined in the tower 970 for providing fluid access into the tower 970, specifically the chamber 975 defined by the tower 770. Additionally, a second inlet connection 980B operably engages with the second SDA 910B and the SSA 912 to provide fluid communication between said second SDA 910B and said SSA 912. In the illustrated embodiment, the second inlet connection 980B and the second outlet connection 952B are separate connections that are operably engaged with one another. In one exemplary embodiment, a second inlet connection of a tower and second outlet connection of a SDA are a single, unitary member providing fluid communication between the tower and the SDA.

Additionally, the second stage 972B of the tower 970 defines a second set of ports 982B substantially similar to the second set of ports 82B defined in the second stage 72B of the tower 70 in the fluid cleaning system 1 described above. Additionally, the second stage 972B of the tower 970 also defines a second set of passageways 985B between the second set of ports 982B and a second effluent outlet 986B defined in the second stage 972B of the tower 970. Such configuration between the second set of ports 982B, the second set of passageways 985B, and the second effluent outlet 986B is substantially similar to the configuration between the second set of ports 82B, the second set of passageways 85B, and the second effluent outlet 86B of the second stage 72B of the tower 70 in the fluid cleaning system 1 described above. A second effluent outlet connection 988B may be also be operably engaged with the tower 970 to provide fluid communication between the second effluent outlet 986B and an output device for delivering dissociated solids and effluent fluids. Moreover, a second set of shutters 990B may be operably engaged with the second stage 972B of the tower to control the flow rate of the fluid stream "LS" flowing through the second stage 972B of the tower 970; the second set of shutters 990B are substantially similar to the second set of shutters 90B of the second stage 72B of the tower 70 in the fluid cleaning system 1 described above.

Still referring to FIG. 7, the tower 970 of the SSA 912 also defines at least one cleaned fluid outlet 996 defined in the tower 770 for pumping the cleaned fluid stream from the tower 970. The SSA 912 also includes at least one cleaned fluid outlet connection 998 operably engaged with the tower 970 and a clean fluid container or vessel to direct the cleaned fluid stream from the tower 970.

Still referring to FIG. 7, the SSA 912 also includes at least one air space 1000 defined in the tower 970 that extends from the first stage 972A to the second stage 972B. Such use of the at least one air space 1000 is substantially similar to the at least one air space 100 of the SSA 12 in the fluid treatment system 1 where the at least one air space 1000 isolates the traveling sonic wave (not illustrated) transmitted by the transducer 960 of the SDA 910 from the standing sonic wave 1015 transmitted by the transducer 1010 of the SSA 912 during operation of the fluid treatment system 901.

Moreover, the SSA 912 also includes an adjustable transducer 1010, an adjustable reflector 1030, and an adjustable diaphragm 1040 for fine tuning and precisely adjusting the standing sonic wave 1016 inside of the tower 970. The adjustable transducer 1010, adjustable reflector 1030, and adjustable diaphragm 1040 are substantially similar to the adjustable transducer 110, adjustable reflector 130, and adjustable diaphragm 140 of the SSA 12 in the fluid cleaning apparatus 1 described above.

In the fluid treatment system 901, a portion of the SSA 912 is operably engaged inside of the SDA 910 to maximize the overall footprint of the fluid treatment system 901. In particular, a portion of the tower 970 (specifically a portion of the first stage 972A) along with the transducer 1010 of the SSA 912 is provided inside of the housing 920 of the SDA 910. While the transducer 960 of the SDA 910 surrounds the tower 970 and the transducer 1010 of the SSA 912, the at least one air space 1000 of the SSA 912 isolates the sonic waves generated by the transducer 960 of the SDA 910 from the sonic waves generated by transducer 1010 of the SSA 912 during operation of the fluid treatment system 901. This configuration is considered advantageous at least because the fluid treatment system 1 is provided in a single, integrated member as compared to the other fluid treatment systems, particularly fluid treatments 1, 701, where the SDA and the SSA in other fluid treatment systems are positioned away from one another.

Having now described the components and assemblies of the fluid cleaning system 901, the method of use is described in more detail below. The method of using the fluid cleaning system 901 is substantially similar to the method of using the fluid cleaning systems 1, 701 described above, except as detailed below.

Similar to fluid cleaning systems 1, 701, a continuous fluid stream in a first state, which is generally referred to as "LS1" via arrows in FIG. 7, is pumped into the outer fluid passage 942A of insert 940 of the SDA 910 to provide continuous dissociation and disintegration of complex substances and solids found in the continuous fluid steam "LS1". Once pumped into the outer fluid passage 942A, the continuous fluid stream "LS1" is directed inside of the outer fluid passage 942A via a first flow director (not illustrated) based on the directional arrows labeled "LS1" in FIG. 7. In the illustrated embodiment, the first flow director provides the continuous fluid stream "LS1" in a non-laminar flow state for a longer dwell time inside of the insert 940; such purpose of a longer dwell time is described above. Once the complex substances and solids found in the continuous fluid stream "LS1" are dissociated by the SDA 910, via the transducer 960, the continuous fluid stream of the first state "LS1" transitions to a continuous fluid stream of a second state, which is generally referred to as "LS2" via arrows in FIG. 7, containing dissociated substances and solids.

Still referring to FIG. 7, the continuous fluid stream "LS2" is then pumped into the first stage 972A of the tower 970 via the first outlet connection 952A and the first fluid steam inlet connection 980A. Once inside of the first stage 972A of the tower 970, a first plurality of dissociated solids is separated from the continuous fluid stream "LS2" through the first set of ports 982A, the first set of passageways 985A, and the first effluent outlet 986A. The first plurality of dissociated solids is denoted by arrows labeled "S1" in FIG. 7. Once the first plurality of dissociated solids "S1" is separated, the continuous fluid stream of the second state "LS2" transitions to a continuous fluid stream of a third state, which is generally referred to as "LS3" via arrows in FIG. 7.

Still referring to FIG. 7, the continuous fluid stream "LS3" is then pumped from the first stage 972A of the tower 970 into the second SDA 910B via the second inlet connection 950A and a first transfer connection 994A; the first transfer connection 994A provides fluid communication between the first stage 972A of the tower 970 and the inner fluid passage 942B of the SDA 910. In the illustrated embodiment, the second inlet connection 950B and the first transfer connection 994A are separate connections that are operably engaged with one another. In one exemplary embodiment, a second inlet connection of a SDA and a first transfer connection of a tower are a single, unitary member providing fluid communication between the SDA and the tower.

The SDA 910 then provides an additional continuous dissociation and disintegration of complex substances and solids found in the continuous fluid steam "LS3". The continuous fluid stream "LS3" is directed inside of the inner fluid passage 942B via a second flow director (not illustrated) based on the directional arrows labeled "LS3" in FIG. 7. Once the complex substances and solids provided in the continuous fluid stream "LS3" are further dissociated by the SDA 910, the continuous fluid stream of the third state "LS3" transitions to a continuous fluid stream of a fourth state, which is generally referred to as "LS4" via arrows in FIG. 7, containing further dissociated substances and solids. As such, this configuration of the fluid cleaning system 901 allows a continuous fluid stream to experience two operations of dissociation and disintegration in a single pass through the fluid cleaning system 901 via the use of outer and inner fluid passages 942A, 942B of a single insert 940 of the SDA 910. With this configuration, any complex substances that may have remained associated or integrated during the first dissociation and disintegration operation and/or remained with the continuous fluid stream during the separation operation may now be fully dissociated and disintegrated.

Still referring to FIG. 7, the continuous fluid stream "LS4" is then pumped into the second stage 972B of the tower 970 via the second outlet connection 952B and the second inlet connection 980B. Once inside of the second stage 972B of the tower 970, a second plurality of dissociated solids is separated from the continuous fluid stream "LS4" through the second set of ports 982B, the second set of passageways 985B, and the first effluent outlet 986A. The second plurality of dissociated solids is denoted by arrows labeled "S2" in the FIG. 7 Once the second plurality of dissociated solids "S2" is separated, the continuous fluid stream of the fourth state "LS4" transitions to a continuous fluid stream of a fifth state, which is generally referred to as "LS5" via arrows in FIG. 7. The continuous fluid stream "LS5" is then pumped from the second stage 972B of the tower 970 to a clean fluid container or vessel for use.

While a single SDA 910 was used with a single SSA 712 described above, any suitable number of SDAs may be used with any suitable number of SSAs for dissociating complex substances and separating these dissociated complex substances to produce clean fluid. Additionally, while the SDA 910 of the fluid cleaning system 901 was similar to the SDA 510 of the fluid cleaning system 501 described above, any suitable SDA described and illustrated herein may be used such as SDA 10, SDA 210, SDA 310, SDA 410, and/or SDA 610.

As provided herein, SDAs 10, 210, 310, 410, 510, 610, 710A, 710B, 910 are free from using any ancillary chemicals, membrane filtration or other additives to dissociate and disintegrate complex substances and solids provided in a continuous fluid stream. In other words, SDAs 10, 210, 310, 410, 510, 610, 710A, 710B, 910 only use sonic waves to dissociate and disintegrate complex substances and solids provided in a continuous fluid stream as compared to common operations and practices using ancillary chemicals, membrane or other additives. Additionally, SSAs 12, 712, 912 are also free from using any ancillary chemicals, membrane or other additives to remove and separate dissociated substances and solids from the continuous fluid stream. In other words, SSAs 12, 712, 912 only use sonic waves to remove and separate dissociated substances and solids from the continuous fluid stream as compared to common operations and practices using ancillary chemicals, membrane or other additives.

It should be understood that any transducer described and illustrated herein may transmit sonic and/or ultrasonic frequencies to create standing waves in a SDA described and illustrated or traveling waves in a SSA described and illustrated herein. Additionally, the transducers described and illustrated herein may transmit waves from sonic frequencies that are within or below the audible frequencies.

Moreover, it should be understood that generator output signals outputted to transducers described and illustrated herein may be at any frequencies when transmitting traveling waves into SDAs described and illustrated and when transmitting standing waves into SSAs described and illustrated herein. In one exemplary embodiment, generator output signals outputted to transducers described and illustrated herein may be at fixed frequencies at desired fixed frequencies and amplitudes when transmitting traveling waves into SDAs described and illustrated and when transmitting standing waves into SSAs described and illustrated herein. In one exemplary embodiment, generator output signals outputted to transducers described and illustrated herein may be at modulated frequencies over a desired range of frequencies and amplitudes when transmitting traveling waves into SDAs described and illustrated and when transmitting standing waves into SSAs described and illustrated herein.

Figure 8:
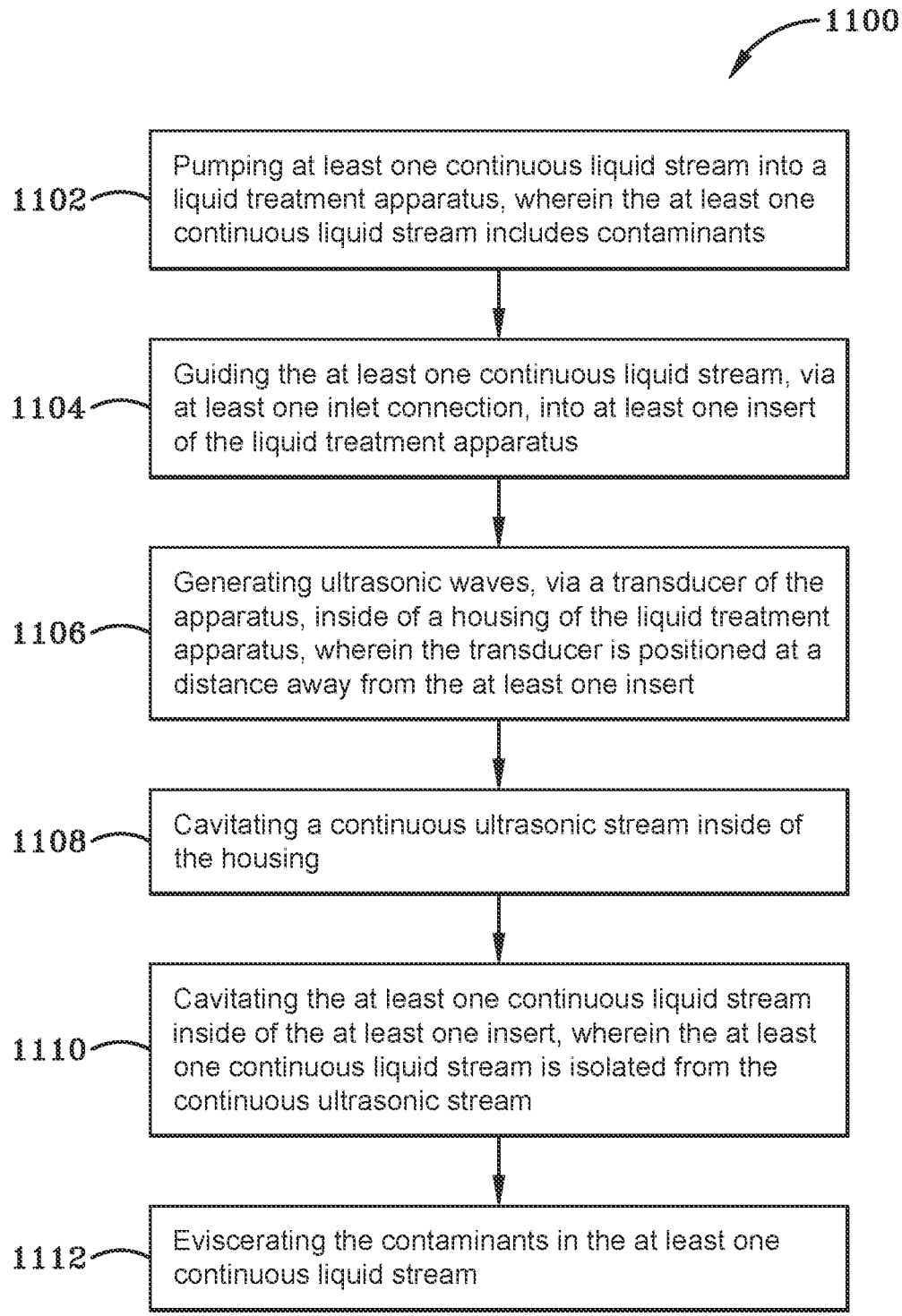
FIG. 8 is a method flowchart of eviscerating contaminants in a continuous fluid stream.

FIG. 8 illustrates a method 1100 of eviscerating contaminants in a continuous fluid stream. An initial step 1102 of method 1100 comprises pumping at least one continuous fluid stream into a fluid treatment apparatus, wherein the at least one continuous fluid stream includes contaminants. Another step 1104 comprises guiding the at least one continuous fluid stream, via at least one inlet connection, into at least one insert of the fluid treatment apparatus. Another step 1106 comprises generating sonic waves, via a transducer of the apparatus, inside of a housing of the fluid treatment apparatus, wherein the transducer is positioned at a distance away from the at least one insert. Another step 1108 comprises cavitating a continuous sonic stream inside of the housing. Another step 1110 comprises cavitating the at least one continuous fluid stream inside of the at least one insert, wherein the at least one continuous fluid stream is isolated from the continuous sonic stream. Another step 1112 comprises eviscerating the contaminants in the at least one continuous fluid stream.

In an exemplary embodiment, method 1100 may include additional steps of eviscerating contaminants in a continuous fluid stream. An optional step includes directing the at least one continuous fluid stream with eviscerated contaminants, via at least one outlet connection, to at least one output device. An optional step includes directing the at least one continuous fluid stream with eviscerated contaminants, via a second outlet connection, to a second output device. Optional steps include pumping a second continuous fluid stream into the fluid treatment apparatus, wherein the second continuous fluid stream includes one of contaminants and eviscerated contaminants; guiding the second continuous fluid stream, via a second inlet connection, into a second insert of the fluid treatment apparatus; cavitating the second continuous fluid stream inside of the at least one insert, wherein the at least one continuous fluid stream is isolated from the continuous sonic stream; eviscerating one of the contaminants and the eviscerated contaminants in the second continuous fluid stream; and directing the second fluid stream with eviscerated contaminants, via a second outlet connection, to a second output device. An optional step includes directing the at least one continuous fluid stream, via at least one director, in one of a non-laminar flow and a laminar flow.

Figure 9:
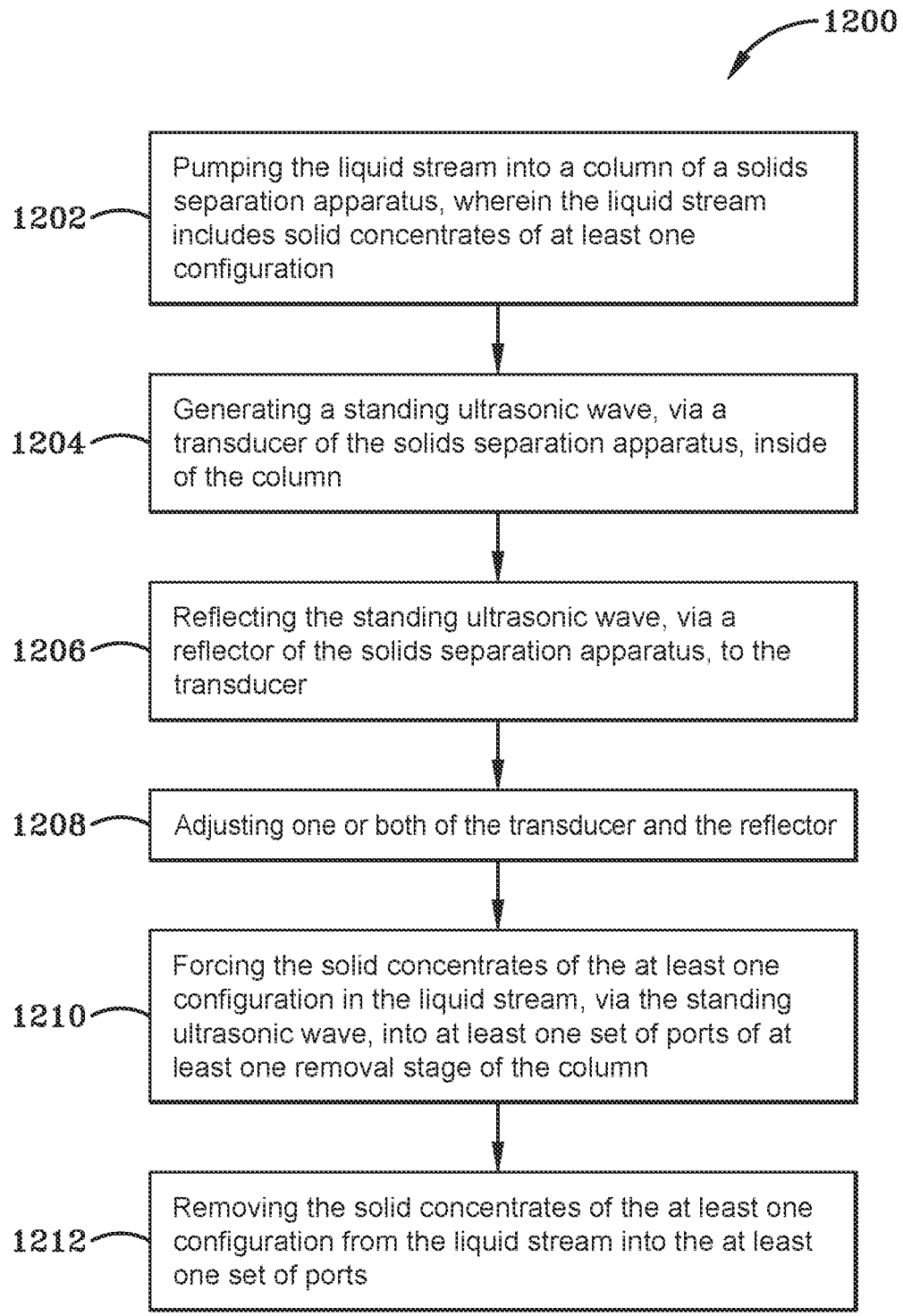
FIG. 9 is a method flowchart of removing solid concentrates from a fluid stream.

FIG. 9 illustrates a method 1200 a method of removing solid concentrates from a fluid stream. An initial step 1202 of method 1200 comprises pumping the fluid stream into a tower of a solids separation apparatus, wherein the fluid stream includes solid concentrates of at least one configuration. Another step 1204 comprises generating a standing sonic wave, via a transducer of the solids separation apparatus, inside of the tower. Another step 1206 comprises reflecting the standing sonic wave, via a reflector of the solids separation apparatus, to the transducer. Another step 1208 comprises adjusting one or both of the transducer and the reflector. Another step 1210 comprises forcing the solid concentrates of the at least one configuration in the fluid stream, via the standing sonic wave, into the at least one set of ports of at least one removal stage of the tower. Another step 1212 comprises removing the solid concentrates of the at least one configuration from the fluid stream into the at least one set of ports.

In an exemplary embodiment, method 1200 may include additional steps of removing solid concentrates from a fluid stream. An optional step comprises directing the solid concentrates of the at least one configuration, via an effluent outlet, from the tower to at least one effluent output. An optional step comprises transferring the standing sonic wave, via a diaphragm, from the at least one solids removal stage to a second solids removal stage of the tower. An optional step comprises directing the fluid stream, via at least one plumbing member, from the first solids separation stage of the tower to a second solids separation stage of the tower. An optional step comprises moving at least one set of shutters along an interior wall of the tower to control the flow rate of the fluid stream in the tower. Optional steps comprise forcing solid concentrates of a second configuration in the fluid stream, via the standing sonic wave, into a second set of ports of the second stage of the tower, wherein the solid concentrates of a second configuration are smaller than the solid concentrates of the at least one configuration; and removing the solid concentrates of the second configuration from the fluid stream into second set of ports. An optional step comprises directing the solid concentrates of the second configuration, via a second effluent outlet, from the tower to a second effluent output. An optional step comprises that wherein the step of adjusting the one or both of the transducer and the reflector further includes antinodes of the standing sonic wave transmitted by the transducer are aligned with at least one set of ports defined in the tower.

Figure 10:
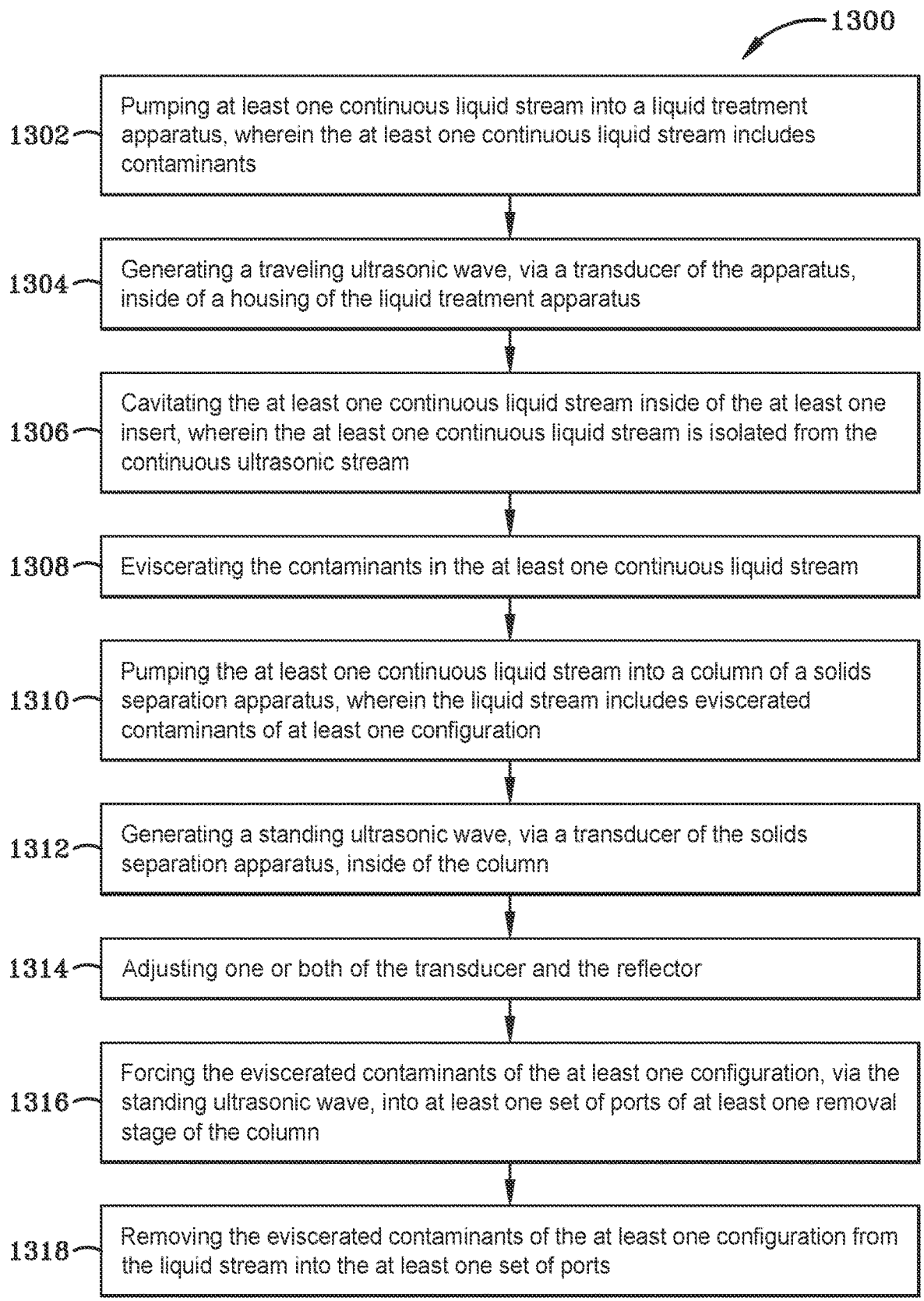
FIG. 10 is a method flowchart of separating contaminants from a continuous fluid.

FIG. 10 illustrates a method 1300 of separating contaminants from a continuous fluid. An initial step 1302 of the method 1300 comprises pumping at least one continuous fluid stream into a fluid treatment apparatus, wherein the at least one continuous fluid stream includes contaminants. Another step 1304 comprises generating a traveling sonic wave, via a transducer of the apparatus, inside of a housing of the fluid treatment apparatus. Another step 1306 comprises cavitating the at least one continuous fluid stream inside of the at least one insert, wherein the at least one continuous fluid stream is isolated from the continuous sonic stream. Another step 1308 comprises eviscerating the contaminants in the at least one continuous fluid stream. Another step 1310 comprises pumping the at least one continuous fluid stream into a tower of a solids separation apparatus, wherein the fluid stream includes eviscerated contaminants of at least one configuration. Another step 1312 comprises generating a standing sonic wave, via a transducer of the solids separation apparatus, inside of the tower. Another step 1314 adjusting one or both of the transducer and the reflector. Another step 1316 comprises forcing the eviscerated contaminants of the at least one configuration, via the standing sonic wave, into the at least one set of ports of at least one removal stage of the tower. Another step 1318 comprises removing the eviscerated contaminants of the at least one configuration from the fluid stream into the at least one set of ports.

In an exemplary embodiment, method 1200 may include additional steps of separating contaminants from a continuous fluid. Optional steps may include pumping the at least one continuous fluid stream into a second fluid treatment apparatus; generating a second traveling sonic wave, via a second transducer of the second fluid treatment apparatus, inside of a second housing of the second fluid treatment apparatus; cavitating the at least one continuous fluid stream inside of a second insert, wherein the at least one continuous fluid stream is isolated from a second continuous sonic stream; and eviscerating the contaminants in the at least one continuous fluid stream. An optional step may include transferring the standing sonic wave, via a diaphragm, from the at least one solids removal stage to a second solids removal stage of the tower. An optional step may include directing the fluid stream, via at least one plumbing member, from the first solids separation stage of the tower to a second solids separation stage of the tower. Optional steps may include forcing eviscerated contaminants of a second configuration in the fluid stream, via the standing sonic wave, into a second set of ports of the second stage of the tower, wherein the eviscerated contaminants of a second configuration are smaller than the eviscerated contaminants of the at least one configuration; and removing the eviscerated contaminants of the second configuration from the fluid stream into second set of ports. An optional step comprises that wherein the step of adjusting the one or both of the transducer and the reflector further includes anti-nodes of the standing sonic wave transmitted by the transducer are aligned with at least one set of ports defined in the tower.

Figure 11:
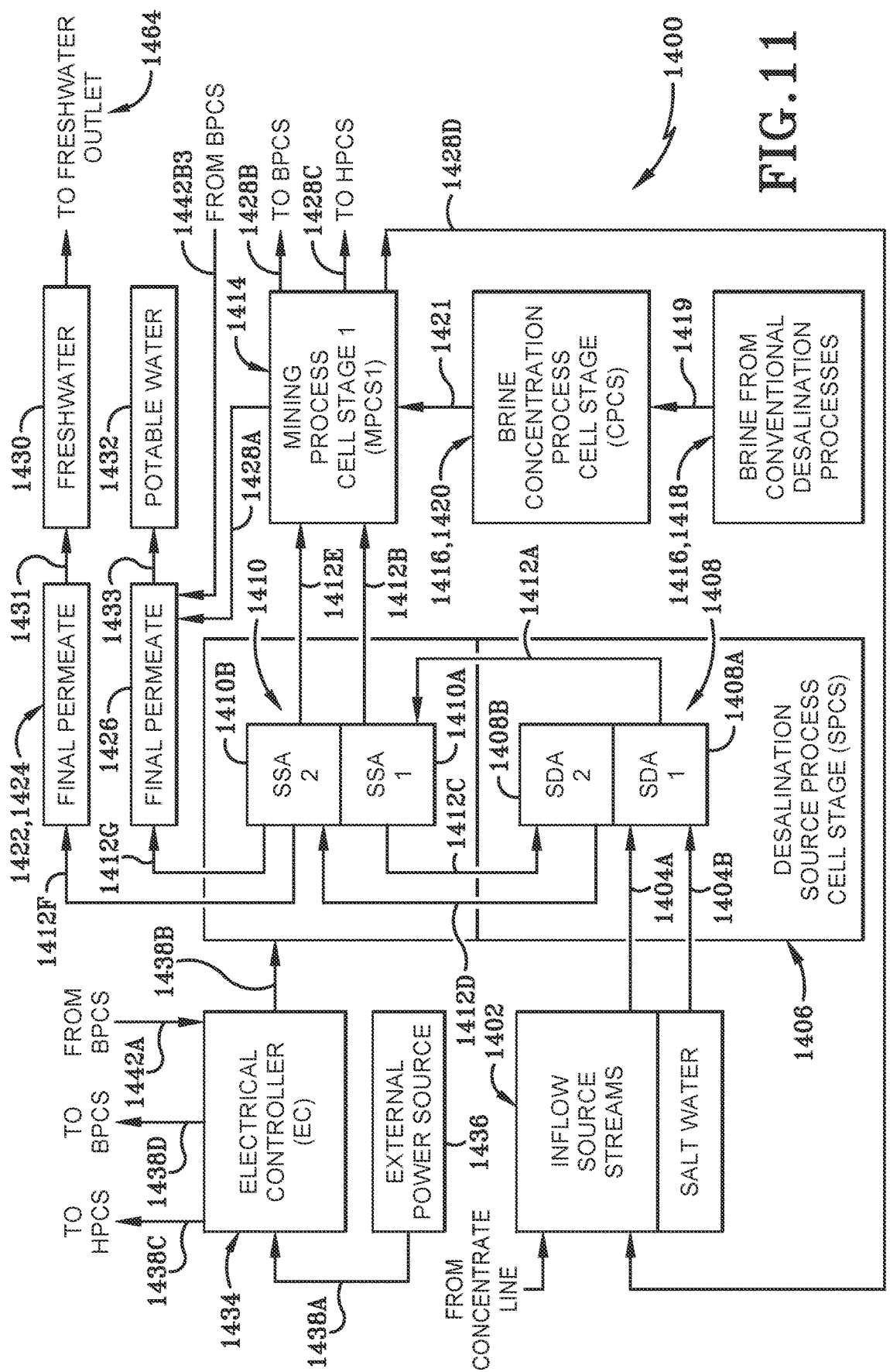
FIG. 11 is a partial diagrammatic flowchart of a fluid treatment loop system.
Figure 12:
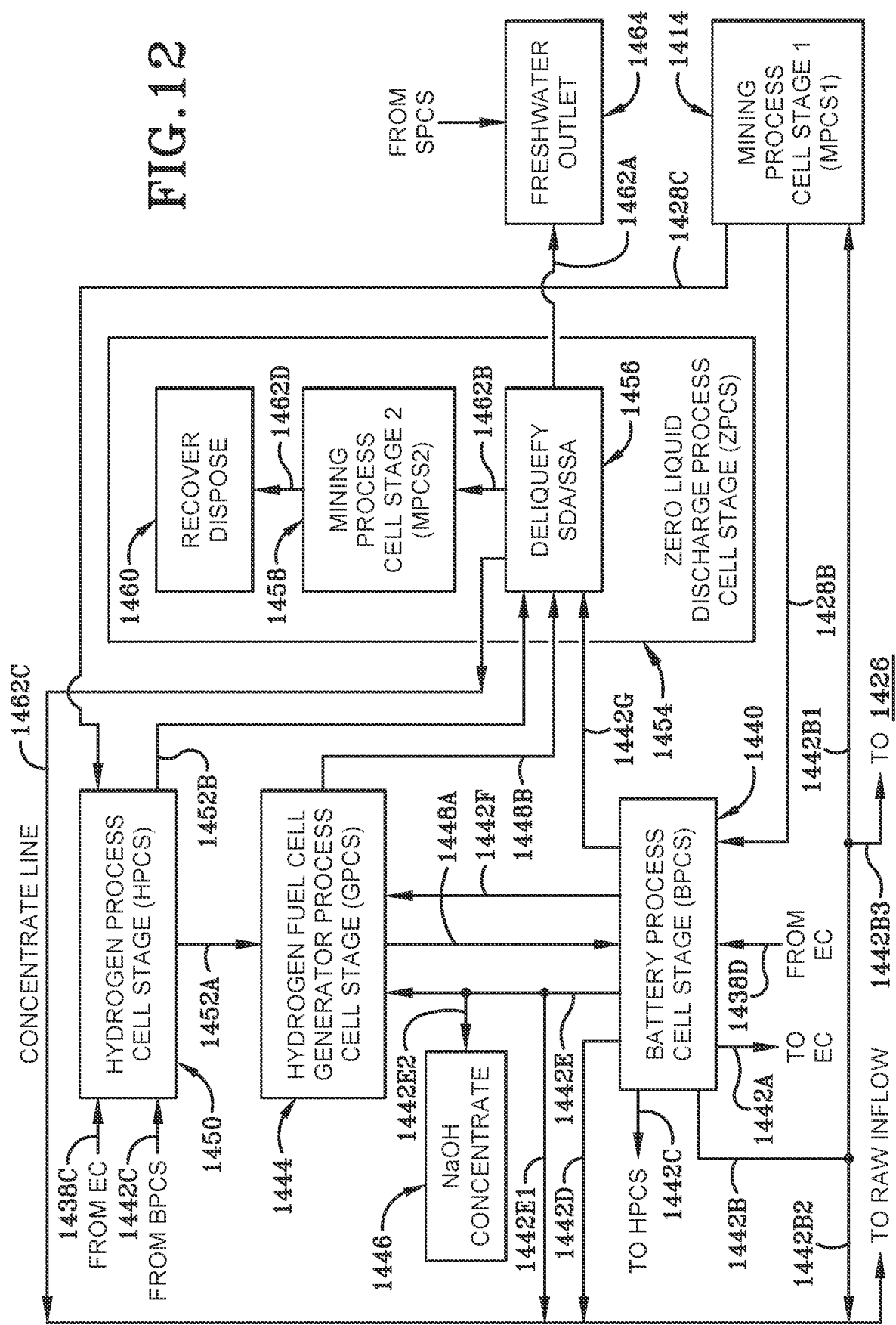
FIG. 12 is a partial diagrammatic flowchart of the fluid treatment loop system shown in FIG. 11.

FIGS. 11 and 12 illustrate a fluid treatment loop system 1400 (hereinafter loop system 1400) that is configured to treat resultant permeate and effluent discharges from processing a fluid based medium to remove dissociated and total dissolved solids resulting from desalination processes. As described below, the effluent discharges created in the fluid treatment loop system 1400 is a concentrated waste stream that will be referred herein as "brine." The following disclosure relates to at least one system and at least one method of processing brine and processing clean water generated from the at least one desalination process. The following disclosure also relates to at least one system and at least one method of reclaiming viable materials and/or minerals entrained in a wastewater source fluid through multiple treatment processes that are in fluid communication with the at least one desalination process.

Referring to FIG. 11, at least one inflow source stage or wastewater stage 1402 is provided in the fluid treatment loop system 1400. In the illustrated loop system 1400, the at least one inflow source stage 1402 is a seawater source that may provide contaminated and/or salt water streams in the fluid treatment loop system 1400. In other exemplary embodiments, the inflow source stage 1402 may include any brine compositions and/or contaminated fluid source that is desired to be treated by the fluid treatment loop system 1400. Examples of suitable streams source with brine compositions and/or contaminated fluid include process water from various processing industries (e.g., manufacturing, mining, agriculture, medical, and other various processing industries producing fluid with brine compositions), brackish water streams, gray water streams, runoff water streams, salt water streams and/or sources, and other various fluid streams and/or sources that include brine compositions.

Still referring to FIG. 11, at least one inflow source connection 1404 provides fluid communication between the inflow source stage 1402 and at least one desalination source process cell stage, which is described in more detail below. In the illustrated embodiment, a first inflow source connection 1404A and a second inflow source connection 1404B provide fluid communication between the at least one inflow source stage 1402 and the at least one desalination source process cell stage of the fluid treatment loop system 1400. In the illustrated embodiment, the first inflow source connection 1404A may provide a fluid stream that include brine compositions, and the second inflow source connection 1404B may provide a salt water stream from a seawater source. Such desalination processing of the brine compositions and the salt water by at least one desalination source process cell stage is described in more detail below.

Still referring to FIG. 11, the fluid treatment loop system 1400 includes at least one desalination or acoustic source process cell stage (hereinafter "SPCS") generally referred to reference number 1406. The at least one SPCS 1406 is configured for freshwater production and generation of brine waste effluent. As described in more detail below, a single SPCS 1406 is provided in the illustrated fluid treatment loop system 1400 for freshwater production and generation of brine waste effluent. In other exemplary embodiments, any suitable number of SPCSs may be used in a single fluid treatment loop system described and illustrated herein. In the illustrated loop system, the SPCS 1406 is also configured to perform acoustic desalination process (or ADP) to produce freshwater permeate fluid streams and brine water effluent fluid streams. In other exemplary embodiments, any other conventional desalinations processes may be used to produce freshwater permeate fluid streams and brine water effluent fluid streams.

The SPCS 1406 includes at least one SDA 1408 for dissociating and eviscerating brine compositions and/or minerals in the salt water found in the seawater stream. In the illustrated embodiment, the SPCS 1406 includes a first SDA 1408A and a second SDA 1408B for dissociating and eviscerating brine compositions and/or minerals in the salt water found in the seawater stream. As illustrated in FIG. 11, the first SDA 1408A is configured to perform a first dissociation and/or evisceration process during operation for dissociating and eviscerating brine compositions and/or minerals in the salt water found in the seawater stream. The second SDA 1408B is configured to perform a second, separate dissociation and/or evisceration process during operation for dissociating and eviscerating brine compositions and/or minerals in the salt water found in the seawater stream, which is described in more detail below. As illustrated herein, the second SDA 1408B performs the second, separate dissociation and/or evisceration process subsequent to first dissociation and/or evisceration process by the first SDA 1408A.

The first SDA 1408A and the second SDA 1408B may be any suitable SDA described and illustrated herein based on the specific application, specifically SDA 10, 210, 310, 410, 510, 610, 710, and 910 described and illustrated herein and any other suitable and available SDAs. As illustrated, the first SDA 1408A and the second SDA 1408B are in communication with one another inside of the SPCS 1406 via at least one SSA, which is described in more detail below. In other exemplary embodiment, a first SDA and a second SDA of a SPCS may be directly in fluid communication with one another based on the desired operation of the SPCS of a fluid treatment loop system (e.g., the second SDA may perform a second dissociation and/or evisceration process on the fluid stream subsequent to the first SDA performing a first dissociation and/or evisceration process on the fluid stream where the first SDA and the second SDA are directly connected with one another). Additionally, while the first SDA 1408A and the second SDA 1408B are illustrated as being separate SDAs, the first and second SDAs 1408A, 1408B may also be a single, unitary SDA that is configured to perform first and second dissociation processes on fluid streams (e.g., SDA 510).

The SPCS 1406 includes at least one SSA stage 1410 in an SSA for removing the dissociated brine compositions and/or minerals from the fluid stream and producing freshwater. In the illustrated embodiment, the SPCS 1406 includes a first SSA stage 1410A and a second SDA 1410B in a single SSA for removing the dissociated brine compositions and/or minerals from the fluid stream and producing freshwater. As illustrated in FIG. 11, the first SSA stage 1410A is configured to perform a first removal process by removing dissociated and eviscerated brine compositions and/or minerals from the stream (i.e., producing brine water effluent streams) to produce freshwater (i.e., producing freshwater permeate streams). The second SSA stage 1410B is configured to perform a second removal process by further removing dissociated and eviscerated brine compositions and/or minerals from the stream that passed through the first SSA stage 1410A to produce freshwater. As illustrated herein, the second SSA stage 1410B performs the second, separate removal process subsequent to first removal process performed by the first SSA stage 1410A.

The first SSA stage 1410A and the second SSA stage 1410B in the single SSA may be any suitable SSA described and illustrated herein based on the specific application, specifically SSAs 12, 712, and 912 described and illustrated herein and any other suitable and available SDAs. As illustrated, the first SSA stage 1410A and the second SSA stage 1410B are in communication with one another inside of the SPCS 1406 via the second SDA 1408B. In other exemplary embodiment, a first SSA and a second SSA of a SPCS may be directly in fluid communication with one another based on the desired operation of the SPCS of a fluid treatment loop system (e.g., the second SSA may perform a second removal process on the fluid stream subsequent to the first SSA performing a first removal process on the fluid stream where the first SSA is directly in fluid communication with the second SSA).

Still referring to FIG. 11, at least one SPCS connection 1412 may operably connect the at least one SDA 1408 with the at least one SSA 1410. In the illustrated embodiment, a first SPCS connection 1412A operably connects a fluid outlet of the first SDA 1408A with a fluid inlet of the first SSA stage 1410A to provide fluid communication between the first SDA 1408A and the first SSA stage 1410A. In the loop system 1400, the first SPCS connection 1412A transports and/or communicates the fluid having the dissociated and eviscerated brine compositions and/or minerals, via the first dissociation and eviscerated process of the SDA 1408A, from the first SDA 1408A to the first SSA stage 1410A. With this communication, the first SSA stage 1410A is configured to remove the dissociated and eviscerated brine compositions and/or minerals from the fluid, via the first removal process, and produce freshwater, which is described in more detail below.

Still referring to FIG. 11, the loop system 1400 also includes a second SPCS connection 1412B that operably connects a fluid outlet of the first SSA stage 1410A with a fluid inlet of at least one mining process cell stage provided in the loop system 1400, which is described in more detail below. The second SPCS connection 1412B transports and delivers an effluent and/or brine stream from the first SSA stage 1410A to the at least one mining process cell stage provided in the loop system 1400 for mining process separate from the desalination process performed by the SPCS 1406. As such, the effluent and/or brine stream is a concentrated brine stream that has solid concentrates or dissolved concentrates that are removed and/or separated from freshwater inside of the first SSA stage 1410A. Such removal and separation of the concentrated brine from freshwater inside of the first SSA stage 1410A as previously described above.

Still referring to FIG. 11, the loop system 1400 also includes a third SPCS connection 1412C that operably connects another fluid outlet of the first SSA stage 1410A with a fluid inlet of the second SDA 1408B to provide fluid communication between the second SDA 1408B and the first SSA stage 1410A. In the loop system 1400, the third SPCS connection 1412C transports and/or communicates the fluid with remaining dissociation and eviscerated effluent, via the first removal process of the first SSA stage 1410A, from the first SSA stage 1410A to the second SDA 1408B. With this communication, the second SDA 1408B is configured perform a second dissociation and/or evisceration process on the stream to further dissociate and/or eviscerate any remaining brine compositions and/or solid concentrates remaining in the fluid for freshwater production.

Still referring to FIG. 11, the loop system 1400 also includes a fourth SPCS connection 1412D that operably connects a fluid outlet of the second SDA 1408B with a fluid inlet of the second SSA stage 1410B to provide fluid communication between the second SDA 1408B and the second SSA stage 1410B. In the loop system 1400, the fourth SPCS connection 1412D transports and/or communicates the fluid having the remaining dissociated and eviscerated brine compositions and/or minerals, via the second dissociation and eviscerated process of the SDA 1408A, from the second SDA 1408B to the second SSA stage 1410B. With this communication, the second SSA stage 1410B is configured to remove the remaining dissociated and eviscerated brine compositions and/or minerals from the fluid, via the second removal process, to produce freshwater, which is described in more detail below.

Still referring to FIG. 11, the loop system 1400 also includes a fifth SPCS connection 1412E that operably connects a fluid outlet of the second SSA stage 1410B with another fluid inlet of the at least one mining process cell stage provided in the loop system 1400, which is described in more detail below. The fifth SPCS connection 1412E transports and delivers an effluent and/or brine stream from the second SSA stage 1410B to the at least one mining process cell stage provided in the loop system 1400 for mining processes separate from the desalination process performed by the SPCS 1406. As such, the effluent and/or brine stream is a concentrated brine stream that has solid concentrates or dissolved concentrates that are removed and/or separated from freshwater inside of the second SSA stage 1410B.

Still referring to FIG. 11, the loop system 1400 also includes a sixth SPCS connection 1412F that operably connects another fluid outlet of the second SSA stage 1410B with at least one permeate outlet of the loop system 1400, which is described in more detail below. The sixth SPCS connection 1412F transports and/or delivers freshwater produced by the second removal process of the second SSA stage 1410B along with the processes performed by previous first SDA 1408A, the second SDA 1408B, and the first SSA stage 1410A, to the at least one permeate outlet of the loop system 1400. Similarly, the loop system 1400 also includes a seventh SPCS connection 1412G that operably connects another fluid outlet of the second SSA stage 1410B with at least another permeate outlet of the loop system 1400, which is described in more detail below. The seventh SPCS connection 1412G transports and/or delivers freshwater produced by the second removal process of the second SSA stage 1410B along with the processes performed by previous first SDA 1408A, the second SDA 1408B, and the first SSA stage 1410A, to the at least another permeate outlet of the loop system 1400. Such permeate outlets provided in the loop system 1400 is described in more detail below.

Still referring to FIG. 11, the loop system 1400 also includes at least one mining process cell stage (hereinafter "MPCS") for mining and extracting concentrated minerals and matter that are desired and/or valuable for stages inside of the loop system 1400 and for products separate from the loop system 1400. In other words, the at least one MPCS is configured to recover minerals and/or products that may be used for generating byproducts viable for separate operations and processes remote from the loop system 1400. In the illustrated embodiment, a first MPCS 1414 ("hereinafter MPCS1 1414") is operably connected with the SPCS 1406 via the second SPCS connection 1412B and the fifth SPCS connection 1412E. More particular, the first MPCS1 1414 is operably connected with the first SSA stage 1410A of the SPCS 1406, via the second SPCS connection 1412B, and operably connected with the second SSA stage 1410B of the SPCS 1406 via the fifth SPCS connection 1412E.

It should be understood that any conventional methods and/or techniques may be used with a MPCS (e.g., MPCS1) described and illustrated herein for mining and extracting concentrated and valuable minerals from the brine composition and/or effluent streams outputted by the SPCS 1406. As such, any suitable machines, apparatuses, systems, and/or devices may be used to perform the conventional mining and extracting operations for mining and extracting concentrated and valuable minerals from the brine composition and/or effluent streams outputted by the SPCS 1406. Examples of suitable processes for mining and extracting desired minerals from brine concentrate and effluent streams include electrodialysis, reverse osmosis with electrodialysis, membrane distillation, membrane distillation crystallization, adsorption and/or desorption crystallization, evaporation and/or crystallization, and any other suitable processes of the like for mining and extracting desired minerals from brine concentrate and effluent streams.

It should also be understood that the desalination processes performed by the SDAs 1408A, 1408B and the SSAs 1410A, 1410B of the SPCS 1406 provides the MPCS1 1414 with a brine concentrate and/or effluent concentrate due to the dissociations processes, performed by the SDAs 1408A, 1408B, and the removal and/or separation processes of the brine compositions and/or solids concentrate from freshwater, performed by the SSAs 1410A, 1410B. With such processes, the MPCS1 1414 is able to immediately use the brine compositions and/or solids concentrate from the SPCS 1406 due to the fluid already being in concentrate form. As such, the MPCS1 1414 is enabled to perform immediate mining and extraction operations of the concentrated brine and minerals that may be useful for auxiliary methods and systems provided in the loop system 1400. Such immediate mining and extraction operations by the MPCS1 1414 may lower economic costs and additional power expenditures of the MPCS1 1414 due to the fluid already being in concentrate form via the SPCS 1406.

It should also be understood that the MPSC1 1414 may be configured to mine and extract certain and/or desired minerals from the brine and/or effluent fluid stream received by the MPCS1 1414 from both the SPCS 1406 and the brine system 1416. Such minerals specifically mined and extracted by the MPSC1 1414 may be viable for stages in the loop system 1400, which are described in more detail below, or may be sold for economic gain separate from the loop system 1400 (e.g., selling raw material to others in the related fields). Examples of suitable minerals mined and extracted by a MPSC1 from the brine and/or effluent fluid stream received by the MPCS1 from both a SPCS and a brine system include sodium, magnesium, calcium, potassium, strontium, chloride, sulfate, bicarbonate, bromine, borate, fluorine, boron, lithium, uranium, and other suitable minerals mined and extracted by a MPSC1 from the brine and/or effluent fluid stream received by the MPCS1 from both a SPCS and a brine system.

In addition, the loop system 1400 may include a brine system 1416 operably connected with the MPSC1 1414 and separate and independent of the SPCS 1406. As illustrated in FIG. 11, the brine system 1416 includes a brine source and/or outlet 1418 that is configured to provide brine from conventional desalination processes different than the desalination processes described and illustrated in the SPCS 1406. A brine connection 1419 of the brine system 1416 also operably connects a fluid output of the brine source 1418 with a fluid inlet of a brine concentration process cell stage (hereinafter CPCS) 1420 of the brine system 1416. The CPCS 1420 is configured to provide concentrated brine transported and delivered from the brine source 1418. As such, the CPCS 1420 may use any conventional processes and/or methods to provide concentrated brine in either a continuous processing stage or in batch processing stages. A brine concentration connection 1421 of the brine system 1416 also operably connects a fluid outlet of the CPCS 1420 with another fluid inlet of the MPCS1 1414. Such fluid communication between the CPCS 1420 and the MPCS1 1414, via the brine concentration connection 1421, enables the MPCS1 1414 to further mine and extract concentrated minerals and matter that are desired and/or valuable for auxiliary products, which are described in more detail below. In other words, the MPCS1 1414 is configured to recover minerals and/or products that may be used for generating byproducts viable for separate operations and processes from the brine concentrated generated by the CPCS 1420, which are also described in more detail below.

It should be understood that any conventional methods and/or techniques may be used with a CPCS (e.g., CPCS 1420) described and illustrated herein for providing brine concentrate. As such, any suitable machines, apparatuses, systems, and/or devices may be used to perform suitable operations concentration processes for providing brine concentrate from a brine mixture. Examples of suitable processes to achieve dissociation and removal of brine compositions and/or solids concentrates from a water source include acoustic desalination process, direct contact membrane distillation, electrodialysis, electrodialysis reversal, forward osmosis, multi-effect distillation, multistage flash distillation, reverse osmosis, vapor compression distillation, and other suitable process to achieve dissociation and removal of brine compositions and/or solids concentrates from a water source.

As discussed above, at least one permeate outlet may be operably engaged with the SPCS 1406 for receiving permeate water from the SPCS 1406. In the illustrated loop system 1400, a first permeate outlet 1424 operably connects with the SPCS 1406 via the sixth SPCS connection 1412F. Specifically a fluid inlet of the first permeate outlet 1424 operably connects with another fluid outlet of the second SSA stage 1410B via the sixth SPCS connection 1412F. The sixth SPCS connection 1412F transports and/or delivers permeate water and/or freshwater produced by the second removal process of the second SSA stage 1410B to the first permeate outlet 1424. In the illustrated loop system 1400, a second permeate outlet 1426 also operably connects with the SPCS 1406 via the seventh SPCS connection 1412G. Specifically, a fluid inlet of the second permeate outlet 1426 operably connects with another fluid outlet of the second SSA stage 1410B via the seventh SPCS connection 1412G. The seventh SPCS connection 1412G transports and/or delivers permeate water and/or freshwater produced by the second removal process of the second SSA stage 1410B to the second permeate outlet 1426.

Referring back to MPCS1 1414 in FIG. 11, the MPCS1 1414 may transport and/or output extracted concentrated and minerals and/or via at least one mined connection 1428 to various stages and/or outputs provided in the loop system 1400 for various auxiliary products and/or productions provided in the loop system 1400. Such connection between the MPSC1 1414 and various stages and/or outputs provided in the loop system 1400 are described in more detail below.

In one instance, a first mined connection 1428A may operably connect a fluid outlet of the MPCS1 1414 with a fluid inlet of at least one permeate outlet of the loop system 1400, specifically to the second permeate outlet 1426. In this instance, the first mined connection 1428A is configured to transport a chloride solution from the MPCS1 1414 to the second permeate outlet 1426 to treat and/or polish freshwater permeate to produce potable water; as described above, chloride is one of the mined and extracted minerals from the brine and/or effluent fluid stream received by the MPCS1 1414 from both the SPCS 1406 and the brine system 1416. It should be noted that this first mined connection 1428A is optional and may be omitted from the loop system 1400 if desired based on various considerations, including the implementation or layout of the loop system 1400.

In another instance, a second mined connection 1428B may operably connect a fluid outlet of the MPCS1 1414 with a fluid inlet of at least one battery process cell stage of the loop system 1400, which is described in more detail below. In this instance, the second mined connection 1428B is configured to transfer a brine solution with sodium chloride from the MPCS1 1414 to the at least one battery process cell stage of the loop system 1400; the sodium chloride transferred to the at least one battery process cell stage of the loop system 1400 is mined and extracted by the MPCS1 1414 during conventional mining operations from the brine and/or effluent fluid stream received by the MPCS1 1414 from both the SPCS 1406 and the brine system 1416.

In another instance, a third mined connection 1428C may operably connect another fluid outlet of the MPCS1 1414 to a fluid inlet of at least one hydrogen fuel cell generator process cell stage of the loop system 1400, which is described in more detail below. In this instance, the third mined connection 1428C is configured to send a brine solution with sodium chloride from the MPCS1 1414 to the at least one hydrogen process cell stage of the loop system 1400. In the illustrated loop system 1400, the brine solution with sodium chloride transported to the at least one hydrogen fuel cell generator process cell stage via the third mined connection 1428C is reduced and/or more diluted than the brine solution with sodium chloride transported to the at least one battery process cell stage via the second mined connection 1428B; the sodium chloride transferred to the at least one hydrogen fuel cell generator process cell stage of the loop system 1400 is also mined and extracted by the MPCS1 1414 during conventional mining operations from the brine and/or effluent fluid stream received by the MPCS1 1414 from both the SPCS 1406 and the brine system 1416.

In another instance, a fourth mined connection 1428D may operably connect another fluid outlet of the MPCS1 1414 to a fluid inlet of the inflow source stage 1402. In this instance, the brine concentrate and minerals that are not viable and/or not useful for downstream processes in the loop system 1400 may be outputted to the inflow source stage 1402, via the fourth mined connection 1428D, for further dissociation and separation processes by the DSPC 1406 (which are described above).

Still referring to FIG. 11, the first permeate outlet 1424 is also operably connected with a freshwater channel 1430 via a freshwater connection 1431. More particular, a fluid outlet of the first permeate outlet 1424 is operably connected with a fluid inlet of the freshwater channel 1430 via the freshwater connection 1431. The freshwater channel 1430 may be operably connected with various freshwater applications and outlets (such as freshwater outlet 1464) for providing freshwater based on various considerations, including the location, environment, and climate of the loop system. Examples of suitable freshwater applications for outputting freshwater produced by the loop system 1400 via the SPCS 1406 include interconnected regional and/or national water grids, drip irrigation system for expanded agriculture use, drip irrigation for reforestation and carbon dioxide capture, replenishment of water storage and reservoirs, expansion of inhabited, stressed areas, improved living conditions in semi-arid areas, development of arid areas for suitable living conditions, eliminated invasive species and/or micro-organisms in specific regions and/or areas, provide process water for industries, other various applications of the like that may benefit from and/or utilize freshwater produced by the loop system 1400 via the SPCS 1406.

Still referring to FIG. 11, the second permeate outlet 1426 is also operably connected with a potable water channel 1432 via a potable water connection 1433. More particular, a fluid outlet of the second permeate outlet 1426 is operably connected with a fluid inlet of the potable water channel 1432 via the potable water connection 1433. The potable water channel 1432 may be stored in any suitable storage structure and/or reservoir that allows for the consumption of the potable water. At this stage, the potable water provided in the potable water channel 1432 is safe for human consumption either for drinking, food preparation, and/or conventional human uses of potable water.

Still referring to FIG. 11, the loop system 1400 also includes an electrical controller (hereinafter "EC") generally referred to as 1434. EC 1434 is configured to provide electrical power and control to each stage provided in the loop system 1400. The illustrated EC 1434 is powered by an external power source 1436 which provides power to the EC 1434 and all stages and/or systems provided in the loop system 1400. Such external power source may be any suitable power source that provides a suitable amount of power to power stages of a loop system and to power an EC to control each stage of the loop system. Examples of suitable external power sources include electrical grid power, solar power, wind power, natural gas power, hydro power, hydrogen power, nuclear power, and any other renewable or non-renewable suitable power that is capable of providing a suitable amount of power to each stage of a loop system and to power an EC to control each stage of the loop system. While the EC 1434 and the external power source 1436 are illustrated as separate components, an EC and a power source may be a single, unitary device for reducing the size and configuration of the EC and the power source.

Still referring to FIG. 11, at least one electrical connection 1438 is provided to electrically connect the external power source 1436 with the EC 1434 and at least one stage of the loop system 1400. In the illustrated embodiment, a first electrical connection 1438A electrically connects the external power source 1436 with EC 1434. More particularly, the first electrical connection 1438A electrically connects an electrical input of the EC 1434 with an electrical output of the external power source 1436. The first electrical connection 1438A provides the power generated by the external power source 1436 to the EC 1434 and to the stages provided in the loop system 1400.

Still referring to FIG. 11, at least another electrical connection 1438 may electrically connect the EC 1434 with at least one stage provided in the loop system 1400. In the illustrated loop system 1400, a second electrical connection 1438B electrically connects the EC 1434 with the SPCS 1406. More particularly, the second electrical connection 1438B electrical connects an electrical output of the EC 1434 with the SPCS 1406. With the second electrical connection 1438B, each of the first SDA 1408A, the second SDA 1408B, the first SSA stage 1410A, and the second SSA stage 1410B is powered by the external power source 1436 and is electrically controlled by the EC 1434. As such, the EC 1434 is configured to individually control the first SDA 1408A, the second SDA 1408B, the first SSA stage 1410A, and the second SSA stage 1410B during fluid treatment operations.

Still referring to FIG. 11, a third electrical connection 1438C electrically connects the EC 1434 with at least one hydrogen process cell stage of the loop system 1400, which is described in more detail below. More particularly, the third electrical connection 1438C electrical connects another electrical output of the EC 1434 with the at least one hydrogen process cell stage of the loop system 1400. With this third electrical connection, the at least one hydrogen process cell stage of the loop system 1400 is electrically powered by the external power source 1436 and electrically controlled by the EC 1434.

Still referring to FIG. 11, a fourth electrical connection 1438D electrically connects the EC 1434 with at least one battery process cell stage of the loop system 1400, which is described in more detail below. More particularly, the fourth electrical connection 1438D electrical connects another electrical output of the EC 1434 with the at least one battery process cell stage of the loop system 1400. With this fourth electrical connection, the at least one battery process cell stage of the loop system 1400 is electrically powered by the external power source 1436 and electrically controlled by the EC 1434.

It should be understood that conventional electrical components and/or devices are included with the EC 1434 for providing electrical power to specific stages of the loop system 1400 and for providing control over the specific stages of the loop system 1400 via the EC 1434.

Referring now to FIG. 12, the loop system 1400 also includes at least one battery process cell stage (hereinafter BPCS) generally referred to as 1440. In the illustrated loop system 1400, a single BPCS 1440 is provided. In other exemplary embodiments, any suitable number of BPCSs may be provided in a loop system for various considerations, including the size and/or production capability of viable minerals provided in the brine solution. As described in more detail below, the BPCS 1440 is configured to produce minerals such as hydrogen, sodium hydroxide, chlorine, and/or hydrochloric acid from the brine composition transferred from the MPCS1 1414, such use and purpose of these minerals produced by the BPCS 1440 is described in more detail below. It should be understood that that BPCS 1440 may use any suitable process in achieving the functions provided in the BPCS 1440, including electrosynthesis, electrolysis, and other viable processes in achieving the functions provided in the BPCS 1440.

As previously described, the BPCS 1440 is operably connected with the MPCS1 1414 via the second mined connection 1428B. More particularly, as shown in FIGS. 11 and 12, a fluid input of the BPCS 1440 is operably connected with a fluid outlet of the MPCS1 1414 via the second mined connection 1428B. As described previously, the second mined connection 1428B transports and delivers brine with sodium chloride to the BPCS 1440 for operational use. Such sodium chloride delivered to the BPCS 1440 may be used to replace depleted brine electrolyte with brine with sodium chloride mined by the MPCS1 1414.

Still referring to FIG. 12, the BPCS 1440 is electrically connected with the EC 1434 via the fourth electrical connection 1438D. As previously described above, the fourth electrical connection between the EC 1434 and the BPCS 1440 enables the power source 1436 to provide power to the BPCS 1440, via the EC 1434, and enables EC 1434 to operably control the BPCS 1440 during operation (e.g., operably control machines, apparatuses, devices, components, and other suitable devices provided in the BPCS 1440).

Referring to FIGS. 11 and 12, at least one battery process connection 1442 operably connects the BPCS 1440 with other stages and machines provided in the loop system 1400 for various reasons. In one instance, a first battery process connection 1442A operably connects an electrical output of the BPCS 1440 with an input of the EC 1434. Such connection between the BPCS 1440 and the EC 1434 enables the BPCS 1440 to transfer electricity generated by at least one hydrogen fuel cell generator process cell stage of the loop system and stored by the BPCS 1440 to the EC 1434, which is described in more detail below.

Referring to FIG. 12, a second battery process connection 1442B operably connects a fluid output of the BPCS 1440 with another fluid input of MPCS1 1414 and another fluid input of the inflow source stage 1402 to transport and deliver chlorine solution from the BPCS 1440 to the MPCS1 1414 and to the inflow source stage 1402 separately. In this process connection, the second battery process connection 1442B is split into a first portion 1442B1, a second portion 1442B2, and a third portion 1442B3 to transport and deliver chlorine solution from the BPCS 1440 to the MPCS1 1414, to the inflow source stage 1402, and to the second permeate outlet 1426 separately. As such, the first portion 1442B1 of the second battery process connection 1442B operably connects a fluid output of the BPCS 1440 with another fluid input of the MPCS1 1414. During operation, the chlorine transferred from the BPCS 1440 to the MPCS1 1414 may be used for recovery action with other materials provided in the MPCS1 1414. Additionally, the second portion 1442B2 of the second battery process connection 1442B transports and delivers chlorine solution from the BPCS 1440 to the inflow source stage 1402 for reducing seawater alkalinity and corrosion of system components provided in the loop system 1400. Moreover, the third portion 1442B3 of the second battery process connection 1442C transports and delivers chlorine solution from the BPCS 1440 to the second permeate outlet 1426 for treating and/or polishing freshwater permeate to produce potable water.

Still referring to FIG. 12, a third battery process connection 1442C operably connects another fluid output of the BPCS 1440 with a fluid input of at least one hydrogen process stage of the loop system 1400, which is described in more detail below. The third battery process connection 1442C is configured to transport and deliver additional electricity and/or energy from the BPCS 1440 to the at least one hydrogen process stage of the loop system 1400.

Still referring to FIG. 12, a fourth battery process connection 1442D operably connects another fluid output of the BPCS 1440 with another fluid input of the inflow source stage 1402 via a concentrate line of the loop system 1400, which is described in more detail below. The fourth battery process connection 1442D is configured to transport and deliver hydrochloric acid solution from the BPCS 1440 to the inflow source stage 1402 for desired purposes, including reducing seawater alkalinity, reducing corrosion of system components, and selling the hydrochloric acid solution as a raw material to others in relevant fields.

Still referring to FIG. 12, a fifth battery process connection 1442E operably connects another fluid output of the BPCS 1440 with a fluid input of at least one hydrogen fuel cell generator process cell stage, a fluid input of at least one sodium hydroxide concentrate outlet and/or storage facility of the loop system 1400, which is described in more detail below, and another fluid input of the inflow source stage 1402. In this process connection, the fifth battery process connection 1442E bifurcates into a first portion 1442E1 and a second portion 1442E2 to transport and deliver sodium hydroxide solution from the BPCS 1440 to the at least one sodium hydroxide concentrate outlet and to the inflow source stage 1402 separately. The first portion 1442E1 of the fifth battery process connection 1442E operably connects the BPCS 1440 with the inflow source stage 1402 to transport and delivers sodium hydroxide solution to the inflow source stage 1402. Additionally, the second portion 1442E2 of the fifth battery process connection 1442E transports and delivers sodium hydroxide solution from the BPCS 1440 to the at least one sodium hydroxide concentrate outlet of the loop system 1400 for raw material storage and/or future use of sodium hydroxide in the loop system 1400. Moreover, main connection of the fifth battery process connection 1442E operably connects another fluid output of the BPCS 1440 with a fluid input of the GPCS 1444. During operation, the sodium hydroxide solution transferred from the BPCS 1440 to the at least one hydrogen fuel cell generator process cell stage GPCS 1444 may be used for electrolyte purposes in the conventional processes and procedures used in at least one hydrogen fuel cell generator process cell stage GPCS 1444 (described in more detail below).

Still referring to FIG. 12, a sixth battery process connection 1442F operably connects another fluid output of the BPCS 1440 with another fluid input of at least one hydrogen fuel cell generator process cell stage of the loop system 1400, which is described in more detail below. The sixth battery process connection 1442F is configured to transport and deliver hydrogen solution from the BPCS 1440 to the at least one hydrogen fuel cell generator process cell stage of the loop system 1400 for desired purposes, including the supply of hydrogen for operating and using hydrogen fuel cells of the at least one hydrogen fuel cell generator process cell stage.

Still referring to FIG. 12, a seventh battery process connection 1442G operably connects another fluid output of the BPCS 1440 with a fluid input of a zero liquid discharge process cell stage of the loop system 1400, which is described in more detail below. The seventh battery process connection 1442G is configured to transport and deliver brine solution from the BPCS 1440 to the zero liquid discharge process cell stage of the loop system 1400 for desired purposes, including transferring depleted brine electrolyte to the zero liquid discharge process cell stage of the loop system 1400 for deliquifying purposes (which are described in more detail below).

It should be understood that the sodium hydroxide and chlorine produced by the BPCS 1440 may be used for other reasons outside of the loop system 1400. Specifically, the sodium hydroxide and chlorine produced by the BPCS 1440 may be available for revenue generation and/or sold for raw materials to others in relevant fields.

Still referring to FIG. 12, the loop system 1400 includes at least one hydrogen fuel cell generator process cell stage (hereinafter GPCS) generally referred to as 1444. In the illustrated loop system 1400, a single GPCS 1444 is used in this system. In other exemplary embodiment, any suitable number of GPCSs described and illustrated herein may be used in a loop system for various reasons, including the size and configuration of a loop system. As previously described, the GPCS 1444 is operably engaged with the EC 1434 and the BPCS 1440 for fluid and electrical connections.

Generally, the GPCS 1444 provides conventional functions and procedures necessary for a hydrogen fuel cell generator to operate and to produce electricity and brine solution for additional stages and/or processes in the loop system 1400, which is described in more detail below. As such, conventional machines, assemblies, apparatuses, systems, and devices may be used to operate for a hydrogen fuel cell generator and to produce electricity and brine solution for additional stages and/or processes in the loop system 1400. Examples of conventional and suitable hydrogen fuel cell generator methods and processes to be performed by a GPCS includes electrochemical redox reaction and other to perform for a hydrogen fuel cell generator.

As previously described, various process connections operably engage the GPCS 1444 with other various stages and components of the loop system 1400. As such, fifth battery process connection 1442E operably connects a fluid inlet of the GPCS 1444 with a fluid outlet of the BPCS 1440. As stated previously, the fifth battery process connection 1442E transports and delivers sodium hydroxide solution from the BPCS 1440 to the GPCS 1444 for use as an electrolyte for general and/or conventional hydrogen fuel cell generating processes. Additionally, the sixth battery process connection 1442F also operably connects another fluid inlet of the GPCS 1444 with another fluid outlet of the BPCS 1440. As stated previously, the sixth battery process connection 1442F transports and delivers hydrogen solution from the BPCS 1440 to the GPCS 1444 for operating and using hydrogen fuel cells of the at least one hydrogen fuel cell generator process cell stage.

Still referring to FIG. 12, the loop system 1400 includes at least one sodium hydroxide concentrate outlet generally referred to as 1446. In the illustrated loop system 1400, a single sodium hydroxide concentrate outlet 1446 is used in this system. In other exemplary embodiment, any suitable number of sodium hydroxide concentrate outlets described and illustrated herein may be used in a loop system for various reasons, including the size and configuration of a loop system. As previously described, the sodium hydroxide concentrate outlet is operably engaged with the BPCS 1440 for fluid connections. More particularly, the second portion 1442E2 of the fifth battery process connection 1442E3 operably connects the sodium hydroxide concentrate outlet 1446 with the BPCS 1440 for fluid communication. In the loop system 1400, the sodium hydroxide concentrate outlet 1446 is configured to store raw sodium hydroxide solution for storage purposes and/or future use of sodium hydroxide solution in the loop system 1400.

Still referring to FIG. 12, the loop system 1400 also includes at least one generator process connection 1448 that operably connects the GPCS 1444 with other stages and/or components provided in the loop system 1400 for electrical and/or fluid purposes. The loop system 1400 includes a first generator process connection 1448A that operably connects an output of the GPCS 1444 with an input of the BPCS 1440. In the illustrated loop system 1400, the first generator process connection 1448A is configured to transfer and deliver electricity generated from the GPCS 1444 to the BPCS 1440. Such electricity transferred from the GPCS 1444 to the BPCS 1440 is provided in storage for the BPCS 1440 where the BPCS 1440 and/or the EC 1434 may use such stored electricity if needed. The loop system 1400 includes a second generator process connection 1448B that operably connects another output of the GPCS 1444 with an input of a zero liquid discharge process cell stage of the loop system 1400, which is described in more detail below. The second generator process connection 1448B is configured to transport and deliver depleted brine electrolyte to the zero liquid discharge process cell stage of the loop system 1400 for deliquifying processes and/or procedures, which is described in more detail below.

Still referring to FIG. 12, the loop system 1400 also includes at least one hydrogen process cell stage (hereinafter "HPCS") generally referred to as 1450. In the illustrated loop system 1400, a single HPCS 1450 is provided in the system. In other exemplary embodiments, any suitable number of HPCSs described and illustrated herein may be used in a loop system for various reasons, including the size and configuration of a loop system. As previously described, the HPCS 1450 is operably connected with the MPCS1 1414, the EC 1434, the BPCS 1440, and the GPCS 1444. As to the MPCS1 1414, the third mined connection 1428C operably connects a fluid outlet of the MPCS1 1414 with a fluid inlet of the HPCS 1450 to transport and deliver brine solution for hydrogen production processes conventionally performed by HPCS 1450. As to the EC 1434, the third electrical connection 1438C electrically connects an electrical output of the EC 1434 with an electrical input of the HPCS 1450 to enable the EC to provide electrical power and control over the HPCS 1450 during operation. As to the BPCS 1440, the third battery process connection 1442C operably connects a fluid outlet of the BPCS 1440 with a fluid inlet of the GPCS 1444 to transport and deliver additional electricity and/or energy generated from the BPCS 1440.

It should be understood that the HPCS 1450 may be configured with conventional methods and procedures for producing hydrogen in the illustrated loop system 1400. As such, the HPCS 1450 is configured with conventional machines, assemblies, apparatuses, systems, and devices for performing conventional methods and procedures for producing hydrogen in the illustrated loop system 1400. Examples of suitable and conventional methods and procedures used by a HPCS described and illustrated herein include alkaline electrolysis and other conventional methods and procedures used by a HPCS for producing hydrogen.

Still referring to FIG. 12, the loop system 1400 also includes at least one hydrogen process connection operably connecting the HPCS 1450 with at least one stage or component provided in the loop system 1400. In the illustrated loop system 1400, a first hydrogen process connection 1452A operably connects a fluid outlet of the HPCS 1450 with a fluid inlet of the GPCS 1444 for fluid processes. The first hydrogen process connection 1452A in the loop system 1400 is configured to transfer and deliver hydrogen solution from the HPCS 1450 to the GPCS 1444 for operating and using hydrogen fuel cells of the GPCS 1444. In the illustrated loop system 1400, a second hydrogen process connection 1452B operably connects another fluid outlet of the HPCS 1450 with a fluid inlet a zero liquid discharge process cell stage of the loop system 1400, which is described in more detail below. The second hydrogen process connection 1452B in the loop system 1400 is configured to transfer and deliver brine solution from the HPCS 1450 to the zero liquid discharge process cell stage of the loop system 1400, which is also described in more detail below.

Still referring to FIG. 12, the loop system 1400 also includes at least one zero liquid discharge process cell stage (hereinafter ZPCS) generally referred to as 1454. The illustrated ZPCS 1454 is configured to deplete and reduce brine solution received from various stages and/or components in the loop system 1400, particularly at the DPCS 1406, for deliquifying processes.

In the illustrated ZPCS 1454, the ZPCS 1454 includes a deliquify SDA/SSA 1456 apparatus that is configured to use acoustic desalination processes to deplete and reduce brine solution received from various stages and/or components in the loop system 1400, including from the DPCS 1406, while producing freshwater for numerous applications. Such operation of the deliquify SDA/SSA 1456 is described in more detail below.

The illustrated ZPCS 1454 also includes a mining process cell stage (hereinafter MPCS2) 1458 that is operably connected with the deliquify SDA/SSA 1456. The MPCS2 1458 is capable of recovering minerals and other valuable compositions that were failed to be recovered by the MPCS1 1414 in earlier stages of the loop system 1400. In other words, the brine transferred to the MPCS2 1458 is the most concentrated brine fluid in the loop system 1400. The illustrated ZPCS 1454 also includes a recover dispose output 1460 that is operably connected with the deliquify SDA/SSA 1456 and the MPCS2 1458. The recover dispose outlet 1460 is configured to recover any crystals and/or solid concentrates that were not captured and/or recovered by any preceding stage in the loop system 1400.

It should be understood that the ZPCS 1454 may use any suitable processes and/or procedures for depleting and reducing brine solution received from various stages and/or components in the loop system 1400. As such, conventional machines, assemblies, apparatuses, systems, and devices may be used in the ZPCS 1454 for depleting and reducing brine solution received from various stages and/or components in the loop system 1400. Examples of suitable processes performed by a ZPCS for depleting and reducing brine solution received from various stages and/or components in a loop system include acoustic desalination processes, multi-effect distillation, multistage flash distillation, adsorption, desorption, or crystallization, evaporation or crystallization, solar evaporation (e.g., field or saltern pans), vacuum evaporation, and any other suitable processes performed by a ZPCS for depleting and reducing brine solution received from various stages and/or components in a loop system As previously described, various process connections of the loop system 1400 operably connect the ZPCS 1454 with other stages and components provided in the loop system 1400. In the illustrated loop system 1400, the seventh battery process connection 1442G operably connects a fluid outlet of the BPCS 1440 with a fluid inlet of the deliquify SDA/SSA 1456 of the ZPCS 1454. As previously described, the seventh battery process connection 1442G is configured to transfer brine solution from the BPCS 1440 to the deliquify SDA/SSA 1456 of the ZPCS 1454 for depleting and reducing brine accumulated at the DPCS 1406 in the loop system 1400. In the illustrated loop system 1400, the second generator process connection 1448B also operably connects a fluid outlet of the GPCS 1444 with another fluid inlet of the deliquify SDA/SSA 1456 of the ZPCS 1454. As previously described, the second generator process connection 1448B is configured to transfer brine solution from the GPCS 1444 to the deliquify SDA/SSA 1456 of the ZPCS 1454 for depleting and reducing brine accumulated at the DPCS 1406 in the loop system 1400. In the illustrated loop system 1400, the second hydrogen process connection 1452B also operably connects a fluid outlet of the HPCS 1450 with another fluid inlet of the deliquify SDA/SSA 1456 of the ZPCS 1454. As previously described, the second hydrogen process connection 1452B is configured to transfer brine solution from the HPCS 1450 to the deliquify SDA/SSA 1456 of the ZPCS 1454 for depleting and reducing brine accumulated at the DPCS 1406 in the loop system 1400.

Still referring to FIG. 12, the loop system 1400 includes at least one discharge connection 1462 that operably connects the ZPCS 1454 with other stages and components provided in the loop system 1400. In the illustrated loop system 1400, a first discharge connection 1462A operably connects a fluid outlet of the deliquify SDA/SSA 1456 with a fluid inlet of a freshwater outlet 1464. The freshwater outlet 1464 may be operably connected with various freshwater applications for providing freshwater based on various considerations, including the location, environment, and climate of the loop system. Examples of suitable freshwater applications include interconnected regional and/or national water grids, drip irrigation system for expanded agriculture use, drip irrigation for reforestation and carbon dioxide capture, replenishment of water storage and reservoirs, expansion of inhabited, stressed areas, improved living conditions in semi-arid areas, development of arid areas for suitable living conditions, eliminated invasive species and/or micro-organisms in specific regions and/or areas, provide process water for industries, other various applications of the like that may benefit from and/or utilize freshwater.

Still referring to FIG. 12, the illustrated loop system 1400 also includes a second discharge process connection 1462B that operably connects another fluid outlet of the deliquify SDA/SSA 1456 with the MPCS2 1458. Similar to the connection and function between the DPCS 1406 and the MPCS1 1414, the deliquify SDA/SSA 1456 outputs minerals and other suitable solids concentrates removed from the freshwater to the MPCS2 1458, via the second discharge process connection 1462B, for recovery of any valuable minerals for the loop system 1400 or for economic value. The MPCS2 1458 may also transfer any crystals and/or solid concentrates to the recover dispose outlet 1460 that were not captured and/or recovered by any preceding stage in the loop system 1400. Such crystals may also be safely returned to sea water and/or oceans or be disposed on land.

Still referring to FIG. 12, the illustrated loop system 1400 also includes a third discharge process connection 1462C (labeled "CONCENTRATE LINE" in FIG. 12) that operably connects the deliquify SDA/SSA 1456 with another fluid inlet of the inflow source stage 1402. The third discharge process connection 1462C is configured to transfer and deliver brine solution and/or solids concentrate from the deliquify SDA/SSA 1456 to the inflow source stage 1402 to allow the DPCS 1406 to perform further desalination processes on brine solutions flowing through the loop system 1400. Such transfer of the remaining brine solution may be reprocessed for further removal trace minerals, metals, and/or solids that may be escaped through the SPCS 1406 and the ZPCD 1454.

As illustrated in FIG. 12, various process connections in the illustrated loop system 1400 operably connect with the third discharge process connection 1462C for transferring and/or removing brine solution from various stages. In one instance, the second portion 1442B2 of the second battery process connection 1442B operably engages with the third discharge process connection 1462C to deliver chlorine (produced by the BPCS 1440) from the BPCS 1440 to the inflow source stage 1402. In another instance, the fourth battery process connection 1442D operably engages with the third discharge process connection 1462C to transport and deliver hydrochloric acid solution (produced by the BPCS 1440) from the BPCS 1440 to the inflow source stage 1402. In another instance, the fifth battery process connection 1442E1 operably engages with the third discharge process connection 1462C to transport and deliver sodium hydroxide solution (produced by the BPCS 1440) from the BPCS 1440 to the inflow source stage 1402.

Having now described the stages and components of the loop system 1400, a method of using the loop system 1400 for removing brine and contaminants from a water source and producing freshwater is described in more detail below.

During operation, a continuous raw inflow fluid stream from the inflow source stage 1402 enters into the loop system 1400 for treatment purposes. Specifically, the continuous raw inflow fluid stream from the inflow source stage 1402 enters into the loop system 1400 to remove brine and contaminants and to produce freshwater for freshwater applications or potable water for human consumption. In the illustrated loop system 1400, a continuous inflow of seawater is fed into the loop system 1400 for treatment purposes. In other exemplary embodiments described above, any suitable fluid may be continuously fed into the loop system 1402 from the inflow source stage 1402 to remove brine compositions and/or solids concentrate and produce freshwater for freshwater applications or potable water for human consumption. As such, the seawater may contain brine compositions and/or contaminated compositions along with salt concentrates that are desired to be dissociated and removed from the water source in order to produce freshwater for freshwater applications and/or potable water for human consumption.

As illustrated in FIG. 11, the seawater provided in the inflow source stage 1402 may be transferred into the SPCS 1406 via at least one inflow source connection 1404. In the illustrated embodiment, the brine solution of the seawater may transfer to the SPCS 1406 via the first inflow source connection 1404A, and the salt water of the seawater may transfer to the SPCS 1406 via the second inflow source connection 1404B. At this point, the seawater is fed into at least one SDA 1408 of the SPCS 1406 for at least one dissociation and/or evisceration process. In the illustrated loop system 1400, the brine solution and the salt water of the seawater is transferred into the first SDA 1408A, via the first and second inflow source connections 1404A, 1404B, for a first dissociation and/or evisceration process. Such dissociation and/or evisceration process performed by the first SDA 1408A is substantially similar to the dissociation and/or evisceration process performed by the SDA 10 described above. In other exemplary embodiments, the first SDA 1408A may be any suitable SDA described and illustrated herein, including SDAs 210, 310, 410, 510, 610, 710, and 910.

Once the first SDA 1408A performs a first dissociation and/or evisceration process, the seawater having dissociated solids concentrate and dissociated brine compositions is transferred to the first SSA stage 1410A for a first removal and separation process via the first SPCS connection 1412A. Such removal and/or separation process performed by the first SSA stage 1410A is substantially similar to the removal and separation process performed by the first stage of the SSA 12 described above. In other exemplary embodiments, the first SSA stage 1410A may be any suitable SSA described and illustrated herein, including SSAs 12, 712, and 912.

Once the first SSA stage 1410A performs a first removal and separation process, the first SSA stage 1410A may transfer dissociated brine composition and/or dissociated solids concentrate removed from the water source to the MPCS1 1414 via the second SPCCS connection 1412B; such method of using the MPCS1 1414 is described in more detail below.

The first SSA stage 1410A may also transfer the seawater that endured the first removal and separation process to the second SDA 1408B for a second dissociation and/or evisceration process via the third SPCS connection 1412C. Such dissociation and/or evisceration process performed by the second SDA 1408B is also substantially similar to the dissociation and/or evisceration process performed by the SDA 10 described above. In other exemplary embodiments, the second SDA 1408B may be any suitable SDA described and illustrated herein, including SDAs 210, 310, 410, 510, 610, 710, and 910. While the first SDA 1408A and the second SDA 1408B are illustrated as separate SDAs, the first SDA 1408A and the second SDA 1408B may be a single SDA that is capable of performing first and second dissociation and/or evisceration processes (e.g., SDA 510).

Once the second SDA 1408B performs a second dissociation and/or evisceration process, the seawater having dissociated solids concentrate and dissociated brine compositions is then transferred to the second SSA stage 1410B for a second removal and separation process via the fourth SPCS connection 1412D. Such removal and/or separation process performed by the second SSA 1410A is substantially similar to the removal and separation process performed by the second stage of the SSA 12 described above. In other exemplary embodiments, the second SSA stage 1410B may be any suitable SSA described and illustrated herein, including SSAs 12, 712, and 912.

Once the second SSA stage 1410B performs a second removal and separation process, the second SSA stage 1410B may transfer dissociated brine composition and/or dissociated solids concentrate removed from the water source to the MPCS1 1414 via the fifth SPCS connection 1412E; such method of using the MPCS 1414 is described in more detail below. The second SSA stage 1410B may also transfer the seawater that endured the second removal and separation processes to at least one permeate outlet 1422. In the illustrated loop system 1400, the second SSA stage 1410B transfers the water source that endured the second removal and separation processes to the first permeate outlet 1424 via the sixth SPCS connection 1412F and to the second permeate outlet 1426 via the seventh SPCS connection 1412G. As described above, the first permeate outlet 1424 is configured to provide a final permeate and/or treatment on the water source to provide freshwater to a freshwater channel 1430 via the freshwater connection 1431. Additionally, the second permeate outlet 1426 is configured to provide another final permeate and/or treatment on the water source to provide potable water to a potable water channel 1432 via the potable water connection 1433.

During operation, the EC 1434 is configured to provide power, via the external power source 1436, and configured to control the operation of the SPCS 1406 by the first electrical connection 1438A. In order to operate and use the SPCS 1406, the EC 1434 must be enabled to an ON state or a similar state that provides power and control to the SPCS 1406 to perform desalination processed on fluid entering into the SPCS 1406 via the inflow source stage 1402.

Still referring to FIG. 11, the MPCS1 1414 is configured to mine and/or extract desired minerals from the brine solutions and/or solids concentrate received from the SPCS 1406 and the brine system 1416 (described in detail above). During operation, the MPCS1 1414 is configured with conventional machines, assemblies, apparatuses, and systems in order to mine and extract desired minerals considered useful for stages in the loop system 1400 or economically viable for commercial use outside of the loop system 1400. In the illustrated loop system 1400, the MPCS1 1414 is configured to transfer different types of brine solutions and other extracted minerals to various stages in the loop system 1400. During operation, the MPCS1 1414 may generate a chlorine solution which is transported from the MPCS1 1414 to the second permeate outlet 1426 to treat and/or polish freshwater permeate to produce potable water (via the first mined connection 1428A) if desired by skilled artisans; as previously stated, the first mined connection 1428A may be omitted if desired by skilled artisans based on various considerations listed above. The chloride solution generated by the MPCS1 1414 may be also be transported to the inflow source stage 1402 for further desalination processes performed by the SPCS 1406 (via the fourth mined stage 1438D). The MPCS1 1414 also generates brine solution with sodium chloride during operation which is transported from the MPCS1 1414 to the BPCS 1440 (via the second mined connection 1428B). The MPCS1 1414 also generates a brine solution with reduced and/or diluted sodium chloride during operation which is transported from the MPCS1 1414 to the HPCS 1450 (via the third mined connection 1428C).

Referring to FIG. 12, the BPCS 1440 is configured to receive and transfers different fluids and/or energy during operation. In the illustrated loop system 1400, the BPCS 1440 is configured to receive power, via the external power source 1436, and configured to be controlled by the EC 1434 by the second electrical connection 1438B. Similar to the operation of the SPCS 1406, the EC 1434 must be enabled to an ON state or a similar state that provides power and control to the BPCS 1440 to produce brine solutions, to produce minerals useful in this loop system 1400, and to produce energy for stages interconnected with the BPCS 1440 in the loop system 1400.

During operation, the BPCS 1440 is configured to transfer energy and/or electricity to the EC 1434 from the GPCS 1444 via the first generator process connection 1448A interconnecting the BPCS 1440 and the GPCS 1444 and the first battery process connection 1442A interconnecting the EC 1434 with the BPCS 1440. In this process connection, the BPCS 1440 is configured to store the electrically generated by and transferred from the GPCS 1444 during operation. As such, the EC 1434 is enabled to utilize this stored electricity from the BPCS 1440, if needed, during operation of the loop system 1400. Additionally, the BPCS 1440 is also enabled to use this stored electricity, if needed, during operation of the loop system 1400. As such, the stored energy generated by and transferred from the GPCS 1444 may useful if the EC 1434 is unable to provide power to the GPCS 1444 for various reasons.

Still referring to FIG. 12, the BPCS 1440 is also configured to produce various minerals from the brine solution transferred from the MPSC1 1414 via the second mined connection 1428B. As described above, the minerals produced by the BPCS 1440 are provided by conventional and known techniques and methods using known machines, apparatuses, devices, and components known in the art. In one operation, the BPCS 1440 is configured to produce chloride that is transferred to the MPSC1 1414, via a first portion 1442B1 of the second battery process connection 1442B, and to the inflow source stage 1402, via the connection between the second portion 1442B1 of the of the second battery process connection 1442B and the third discharge connection 1462C, further desalination processes by the DSPC 1406. In another operation, the BPCS 1440 is configured to produce energy and/or electricity to the HPCS 1450 via the third battery process connection 1442C. In another operation, the BPCS 1440 is also configured to produce hydrochloric acid solution that is transferred to the inflow source stage 1402, via the connection between the fourth battery process connection 1442D and the third discharge connection 1462C, for further desalination processes by the DSPC 1406. In another operation, the BPCS 1440 is also configured to produce and transfer sodium hydroxide solution to the GPCS 1444 for hydrogen fuel cell generation processes, via the fifth battery process connection 1442E, to the inflow source stage 1402, via the connection between the first portion 1442E1 of the of the fifth battery process connection 1442E and the third discharge connection 1462C, further desalination processes by the DSPC 1406, and to the sodium hydroxide output 1446 for storage purposes via the second portion 1442E2 of the of the fifth battery process connection 1442E. In another operation, the BPCS 1440 is configured to produce and transfer hydrogen solution to the GPCS 1444 for hydrogen fuel cell generation processes via the sixth battery process connection 1442F. In another operation, the BPCS 1440 is also configured to produce and transfer brine solution to the ZPCS 1454, specifically the deliquify SDA/SSA 1456, for further desalination processes by the deliquify SDA/SSA 1456.

During operation, the GPCS 1444 is configured to generate and transfer energy and/or electricity to the EC 1434 based on the conventional hydrogen fuel cell generation processes in the GPCS 1444. As such, the energy and/or electricity is transferred to the EC 1434 via the first generator process connection 1448A interconnecting the BPCS 1440 and the GPCS 1444 and the first battery process connection 1442A interconnecting the EC 1434 with the BPCS 1440. In this process connection, the BPCS 1440 is configured to store the electrically generated by and transferred from the GPCS 1444 during operation. As such, the EC 1434 is enabled to utilize this stored electricity from the BPCS 1440, if needed, during operation of the loop system 1400. Additionally, the BPCS 1440 is also enabled to use this stored electricity, if needed, during operation of the loop system 1400. As such, the stored energy generated by and transferred from the GPCS 1444 may useful if the EC 1434 is unable to provide power to the GPCS 1444 for various reasons. During operation, the GPCS 1444 is also configured to produce and transfer brine solution to the ZPCS 1454, specifically the deliquify SDA/SSA 1456, for further desalination processes by the deliquify SDA/SSA 1456; such transfer of the brine solution from the GPCS 1444 to the ZPCS 1454 occurs via the second generator process connection 1448B.

Referring to FIG. 12, the HPCS 1450 is also configured to receive and transfers different fluids and/or energy during operation. In the illustrated loop system 1400, the HPCS 1450 is configured to receive power, via the external power source 1436, and configured to be controlled by the EC 1434 by the third electrical connection 1438C. Similar to the operation of the SPCS 1406, the EC 1434 must be enabled to an ON state or a similar state that provides power and control to the HPCS 1450 to produce brine solutions, to produce minerals useful in this loop system 1400, and to produce energy for stages interconnected with the BPCS 1440 in the loop system 1400.

During operation, the HPCS 1450 is configured to produce hydrogen by conventional techniques and processes known in the art with conventional and machines, assemblies, apparatuses, systems, and components known in the art for producing hydrogen. Once hydrogen is generated by the HPCS 1450, the hydrogen is transferred to the GPCS 1444, via the first generator process connection 1448A, to provide hydrogen fuel cell processes. Additionally, the HPCS 1450 is configured to produce brine solution that is transferred to the ZPCS 1454, specifically the deliquify SDA/SSA 1456, for further desalination processes by the deliquify SDA/SSA 1456, such transfer of the brine solution from the HPCS 1450 to the ZPCS 1454 occurs via the second hydrogen process connection 1452B.

Still referring to FIG. 12, the ZPCS 1454 is configured to receive excess brine solution from each of the BPCS 1440, the GPCS 1444, and the HPCS 1450. As such, the deliquify SDA/SSA 1456 receives brine solution from the BPCS 1440 via the seventh battery process connection 1442G, the GPCS 1444 via the second generator process connection 1448B, and the HPCS 1450 via the second hydrogen process connection 1452B. During operation, the deliquify SDA/SSA 1456 is configured to perform desalination processes on the brine solutions to further dissociate brine compositions and/or solids concentrate, remove the dissociated brine compositions and/or solids concentrate, and produce freshwater for freshwater applications. In one operation, the deliquify SDA/SSA 1456 produces freshwater and transfers the freshwater to the freshwater outlet 1464 via the first discharge connection 1462A. In another operation, the deliquify SDA/SSA 1456 produces dissociated brine composites and solids concentrate removed from the freshwater source in which such dissociated brine composites and solids concentrate are transferred to the MPSC2 1458. Similar to the MPSC1 1414, the MPSC21 1458 performs mining and extracting operations for extracting and recovering desired minerals from the dissociated brine composites and solids concentrate. Any crystalized brine compositions or solids concentrate are then transferred to the recover dispose 1460 of the ZPCS 1454. In another operation, the deliquify SDA/SSA 1456 may also transfer dissociated brine composition and solids concentrate to the inflow source stage 1402, via the third discharge connection 1462C, for further treatment and processing performed by the loop system 1400.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of," "consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A fluid treatment loop system, comprising:
    an acoustic source process cell stage (SPCS), wherein the SPCS comprises:
        at least one solids dissociation apparatus (SDA) operatively in communication with a continuous fluid stream from a fluid source, wherein the at least one SDA comprises:
            a housing;
            at least one insert operably engaged with the housing, wherein the at least one insert is adapted to receive the continuous fluid stream; and
            a transducer operably engaged with the housing and disposed about the at least one insert at a distance away from said at least one insert inside of the housing, wherein the transducer is configured to create cavitation inside of the housing, via sonic waves, to dissociate contaminants in the continuous fluid stream flowing through the at least one insert; and
        at least one solids separation apparatus (SSA) operably connected with the at least one fluid treatment apparatus for receiving the dissociated contaminants provided in the continuous fluid stream, wherein the at least one SSA is adapted to separate the dissociated contaminants from the fluid stream for at least one separation process;
    at least one mining process cell stage (MPCS) operatively in communication with SPCS, wherein the at least one MPCS is adapted to receive the dissociated contaminants from the SPCS; and
    at least one permeate outlet operatively in communication with SPCS, wherein the at least one permeate outlet is adapted to receive the permeated water from the SPCS.

2. The fluid treatment loop system of claim 1, wherein the at least one SSA of the SPCS comprises:
    a tower;
    a second transducer operably engaged with a first end of the tower, wherein the transducer is configured to generate a standing sonic wave inside of the tower;
    a reflector operably engaged with an opposing second of the tower, wherein the reflector is configured to reflect the standing sonic wave towards the transducer; and
    at least one set of ports defined in an interior wall of at least one solids separation stage of the tower, wherein the at least one set of ports is positioned at anti-nodes of the standing sonic wave to recover dissociated contaminants from the continuous fluid stream flowing through the tower;

wherein the transducer and the reflector are linearly moveable relative to the tower to linearly move the standing sonic wave.

3. The fluid treatment loop system of claim 2, further comprising:

at least one effluent connection operably connected with the at least one SSA and the at least one MPCS;

wherein the at least one effluent connection transports the dissociated contaminants of the at least one treatment process from the at least one SSA to the at least one MPCS.

4. The fluid treatment loop system of claim 3, wherein the SPCS comprises:

at second SDA operably connected with the at least one SSA, wherein the at least one SDA is configured to eviscerate the contaminants in the continuous fluid stream in a second treatment process; and a second SSA operably connected with the second SDA for receiving the dissociated contaminants provided in the fluid stream, wherein the at least one SSA is configured to separate the dissociated contaminants from the continuous fluid stream and provide permeated water in the second treatment process.

5. The fluid treatment loop system of claim 4, further comprising:

a second effluent connection operably connected with the second SSA and the at least one MPCS;

wherein the second effluent connection transports the dissociated contaminants of the second treatment process from the second SSA to the at least one MPCS.

6. The fluid treatment loop system of claim 1, further comprising:

at least one permeate connection operably connected with the at least one SSA and the at least one permeate outlet;

wherein the at least one permeate outlet is adapted to transport the permeated water from the at least one SSA to the at least one permeate outlet.

7. The fluid treatment loop system of claim 6, further comprising:

at least one freshwater channel; and at least one freshwater connection operably connected with the at least one permeate outlet and the at least one freshwater channel;

wherein the at least one freshwater connection is adapted to transport the permeated water from the at least one permeate outlet to the at least one freshwater channel.

8. The fluid treatment loop system of claim 6, further comprising:

at least one potable water channel; and at least one potable water connection operably connected with the at least one permeate outlet and the at least one potable water channel;

wherein the at least one potable water connection is adapted to transport the permeated water from the at least one permeate outlet to the at least one potable water channel.

9. The fluid treatment loop system of claim 5, further comprising:

at least one battery process cell stage (BPCS);

at least one battery process connection operably connected with the at least one MPCS and the BPCS; and a first mined stream collected by the at least one MPCS;

wherein the at least one battery process connection is adapted to transport the first mined stream from the at least one MPCS to the at least one BPCS.

10. The fluid treatment loop system of claim 9, wherein the first mined stream includes a mixture of brine and sodium hydroxide.

11. The fluid treatment loop system of claim 9, further comprising:

at least one hydrogen fuel cell generator process cell stage (GPCS);

at least one battery fluid stream collected by the at least one GPCS; and at least one generator process connection operably connected with the at least one BPCS and the at least one GPCS;

wherein the at least one generator process connection is adapted to transport the at least one battery fluid stream from the at least one GPCS to the at least one BPCS.

12. The fluid treatment loop system of claim 11, wherein the at least one battery fluid stream transported from the at least one BPCS to the at least one GPCS includes one of hydrogen solution and sodium hydroxide solution.

13. The fluid treatment loop system of claim 11, further comprises:

a first battery fluid stream collected by the at least one GPCS comprising of hydrogen;

a second battery fluid stream collected by the at least one GPCS comprising of sodium hydroxide;

a first generator process connection operably connected with the at least one BPCS and the at least one GPCS, wherein the first generator process connection is adapted to transport the first battery fluid stream from the at least one BPCS to the at least one GPCS; and a second generator process connection operably connected with the at least one BPCS and the at least one GPCS, wherein the second generator process connection is adapted to transport the second battery fluid stream from the at least one BPCS to the at least one GPCS.

14. The fluid treatment loop system of claim 11, further comprises:

at least one hydrogen process cell stage (HPCS);

a second mined stream collected by the at least one MPCS having a mixture of brine and sodium chloride; and at least one hydrogen process connection operably connected with the at least one HPCS and the at least one MPCS;

wherein the at least one hydrogen production connection is adapted to transport the second mined stream from the at least one GPCS to the at least one MPCS.

15. The fluid treatment loop system of claim 14, further comprising:

a liquid discharge process cell stage (LPCS) operably connected with the at least one BPCS, the at least one GPCS, and the at least one HPCS;

wherein the LPCS is configured to receive to at least one brine stream from each of the at least one BPCS, the at least one GPCS, and the at least one HPCS;

wherein the LPCS is configured to remove brine in the at least one brine stream from each of the at least one BPCS, the at least one GPCS, and the at least one HPCS.

16. The fluid treatment loop system of claim 15, further comprising:

a concentrate connection operably connecting the at least one SPCS with each of the at least one BPCS, the at least one GPCS, the at least one HPCS, and the LPCS;

wherein the concentrate connection is configured to transport concentrate brine removed in the at least one brine stream from each of the at least one BPCS, the at least one GPCS, and the at least one HPCS to the at least one SPCS.

17. The fluid treatment loop system of claim 16, wherein the fluid treatment loop system is adapted to be operatively connected with a preexisting desalination process.

* * * * *